US011984994B2

(12) United States Patent
Gao et al.

(10) Patent No.: US 11,984,994 B2
(45) Date of Patent: May 14, 2024

(54) HARQ-ACK SENDING METHOD, RECEIVING METHOD, TERMINAL AND BASE STATION

(71) Applicant: DATANG MOBILE COMMUNICATIONS EQUIPMENT CO., LTD., Beijing (CN)

(72) Inventors: Xuejuan Gao, Beijing (CN); Tony Ekpenyong, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 594 days.

(21) Appl. No.: 17/267,623

(22) PCT Filed: Aug. 2, 2019

(86) PCT No.: PCT/CN2019/099021
§ 371 (c)(1),
(2) Date: Feb. 10, 2021

(87) PCT Pub. No.: WO2020/029879
PCT Pub. Date: Feb. 13, 2020

(65) Prior Publication Data
US 2021/0314105 A1 Oct. 7, 2021

(30) Foreign Application Priority Data
Aug. 10, 2018 (CN) .......................... 201810912210.6

(51) Int. Cl.
*H04L 1/1829* (2023.01)
*H04L 1/1607* (2023.01)
(Continued)

(52) U.S. Cl.
CPC .......... *H04L 1/1861* (2013.01); *H04L 1/1671* (2013.01); *H04L 1/1812* (2013.01);
(Continued)

(58) Field of Classification Search
CPC ... H04L 1/1671; H04L 1/1812; H04L 1/1854; H04L 1/1861; H04L 1/1864; H04L 5/0055; H04L 5/0094; H04W 72/20; H04W 72/21
See application file for complete search history.

(56) References Cited

U.S. PATENT DOCUMENTS

2013/0195066 A1  8/2013  Lee et al.
2013/0242923 A1  9/2013  Yang et al.
(Continued)

FOREIGN PATENT DOCUMENTS

CN  103222223 A  7/2013
CN  103283170 A  9/2013
(Continued)

OTHER PUBLICATIONS

Written Opinion and International Search Report for International Application No. PCT/CN2019/099021 dated Feb. 16, 2021.
(Continued)

*Primary Examiner* — Kashif Siddiqui
(74) *Attorney, Agent, or Firm* — Harness, Dickey & Pierce, P.L.C.

(57) ABSTRACT

A HARQ-ACK sending method, a receiving method, a terminal and a base station are provided, the HARQ-ACK sending method includes: determining one PUCCH resource for transmitting HARQ-ACK of a SPS PDSCH from at least one PUCCH resource for transmitting the HARQ-ACK of the SPS PDSCH, wherein the at least one PUCCH resource includes at least one first type of PUCCH resource, and the first type of PUCCH resource is a PUCCH resource for carrying more than 2 bits of information; and sending the HARQ-ACK of the SPS PDSCH on the determined PUCCH resource.

20 Claims, 13 Drawing Sheets

(51) Int. Cl.
  *H04L 1/1812* (2023.01)
  *H04L 5/00* (2006.01)
  *H04W 72/20* (2023.01)
  *H04W 72/21* (2023.01)
(52) U.S. Cl.
  CPC .......... *H04L 1/1854* (2013.01); *H04L 1/1864* (2013.01); *H04L 5/0055* (2013.01); *H04W 72/20* (2023.01); *H04W 72/21* (2023.01)

(56) References Cited

U.S. PATENT DOCUMENTS

| | | | |
|---|---|---|---|
| 2014/0226608 | A1 | 8/2014 | Seo et al. |
| 2015/0092628 | A1 | 4/2015 | Zhao et al. |
| 2015/0117272 | A1* | 4/2015 | Gao ............ H04L 5/0055 370/280 |
| 2016/0330693 | A1 | 11/2016 | Hwang et al. |
| 2017/0366305 | A1 | 12/2017 | Hwang et al. |
| 2019/0349942 | A1 | 11/2019 | Li et al. |
| 2020/0022161 | A1* | 1/2020 | Yang ............ H04L 5/0064 |
| 2020/0337046 | A1* | 10/2020 | Gao ............ H04L 5/0055 |

FOREIGN PATENT DOCUMENTS

| | | |
|---|---|---|
| CN | 103378957 A | 10/2013 |
| CN | 103828318 A | 5/2014 |
| CN | 105391522 A | 3/2016 |
| CN | 105846963 A | 8/2016 |
| CN | 106416387 A | 2/2017 |
| CN | 108271262 A | 7/2018 |
| JP | 2014504061 A | 2/2014 |

OTHER PUBLICATIONS

Nokia, Nokia Shanghai Bell, "On remaining details of short PUCCH for UCI of more than 2 bits", Agenda Item 7.3.2.1.2, 3GPP TSG RAN WG1 Meeting 91, R1-1720008, Nov. 27-Dec. 1, 2017, Reno, USA.
Nokia, Nokia Shanghai Bell, "On the remaining details of long PUCCH for UCI of more than 2 bits", Agenda Item 7.3.2.2.2, 3GPP TSG RAN WG1 Meeting #91, R1-1720011, Nov. 27-Dec. 1, 2017, Reno, Nevada, USA.
Huawei, Hisilicon, "Remaining open items on PUCCH resource allocation", Agenda Item 7.1.3.2.4, 3GPP TSG RAN WG1 Meeting #92, R1-1802026, Athens, Greece, Feb. 26, Mar. 2, 2018.
Nokia, Nokia Shanghai Bell, "UCI transmission in NR operations in unlicensed", Agenda Item 7.6.5, 3GPP TSG RAN WG1 Meeting # 92bis, R1-1803682, Apr. 16-20, 2018, Sanya, China.
Catt, "On multiplexing of different UCI transmissions", Agenda Item 7.1.3.2.1, 3GPP TSG RAN WG1 Meeting #92bis, R1-1803754, Apr. 16-20, 2018, Sanya, China.
Sharp, "Remaining issues on PUCCH in long duration", Agenda Item 7.1.3.2.2, 3GPP TSG RAN WG1 Meeting #93, R1-1806947, May 21-25, 2018, Busan, Korea.
Ericsson, "Summary of Overlapped PUCCH Resources", Agenda Item 7.1.3.2.1, 3GPP TSG RAN WG1 Meeting 93, R1-1807662, May 21-25, 2018, Busan, South Korea.
Technology Reports, "Advanced carrier aggregation and dual connection technology to achieve higher speed and large capacity", LTE-Advanced—Release 12, 3GPP Release 10.
Japanese Office Action dated May 10, 2022 for Japanese Patent Application No. 2021-531164.
Chinese Office Action dated Oct. 25, 2021 for CN Application No. 201810912210.6.
Extended European Search Report dated Sep. 1, 2021 for EP Application No. 19 84 6004.0.
Spreadtrum Communications, "Remaining details on short-PUCCH", Agenda Item 7.3.2.1.1, 3GPP TSG RAN WG1 Meeting# 93, R1-1806400, Busan, South Korea, May 21-25, 2018.
Ericsson, "On PUCCH Remaining Issues", Agenda Item 7.1.3.2.2, 3GPP TSG RAN WG1 Meeting#92bis, R1-1807252, Busan, South Korea, May 21-25, 2018.

* cited by examiner

HARQ-ACK SENDING METHOD, RECEIVING METHOD, TERMINAL AND BASE STATION

CROSS-REFERENCE TO RELATED APPLICATIONS

The present application is the U.S. national phase of PCT Application PCT/CN2019/099021 filed on Aug. 2, 2019, which claims a priority of Chinese patent application No. 201810912210.6 filed on Aug. 10, 2018, which is incorporated herein by reference in its entirety.

TECHNICAL FIELD

The present disclosure relates to the technical field of communication, in particular to a hybrid automatic repeat request acknowledgement (HARQ-ACK) sending method, a receiving method, a terminal and a base station.

BACKGROUND

With the development and change of mobile communication service demand, a number of organizations such as the International Telecommunication Union (ITU) have begun to study new radio communication systems (New RAT, NR), such as the 5th Generation New RAT (5G NR). In the NR, a semi-persistent scheduling (SPS) physical downlink shared channel (PDSCH) transmission is supported, a base station transmits the SPS PDSCH at a corresponding time domain position and a frequency domain resource, and a terminal receives the SPS PDSCH at the corresponding time domain position and the frequency domain resource.

After receiving the SPS PDSCH, the terminal sends HARQ-ACK feedback information of the SPS PDSCH through a physical uplink control channel (PUCCH) or a physical uplink shared channel (PUSCH) for informing the base station whether the SPS PDSCH transmission is correctly received.

Other uplink control information (UCI) transmissions, such as channel state information (CSI), scheduling request (SR), can further be configured in the new radio communication system, when a transmission time domain position of the HARQ-ACK feedback of the SPS PDSCH overlaps with a time domain position of the UCI transmission, the PUCCH resource for transmitting the HARQ-ACK of the SPS PDSCH cannot be used for the transmission carrying more than 2 bits of information because the PUCCH resource for transmitting the HARQ-ACK of the SPS PDSCH is a PUCCH Format 0 or 1 resource pre-configured by a high layer signaling, therefore, it cannot be supported to simultaneously transmit other UCIs and the HARQ-ACK of the SPS PDSCH on the PUCCH resource for transmitting the HARQ-ACK of the SPS PDSCH.

SUMMARY

Therefore, the present disclosure provides a HARQ-ACK sending method, a HARQ-ACK receiving method, a terminal and a base station to solve the problem in the related art that other UCIs and the HARQ-ACK of the SPS PDSCHs cannot be supported to be simultaneously transmitted on the PUCCH resource for transmitting the HARQ-ACK of the SPS PDSCH.

In order to solve the above technical problem, the present disclosure provides a hybrid automatic repeat request acknowledgement (HARQ-ACK) sending method applied to a terminal, including:
determining one physical uplink control channel (PUCCH) resource for transmitting HARQ-ACK of a semi-persistent scheduling physical downlink shared channel (SPS PDSCH) from at least one PUCCH resource for transmitting the HARQ-ACK of the SPS PDSCH, wherein the at least one PUCCH resource includes at least one first type of PUCCH resource, and the first type of PUCCH resource is a PUCCH resource for carrying more than 2 bits of information; and
sending the HARQ-ACK of the SPS PDSCH on the determined PUCCH resource.

Optionally, when the HARQ-ACK of the SPS PDSCH and a first type of uplink control information (UCI) are transmitted in a same time unit, in the time unit, the determining the one PUCCH resource for transmitting the HARQ-ACK of the SPS PDSCH from the at least one PUCCH resource, includes:
when a preset PUCCH resource in the at least one PUCCH resource and a resource of the first type of UCI do not overlap in a time domain, determining the preset PUCCH resource as the PUCCH resource for transmitting the HARQ-ACK of the SPS PDSCH.

Optionally, when the HARQ-ACK of the SPS PDSCH and a first type of UCI are transmitted in a same time unit, in the time unit, the determining the one PUCCH resource for transmitting the HARQ-ACK of the SPS PDSCH from the at least one PUCCH resource, includes:
when a preset PUCCH resources in the at least one PUCCH resource and a resource of the first type of UCI overlap in a time domain, determining one first type of PUCCH resource as the PUCCH resource for transmitting the HARQ-ACK of the SPS PDSCH the first type of UCI from the at least one PUCCH resource;
the sending the HARQ-ACK of the SPS PDSCH on the determined PUCCH resource, includes:
sending the HARQ-ACK of the SPS PDSCH and the first type of UCI on the determined first type of PUCCH resource.

Optionally, when the HARQ-ACK of the SPS PDSCH and a first type of UCI are transmitted in a same time unit, in the time unit, the determining the one PUCCH resource for transmitting the HARQ-ACK of the SPS PDSCH from the at least one PUCCH resource, includes:
when the at least one PUCCH resource further includes at least one second type of PUCCH resource, determining one second type of PUCCH resource which does not overlap with a resource of the first type of UCI in a time domain as the PUCCH resource for transmitting the HARQ-ACK of the SPS PDSCH if the at least one second type of PUCCH resource which does not overlap with the resource of the first type of UCI in the time domain exists in the at least one PUCCH resource;
where the second type of PUCCH resource is a PUCCH resource for carrying no more than 2 bits of information.

Optionally, when the HARQ-ACK of the SPS PDSCH and a first type of UCI are transmitted in a same time unit, in the time unit, the determining the one PUCCH resource for transmitting the HARQ-ACK of the SPS PDSCH from the at least one PUCCH resource, includes:
when the at least one PUCCH resource further includes at least one second type of PUCCH resource, determining one first type of PUCCH resource as the PUCCH resource for transmitting the HARQ-ACK of the SPS PDSCH and the UCI from the at least one PUCCH resource if the second type of PUCCH resource which does not overlap with a resource of the first type of UCI in a time domain does not exist in the at least one PUCCH resource;

where the second type of PUCCH resource is a PUCCH resource for carrying no more than 2 bits of information;

the sending the HARQ-ACK of the SPS PDSCH on the determined PUCCH resource, includes:

sending the HARQ-ACK of the SPS PDSCH and the first type of UCI on the determined first type of PUCCH resource.

Optionally, when the HARQ-ACK of the SPS PDSCH and a first type of UCI are transmitted in a same time unit, in the time unit, the determining the one PUCCH resource for transmitting the HARQ-ACK of the SPS PDSCH from the at least one PUCCH resource, includes:

when the at least one PUCCH resource only includes the first type of PUCCH resource, determining one first type of PUCCH resource as the PUCCH resource for transmitting the HARQ-ACK of the SPS PDSCH and the first type of UCI;

the sending the HARQ-ACK of the SPS PDSCH on the determined PUCCH resource, includes:

sending the HARQ-ACK of the SPS PDSCH and the first type of UCI on the determined first type of PUCCH resource.

Optionally, when a first type of UCI does not exist in a time unit where the HARQ-ACK transmission of the SPS PDSCH is located, in the time unit, the determining the one PUCCH resource for transmitting the HARQ-ACK of the SPS PDSCH from the at least one PUCCH resource, includes:

when the at least one PUCCH resource further includes a second type of PUCCH resource, determining one second type of PUCCH resource as the PUCCH resource for transmitting the HARQ-ACK of the SPS PDSCH.

Optionally, when a first type of UCI does not exist in a time unit where the HARQ-ACK transmission of the SPS PDSCH is located, in the time unit, the determining the one PUCCH resource for transmitting the HARQ-ACK of the SPS PDSCH from the at least one PUCCH resource, includes:

when the at least one PUCCH resource only includes the first type of PUCCH resource, determining one first type of PUCCH resource as the PUCCH resource for transmitting the HARQ-ACK of the SPS PDSCH.

Optionally, the determining one first type of PUCCH resource as the PUCCH resource for transmitting the HARQ-ACK of the SPS PDSCH and the first type of UCI from the at least one PUCCH resource, includes:

when the at least one PUCCH resource includes at least two first type of PUCCH resources, determining any one of the following first type of PUCCH resources as the PUCCH resource for transmitting the HARQ-ACK of the SPS PDSCH and the first type of UCI from the at least one PUCCH resource:

one first type of PUCCH resource indicated by a PUCCH resource indication (PRI) in a physical downlink control channel (PDCCH) indicating SPS PDSCH activation;

one first type of PUCCH resource with the lowest carrying capacity being capable of carrying the HARQ-ACK of the SPS PDSCH and the first UCI without exceeding a set code rate, where different first type of PUCCH resources have different carrying capacities;

one first type of PUCCH resource with the largest carrying capacity when all the first type of PUCCH resources in the at least one PUCCH resource being not capable of carrying the HARQ-ACK of the SPS PDSCH and the first UCI without exceeding the set code rate, where different first type of PUCCH resources have different carrying capacities;

one first type of PUCCH resource with the smallest index;

the first one of the first type of PUCCH resources.

Optionally, the determining one second type of PUCCH resource as the PUCCH resource for transmitting the HARQ-ACK of the SPS PDSCH, includes:

when the at least one PUCCH resource includes at least two second type of PUCCH resources, determining any one of the following second type of PUCCH resources as the PUCCH resource for transmitting the HARQ-ACK of the SPS PDSCH from the at least two second type of PUCCH resources:

one second type of PUCCH resource indicated by a PRI in a PDCCH indicating SPS PDSCH activation;

the second type of PUCCH resource with the smallest index;

the first one of the second type of PUCCH resources.

Optionally, before the determining the one PUCCH resource for transmitting the HARQ-ACK of the SPS PDSCH from the at least one PUCCH resource, the sending method further includes:

judging whether a transmission opportunity of the HARQ-ACK of the SPS PDSCH overlaps with a transmission opportunity of the first type of UCI;

the determining the one PUCCH resource for transmitting the HARQ-ACK of the SPS PDSCH from the at least one PUCCH resource, includes:

when the transmission opportunity of the HARQ-ACK of the SPS PDSCH and the transmission opportunity of the first type of UCI overlap, determining one PUCCH resource for transmitting the HARQ-ACK of the SPS PDSCH from the at least one PUCCH resource.

Optionally, before the determining the one PUCCH resource for transmitting the HARQ-ACK of the SPS PDSCH from the at least one PUCCH resource, the sending method further includes:

judging whether the HARQ-ACK of the SPS PDSCH and the first type of UCI are supported to be transmitted simultaneously;

the determining the one PUCCH resource for transmitting the HARQ-ACK of the SPS PDSCH from the at least one PUCCH resource, includes:

when the HARQ-ACK of the SPS PDSCH and the first type of UCI are supported to be transmitted simultaneously, determining one PUCCH resource for transmitting the HARQ-ACK of the SPS PDSCH from the at least one PUCCH resource.

Optionally, before the determining the one PUCCH resource for transmitting the HARQ-ACK of the SPS PDSCH from the at least one PUCCH resource, the sending method further includes:

determining the at least one PUCCH resource according to a configuration signaling.

Optionally, the preset PUCCH resource in the at least one PUCCH resource is any one of the following:

the PUCCH resource with the smallest index in the at least one PUCCH resource;

the first one of the at least one PUCCH resource;

a PUCCH resource determined by a PRI in a PDCCH indicating SPS PDSCH activation;

a second type of PUCCH resource when the at least one PUCCH resource further includes the second type of PUCCH resource;

the second type of PUCCH resource with the smallest index when the at least one PUCCH resource further includes at least two second type of PUCCH resources;

the first one of the second type of PUCCH resources when the at least one PUCCH resource further includes at least two second type of PUCCH resources.

Optionally, the first type of UCI includes any one or more of the following:

channel state information (CSI);

schedule request (SR).

Optionally, the first type of PUCCH resource is any one of the following:

PUCCH format 2 resource;

PUCCH format 3 resource;

PUCCH format 4 resource.

Optionally, the second type of PUCCH resource is any one of the following:

PUCCH format 0 resource;

PUCCH format 1 resource.

Optionally, the time unit is any one of the following:

one sub-frame;

one slot;

one mini-slot.

In second aspect, a HARQ-ACK receiving method applied to a base station is provided, including:

determining one PUCCH resource for transmitting HARQ-ACK of a SPS PDSCH from at least one PUCCH resource for transmitting the HARQ-ACK of the SPS PDSCH, where the at least one PUCCH resource includes at least one first type of PUCCH resource, and the first type of PUCCH resource is a PUCCH resource for carrying more than 2 bits of information; and receiving the HARQ-ACK of the SPS PDSCH on the determined PUCCH resource.

Optionally, when the HARQ-ACK of the SPS PDSCH and a first type of uplink control information (UCI) are transmitted in a same time unit, in the time unit, the determining the one PUCCH resource for transmitting the HARQ-ACK of the SPS PDSCH from the at least one PUCCH resource, includes:

when a preset PUCCH resource in the at least one PUCCH resource and a resource of the first type of UCI do not overlap in a time domain, determining the preset PUCCH resource as the PUCCH resource for transmitting the HARQ-ACK of the SPS PDSCH.

Optionally, when the HARQ-ACK of the SPS PDSCH and a first type of UCI are transmitted in a same time unit, in the time unit, the determining the one PUCCH resource for transmitting the HARQ-ACK of the SPS PDSCH from the at least one PUCCH resource, includes:

when a preset PUCCH resources in the at least one PUCCH resource and a resource of the first type of UCI overlap in a time domain, determining one first type of PUCCH resource as the PUCCH resource for transmitting the HARQ-ACK of the SPS PDSCH and the first type of UCI from the at least one PUCCH resource;

the receiving the HARQ-ACK of the SPS PDSCH on the determined PUCCH resource, includes:

receiving the HARQ-ACK of the SPS PDSCH and the first type of UCI on the determined first type of PUCCH resource.

Optionally, when the HARQ-ACK of the SPS PDSCH and a first type of UCI are transmitted in a same time unit, in the time unit, the determining the one PUCCH resource for transmitting the HARQ-ACK of the SPS PDSCH from the at least one PUCCH resource, includes:

when the at least one PUCCH resource further includes at least one second type of PUCCH resource, determining one second type of PUCCH resource which does not overlap with a resource of the first type of UCI in a time domain as the PUCCH resource for transmitting the HARQ-ACK of the SPS PDSCH if the at least one second type of PUCCH resource which does not overlap with the resource of the first type of UCI in the time domain exists in the at least one PUCCH resource;

where the second type of PUCCH resource is a PUCCH resource for carrying no more than 2 bits of information.

Optionally, when the HARQ-ACK of the SPS PDSCH and a first type of UCI are transmitted in a same time unit, in the time unit, the determining the one PUCCH resource for transmitting the HARQ-ACK of the SPS PDSCH from the at least one PUCCH resource, includes:

when the at least one PUCCH resource further includes at least one second type of PUCCH resource, determining one first type of PUCCH resource as the PUCCH resource for transmitting the HARQ-ACK of the SPS PDSCH and the UCI from the at least one PUCCH resource if the second type of PUCCH resource which does not overlap with a resource of the first type of UCI in a time domain does not exist in the at least one PUCCH resource;

where the second type of PUCCH resource is a PUCCH resource for carrying no more than 2 bits of information;

the receiving the HARQ-ACK of the SPS PDSCH on the determined PUCCH resource, includes:

receiving the HARQ-ACK of the SPS PDSCH and the first type of UCI on the determined first type of PUCCH resource.

Optionally, when the HARQ-ACK of the SPS PDSCH and a first type of UCI are transmitted in a same time unit, in the time unit, the determining the one PUCCH resource for transmitting the HARQ-ACK of the SPS PDSCH from the at least one PUCCH resource, includes:

when the at least one PUCCH resource only includes the first type of PUCCH resource, determining one first type of PUCCH resource as the PUCCH resource for transmitting the HARQ-ACK of the SPS PDSCH and the first type of UCI;

the receiving the HARQ-ACK of the SPS PDSCH on the determined PUCCH resource, includes:

receiving the HARQ-ACK of the SPS PDSCH and the first type of UCI on the determined first type of PUCCH resource.

Optionally, when a first type of UCI does not exist in a time unit where the HARQ-ACK transmission of the SPS PDSCH is located, in the time unit, the determining the one PUCCH resource for transmitting the HARQ-ACK of the SPS PDSCH from the at least one PUCCH resource, includes:

when the at least one PUCCH resource further includes a second type of PUCCH resource, determining one second type of PUCCH resource as the PUCCH resource for transmitting the HARQ-ACK of the SPS PDSCH.

Optionally, when a first type of UCI does not exist in a time unit where the HARQ-ACK of the SPS PDSCH is located, in the time unit, the determining the one PUCCH resource for transmitting the HARQ-ACK of the SPS PDSCH from the at least one PUCCH resource, includes:

when the at least one PUCCH resource only includes the first type of PUCCH resource, determining one first type of PUCCH resource as the PUCCH resource for transmitting the HARQ-ACK of the SPS PDSCH.

Optionally, the determining one first type of PUCCH resource as the PUCCH resource for transmitting the HARQ-ACK of the SPS PDSCH and the first type of UCI from the at least one PUCCH resource, includes:

when the at least one PUCCH resource includes at least two first type of PUCCH resources, determining any one of the following first type of PUCCH resources as the PUCCH resource for transmitting the HARQ-ACK of the SPS PDSCH and the first type of UCI from the at least one PUCCH resource:

one first type of PUCCH resource indicated by a PUCCH resource indication (PRI) in a physical downlink control channel (PDCCH) indicating SPS PDSCH activation;

one first type of PUCCH resource with the lowest carrying capacity being capable of carrying the HARQ-ACK of the SPS PDSCH and the first UCI without exceeding a set code rate, where different first type of PUCCH resources have different carrying capacities;

one first type of PUCCH resource with the largest carrying capacity when all the first type of PUCCH resources in the at least one PUCCH resource being not capable of carrying the HARQ-ACK of the SPS PDSCH and the first UCI without exceeding the set code rate, where different first type of PUCCH resources have different carrying capacities;

one first type of PUCCH resource with the smallest index;

the first one of the first type of PUCCH resources.

Optionally, the determining one second type of PUCCH resource as the PUCCH resource for transmitting the HARQ-ACK of the SPS PDSCH, includes:

when the at least one PUCCH resource includes at least two second type of PUCCH resources, determining any one of the following second type of PUCCH resources as the PUCCH resource for transmitting the HARQ-ACK of the SPS PDSCH from the at least two second type of PUCCH resources:

one second type of PUCCH resource indicated by a PRI in a PDCCH indicating SPS PDSCH activation;

the second type of PUCCH resource with the smallest index;

the first one of the second type of PUCCH resources.

Optionally, before the determining one PUCCH resource for transmitting HARQ-ACK of a SPS PDSCH from the at least one PUCCH resource, the receiving method further includes:

judging whether a transmission opportunity of the HARQ-ACK of the SPS PDSCH overlaps with a transmission opportunity of the first type of UCI;

the determining the one PUCCH resource for transmitting the HARQ-ACK of the SPS PDSCH from the at least one PUCCH resource, includes:

when the transmission opportunity of the HARQ-ACK of the SPS PDSCH and the transmission opportunity of the first type of UCI overlap, determining one PUCCH resource for transmitting the HARQ-ACK of the SPS PDSCH from the at least one PUCCH resource.

Optionally, before the determining the one PUCCH resource for transmitting the HARQ-ACK of the SPS PDSCH from the at least one PUCCH resource, the receiving method further includes:

judging whether the HARQ-ACK of the SPS PDSCH and the first type of UCI are supported to be transmitted simultaneously;

the determining the one PUCCH resource for transmitting the HARQ-ACK of the SPS PDSCH from the at least one PUCCH resource, includes:

when the HARQ-ACK of the SPS PDSCH and the first type of UCI are supported to be transmitted simultaneously, determining one PUCCH resource for transmitting the HARQ-ACK of the SPS PDSCH from the at least one PUCCH resource.

Optionally, before the determining one PUCCH resource for transmitting HARQ-ACK of a SPS PDSCH from the at least one PUCCH resource, the receiving method further includes:

determining the at least one PUCCH resource according to a configuration signaling.

Optionally, the preset PUCCH resource in the at least one PUCCH resource is any one of the following:

the PUCCH resource with the smallest index in the at least one PUCCH resource;

the first one of the at least one PUCCH resource;

a PUCCH resource determined by a PRI in a PDCCH indicating SPS PDSCH activation;

a second type of PUCCH resource when the at least one PUCCH resource further includes the second type of PUCCH resource;

the second type of PUCCH resource with the smallest index when the at least one PUCCH resource further includes at least two second type of PUCCH resources;

the first one of the second type of PUCCH resources when the at least one PUCCH resource further includes at least two second type of PUCCH resources.

Optionally, the first type of UCI includes any one or more of the following:

channel state information (CSI);

schedule request (SR).

Optionally, the first type of PUCCH resource is any one of the following:

PUCCH format 2 resource;

PUCCH format 3 resource;

PUCCH format 4 resource.

Optionally, the second type of PUCCH resource is any one of the following:

PUCCH format 0 resource;

PUCCH format 1 resource.

Optionally, the time unit is any one of the following:

one sub-frame;

one slot;

one mini-slot.

In a third aspect, a terminal is provided, including:

a determining module, configured to determine one PUCCH resource for transmitting HARQ-ACK of a SPS PDSCH from at least one PUCCH resource for transmitting the HARQ-ACK of the SPS PDSCH, where the at least one PUCCH resource includes at least one first type of PUCCH resource, and the first type of PUCCH resource is a PUCCH resource for carrying more than 2 bits of information; and a sending module, configured to send the HARQ-ACK of the SPS PDSCH on the determined PUCCH resource.

Optionally, when the HARQ-ACK of the SPS PDSCH and a first type of uplink control information (UCI) are transmitted in a same time unit, in the time unit, the determining module is further configured to:
when a preset PUCCH resource in the at least one PUCCH resource and a resource of the first type of UCI do not overlap in a time domain, determine the preset PUCCH resource as the PUCCH resource for transmitting the HARQ-ACK of the SPS PDSCH.

Optionally, when the HARQ-ACK of the SPS PDSCH and a first type of UCI are transmitted in a same time unit, in the time unit, the determining module is further configured to:
when a preset PUCCH resources in the at least one PUCCH resource and a resource of the first type of UCI overlap in a time domain, determine one first type of PUCCH resource as the PUCCH resource for transmitting the HARQ-ACK of the SPS PDSCH and the first type of UCI from the at least one PUCCH resource;

The sending module is further configured to:
send the HARQ-ACK of the SPS PDSCH and the first type of UCI on the determined first type of PUCCH resource.

Optionally, when the HARQ-ACK of the SPS PDSCH and a first type of UCI are transmitted in a same time unit, in the time unit, the determining module is further configured to:
when the at least one PUCCH resource further includes at least one second type of PUCCH resource, determine one second type of PUCCH resource which does not overlap with a resource of the first type of UCI in a time domain as the PUCCH resource for transmitting the HARQ-ACK of the SPS PDSCH if the at least one second type of PUCCH resource which does not overlap with the resource of the first type of UCI in the time domain exists in the at least one PUCCH resource;
where the second type of PUCCH resource is a PUCCH resource for carrying no more than 2 bits of information.

Optionally, when the HARQ-ACK of the SPS PDSCH and a first type of UCI are transmitted in a same time unit, in the time unit, the determining module is further configured to:
when the at least one PUCCH resource further includes at least one second type of PUCCH resource, determine one first type of PUCCH resource as the PUCCH resource for transmitting the HARQ-ACK of the SPS PDSCH and the UCI from the at least one PUCCH resource if the second type of PUCCH resource which does not overlap with a resource of the first type of UCI in a time domain does not exist in the at least one PUCCH resource;
where the second type of PUCCH resource is a PUCCH resource for carrying no more than 2 bits of information;

The sending module is further configured to:
send the HARQ-ACK of the SPS PDSCH and the first type of UCI on the determined first type of PUCCH resource.

Optionally, when the HARQ-ACK of the SPS PDSCH and a first type of UCI are transmitted in a same time unit, in the time unit, the determining module is further configured to:
when the at least one PUCCH resource only includes the first type of PUCCH resource, determine one first type of PUCCH resource as the PUCCH resource for transmitting the HARQ-ACK of the SPS PDSCH and the first type of UCI;

The sending module is further configured to:
send the HARQ-ACK of the SPS PDSCH and the first type of UCI on the determined first type of PUCCH resource.

Optionally, when a first type of UCI does not exist in a time unit where the HARQ-ACK transmission of the SPS PDSCH is located, in the time unit, the determining module is further configured to:
when the at least one PUCCH resource further includes a second type of PUCCH resource, determine one second type of PUCCH resource as the PUCCH resource for transmitting the HARQ-ACK of the SPS PDSCH.

Optionally, when a first type of UCI does not exist in a time unit where the HARQ-ACK transmission of the SPS PDSCH is located, in the time unit, the determining module is further configured to:
when the at least one PUCCH resource only includes the first type of PUCCH resource, determine one first type of PUCCH resource as the PUCCH resource for transmitting the HARQ-ACK of the SPS PDSCH.

Optionally, the determining module determines one first type of PUCCH resource as the PUCCH resource for transmitting the HARQ-ACK of the SPS PDSCH and the first type of UCI from the at least one PUCCH resource, includes:
when the at least one PUCCH resource includes at least two first type of PUCCH resources, determine any one of the following first type of PUCCH resources as the PUCCH resource for transmitting the HARQ-ACK of the SPS PDSCH and the first type of UCI from the at least one PUCCH resource:
one first type of PUCCH resource indicated by a PUCCH resource indication (PRI) in a physical downlink control channel (PDCCH) indicating SPS PDSCH activation;
one first type of PUCCH resource with the lowest carrying capacity being capable of carrying the HARQ-ACK of the SPS PDSCH and the first UCI without exceeding a set code rate, where different first type of PUCCH resources have different carrying capacities;
one first type of PUCCH resource with the largest carrying capacity when all the first type of PUCCH resources in the at least one PUCCH resource being not capable of carrying the HARQ-ACK of the SPS PDSCH and the first UCI without exceeding the set code rate, where different first type of PUCCH resources have different carrying capacities;
one first type of PUCCH resource with the smallest index;
the first one of the first type of PUCCH resources.

Optionally, the determining module determines one second type of PUCCH resource as the PUCCH resource for transmitting the HARQ-ACK of the SPS PDSCH, includes:
when the at least one PUCCH resource includes at least two second type of PUCCH resources, determine any one of the following second type of PUCCH resources as the PUCCH resource for transmitting the HARQ-ACK of the SPS PDSCH from the at least two second type of PUCCH resources:
one second type of PUCCH resource indicated by a PRI in a PDCCH indicating SPS PDSCH activation;
the second type of PUCCH resource with the smallest index;
the first one of the second type of PUCCH resources.

Optionally, before determining one PUCCH resource for transmitting HARQ-ACK of a SPS PDSCH from at least one PUCCH resource, the determining module is further configured to:

judge whether a transmission opportunity of the HARQ-ACK of the SPS PDSCH overlaps with a transmission opportunity of the first type of UCI;

The determining module is further configured to:

when the transmission opportunity of the HARQ-ACK of the SPS PDSCH and the transmission opportunity of the first type of UCI overlap, determine one PUCCH resource for transmitting the HARQ-ACK of the SPS PDSCH from the at least one PUCCH resource.

Optionally, before determining one PUCCH resource for transmitting HARQ-ACK of a SPS PDSCH from at least one PUCCH resource, the determining module is further configured to:

judge whether the HARQ-ACK of the SPS PDSCH and the first type of UCI are supported to be transmitted simultaneously;

The determining module is further configured to:

when the HARQ-ACK of the SPS PDSCH and the first type of UCI are supported to be transmitted simultaneously, determine one PUCCH resource for transmitting the HARQ-ACK of the SPS PDSCH from the at least one PUCCH resource.

Optionally, before determining one PUCCH resource for transmitting HARQ-ACK of a SPS PDSCH from at least one PUCCH resource, the determining module is further configured to:

determine the at least one PUCCH resource according to a configuration signaling.

Optionally, the preset PUCCH resource in the at least one PUCCH resource is any one of the following:

the PUCCH resource with the smallest index in the at least one PUCCH resource;

the first one of the at least one PUCCH resource;

a PUCCH resource determined by a PRI in a PDCCH indicating SPS PDSCH activation;

a second type of PUCCH resource when the at least one PUCCH resource further includes the second type of PUCCH resource;

the second type of PUCCH resource with the smallest index when the at least one PUCCH resource further includes at least two second type of PUCCH resources;

the first one of the second type of PUCCH resources when the at least one PUCCH resource further includes at least two second type of PUCCH resources.

Optionally, the first type of UCI includes any one or more of the following:

channel state information (CSI);

schedule request (SR).

Optionally, the first type of PUCCH resource is any one of the following:

PUCCH format 2 resource;

PUCCH format 3 resource;

PUCCH format 4 resource.

Optionally, the second type of PUCCH resource is any one of the following:

PUCCH format 0 resource;

PUCCH format 1 resource.

Optionally, the time unit is any one of the following:

one sub-frame;

one slot;

one mini-slot.

In a fourth aspect, a base station is provided, including:

a determining module, configured to determine one PUCCH resource for transmitting HARQ-ACK of a SPS PDSCH from at least one PUCCH resource for transmitting the HARQ-ACK of the SPS PDSCH, where the at least one PUCCH resource includes at least one first type of PUCCH resource, and the first type of PUCCH resource is a PUCCH resource for carrying more than 2 bits of information; and a receiving module, configured to receive the HARQ-ACK of the SPS PDSCH on the determined PUCCH resource.

Optionally, when the HARQ-ACK of the SPS PDSCH and a first type of uplink control information (UCI) are transmitted in a same time unit, in the time unit, the determining module is further configured to:

when a preset PUCCH resource in the at least one PUCCH resource and a resource of the first type of UCI do not overlap in a time domain, determine the preset PUCCH resource as the PUCCH resource for transmitting the HARQ-ACK of the SPS PDSCH.

Optionally, when the HARQ-ACK of the SPS PDSCH and a first type of UCI are transmitted in a same time unit, in the time unit, the determining module is further configured to:

when a preset PUCCH resources in the at least one PUCCH resource and a resource of the first type of UCI overlap in a time domain, determine one first type of PUCCH resource as the PUCCH resource for transmitting the HARQ-ACK of the SPS PDSCH and the first type of UCI from the at least one PUCCH resource;

The receiving module is further configured to:

receive the HARQ-ACK of the SPS PDSCH and the first type of UCI on the determined first type of PUCCH resource.

Optionally, when the HARQ-ACK of the SPS PDSCH and a first type of UCI are transmitted in a same time unit, in the time unit, the determining module is further configured to:

when the at least one PUCCH resource further includes at least one second type of PUCCH resource, determine one second type of PUCCH resource which does not overlap with a resource of the first type of UCI in a time domain as the PUCCH resource for transmitting the HARQ-ACK of the SPS PDSCH if the at least one second type of PUCCH resource which does not overlap with the resource of the first type of UCI in the time domain exists in the at least one PUCCH resource;

where the second type of PUCCH resource is a PUCCH resource for carrying no more than 2 bits of information.

Optionally, when the HARQ-ACK of the SPS PDSCH and a first type of UCI are transmitted in a same time unit, in the time unit, the determining module is further configured to:

when the at least one PUCCH resource further includes at least one second type of PUCCH resource, determine one first type of PUCCH resource as the PUCCH resource for transmitting the HARQ-ACK of the SPS PDSCH and the UCI from the at least one PUCCH resource if the second type of PUCCH resource which does not overlap with a resource of the first type of UCI in a time domain does not exist in the at least one PUCCH resource;

where the second type of PUCCH resource is a PUCCH resource for carrying no more than 2 bits of information;

The receiving module is further configured to:

receive the HARQ-ACK of the SPS PDSCH and the first type of UCI on the determined first type of PUCCH resource.

Optionally, when the HARQ-ACK of the SPS PDSCH and a first type of UCI are transmitted in a same time unit, in the time unit, the determining module is further configured to:
when the at least one PUCCH resource only includes the first type of PUCCH resource, determine one first type of PUCCH resource as the PUCCH resource for transmitting the HARQ-ACK of the SP SPDSCH and the first type of UCI;
The receiving module is further configured to:
receive the HARQ-ACK of the SPS PDSCH and the first type of UCI on the determined first type of PUCCH resource.

Optionally, when a first type of UCI does not exist in a time unit where the HARQ-ACK transmission of the SPS PDSCH is located, in the time unit, the determining module is further configured to:
when the at least one PUCCH resource further includes a second type of PUCCH resource, determine one second type of PUCCH resource as the PUCCH resource for transmitting the HARQ-ACK of the SPS PDSCH.

Optionally, when a first type of UCI does not exist in a time unit where the HARQ-ACK transmission of the SPS PDSCH is located, in the time unit, the determining module is further configured to:
when the at least one PUCCH resource only includes the first type of PUCCH resource, determine one first type of PUCCH resource as the PUCCH resource for transmitting the HARQ-ACK of the SPS PDSCH.

Optionally, the determining module determines one first type of PUCCH resource as the PUCCH resource for transmitting the HARQ-ACK of the SPS PDSCH and the first type of UCI from the at least one PUCCH resource, includes:
when the at least one PUCCH resource includes at least two first type of PUCCH resources, determine any one of the following first type of PUCCH resources as the PUCCH resource for transmitting the HARQ-ACK of the SPS PDSCH and the first type of UCI from the at least one PUCCH resource:
one first type of PUCCH resource indicated by a PUCCH resource indication (PRI) in a physical downlink control channel (PDCCH) indicating SPS PDSCH activation;
one first type of PUCCH resource with the lowest carrying capacity being capable of carrying the HARQ-ACK of the SPS PDSCH and the first UCI without exceeding a set code rate, where different first type of PUCCH resources have different carrying capacities;
one first type of PUCCH resource with the largest carrying capacity when all the first type of PUCCH resources in the at least one PUCCH resource being not capable of carrying the HARQ-ACK of the SPS PDSCH and the first UCI without exceeding the set code rate, where different first type of PUCCH resources have different carrying capacities;
one first type of PUCCH resource with the smallest index;
the first one of the first type of PUCCH resources.

Optionally, the determining module determines one second type of PUCCH resource as the PUCCH resource for transmitting the HARQ-ACK of the SPS PDSCH, includes:
when the at least one PUCCH resource includes at least two second type of PUCCH resources, determine any one of the following second type of PUCCH resources as the PUCCH resource for transmitting the HARQ-ACK of the SPS PDSCH from the at least two second type of PUCCH resources:
one second type of PUCCH resource indicated by a PRI in a PDCCH indicating SPS PDSCH activation;
the second type of PUCCH resource with the smallest index;
the first one of the second type of PUCCH resources.

Optionally, before determining one PUCCH resource for transmitting HARQ-ACK of a SPS PDSCH from at least one PUCCH resource, the determining module is further configured to:
judge whether a transmission opportunity of the HARQ-ACK of the SPS PDSCH overlaps with a transmission opportunity of the first type of UCI;
the determining module determines one PUCCH resource for transmitting HARQ-ACK of a SPS PDSCH from at least one PUCCH resource, includes:
when the transmission opportunity of the HARQ-ACK of the SPS PDSCH and the transmission opportunity of the first type of UCI overlap, determine one PUCCH resource for transmitting the HARQ-ACK of the SPS PDSCH from the at least one PUCCH resource.

Optionally, before determining one PUCCH resource for transmitting HARQ-ACK of a SPS PDSCH from at least one PUCCH resource, the determining module is further configured to:
judge whether the HARQ-ACK of the SPS PDSCH and the first type of UCI are supported to be transmitted simultaneously;
the determining module determines one PUCCH resource for transmitting HARQ-ACK of a SPS PDSCH from at least one PUCCH resource, includes:
when the HARQ-ACK of the SPS PDSCH and the first type of UCI are supported to be transmitted simultaneously, determine one PUCCH resource for transmitting the HARQ-ACK of the SPS PDSCH from the at least one PUCCH resource.

Optionally, before determining one PUCCH resource for transmitting HARQ-ACK of a SPS PDSCH from at least one PUCCH resource, the determining module is further configured to:
determine the at least one PUCCH resource according to a configuration signaling.

Optionally, the preset PUCCH resource in the at least one PUCCH resource is any one of the following:
the PUCCH resource with the smallest index in the at least one PUCCH resource;
the first one of the at least one PUCCH resource;
a PUCCH resource determined by a PRI in a PDCCH indicating SPS PDSCH activation;
a second type of PUCCH resource when the at least one PUCCH resource further includes the second type of PUCCH resource;
the second type of PUCCH resource with the smallest index when the at least one PUCCH resource further includes at least two second type of PUCCH resources;
the first one of the second type of PUCCH resources when the at least one PUCCH resource further includes at least two second type of PUCCH resources.

Optionally, the first type of UCI includes any one or more of the following:
channel state information (CSI);
schedule request (SR).

Optionally, the first type of PUCCH resource is any one of the following:
PUCCH format 2 resource;
PUCCH format 3 resource;
PUCCH format 4 resource.

Optionally, the second type of PUCCH resource is any one of the following:
PUCCH format 0 resource;
PUCCH format 1 resource.
Optionally, the one time unit is any one of the following:
one sub-frame;
one slot;
one mini-slot.

A fifth aspect further provides a terminal including: a processor, a memory, and programs stored on the memory and executable on the processor, when the programs are executed by the processor, the steps of the above HARQ-ACK sending method are implemented.

A sixth aspect further provides a base station including; a processor, a memory, and programs stored on the memory and executable on the processor, when the programs are executed by the processor, the steps of the above HARQ-ACK receiving method are implemented.

A seventh aspect further provides a computer-readable storage medium storing computer programs thereon, when the computer programs are executed by a processor, the steps in the above HARQ-ACK sending method are implemented; alternatively, when the computer programs are executed by the processor the steps in the above HARQ-ACK receiving method are implemented.

In the embodiments of the present disclosure, one PUCCH resource for transmitting HARQ-ACK of a SPS PDSCH is determined from at least one PUCCH resource for transmitting the HARQ-ACK of the SPS PDSCH, where the at least one PUCCH resource includes at least one first type of PUCCH resource, and the first type of PUCCH resource is a PUCCH resource for carrying more than 2 bits of information; and the HARQ-ACK of the SPS PDSCH is sent on the determined PUCCH resource, a transmission resource can be flexibly selected, when a plurality of PUCCH resources conflict, an appropriate PUCCH resource can be selected for simultaneous transmission, any UCI does not need to be dropped, a base station is guaranteed to obtain various UCIs in time, the UCI transmission efficiency is improved, and the system performance is improved.

DETAILED DESCRIPTION

Figure 1:
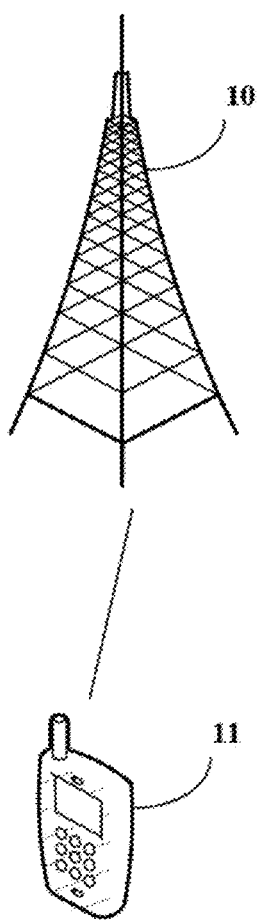
FIG. 1 is a schematic architectural diagram of a radio communication system provided by an embodiment of the present disclosure.

The specific implementation modes of the present disclosure are described in further detail below in conjunction with the accompanying drawings and embodiments. The following embodiments serve to illustrate the present disclosure, but are not intended to limit the scope of the present disclosure.

The terms "include" and "comprise" and any variations thereof in the description and claims of the present application, are intended to cover a non-exclusive inclusion, such that a process, method, system, product, or device that includes a list of steps or units is not necessarily limited to those steps or units expressly listed, but may include steps or units that are not expressly listed or other steps or units inherent to the process, method, product or device. In addition, the use of "and/or" in the specification and claims means that at least one of the connected objects, such as A and/or B, includes three instances of only A, only B, and both A and B.

In the embodiments of the present disclosure, the words "exemplary" or "for example" are used to mean serving as an example, instance, or illustration. Any embodiment or design described as "exemplary" or "for example" in the embodiments of the present disclosure is not to be construed as preferred or advantageous over other embodiments or designs. Rather, the words "exemplary" or "for example" are used to intend to present related concepts in a specific manner.

The techniques described herein are not limited to Long Time Evolution (LTE)/LTE-Advanced (LTE-A) systems, and may also be used in various radio communication systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA) and other systems. The terms "system" and "network" are often used interchangeably. The CDMA system may implement radio technologies such as CDMA 2000, Universal Terrestrial Radio Access (UTRA). The UTRA includes Wideband Code Division Multiple Access (WCDMA) and other CDMA variants. The TDMA system may implement radio technologies such as Global System for Mobile Communications (GSM). The OFDMA system may implement radio technologies such as Ultra Mobile Broadband (UMB), Evolution-UTRA (E-UTRA), IEEE 802.11 (Wi-Fi), IEEE 802.16 (WiMAX), IEEE 802.20, Flash-OFDM. The UTRA and the E-UTRA are part of Universal Mobile Telecommunications System (UMTS). The LTE and more advanced LTEs (such as LTE-A) are new UMTS versions using the E-UTRA. The UTRA, the E-UTRA, the UMTS, the LTE, the LTE-A and the GSM are described in documents from an organization named "3rd Generation Partnership Project" (3GPP). The CDMA 2000 and the UMB are described in documents from an organization named "3rd Generation Partnership Project 2" (3GPP2). The techniques described herein may be used for both the above-mentioned systems and radio technologies and for other systems and radio technologies.

With the development and the change of mobile communication service demand, many organizations such as the International Telecommunication Union (ITU) began to study new radio access technologies (New RAT, i.e. NR), such as 5 Generation New RAT (5 GNR). Five PUCCH formats are defined in NR, where a time domain of PUCCH format 0 or 2 occupies only 1 to 2 symbols, which can be called a short PUCCH format, and can be used for a HARQ-ACK feedback of service requiring low latency to reduce the feedback latency. PUCCH format 1/3/4 can be called a long PUCCH format due to the fact that a time domain occupies 4 to 14 symbols, and can achieve the compromise requirement of latency and uplink coverage. The symbols are orthogonal frequency division multiplexing (OFDM) symbols or single-carrier frequency-division multiple access (SC-FDMA) symbols or discrete fourier transform-spread orthogonal frequency division multiplexing (DFT-s-OFDM) symbols.

When a terminal is configured with a SPS PDSCH, it is necessary to configure a transmission interval and a configured scheduling (CS)-Radio Network Temporary Identifier (RNTI) for the SPS PDSCH, the CS-RNTI is used to identify a Physical Downlink Control Channel (PDCCH) corresponding to a SPS service, e.g. a PDCCH indicating downlink SPS resource activation, a PDCCH updating the SPS PDSCH transmission configuration, a PDCCH scheduling retransmission of the SPS PDSCH. When the PDCCH indicating downlink SPS resource activation is received, corresponding SPS PDSCH transmission is triggered. That is, a transmission position of a subsequent SPS PDSCH is determined according to a pre-configured transmission interval, a transmission position of the PDCCH indicating downlink SPS resource activation, and scheduling timing between the PDCCH and the PDSCH, and transmission configuration information (such as a modulation and coding scheme (MCS), frequency domain resources) of the SPS PDSCH is notified in the PDCCH indicating downlink SPS resource activation.

After receiving the SPS PDSCH, the terminal sends HARQ-ACK feedback information of the SPS PDSCH through the PUCCH or the PUSCH so as to inform a base station whether the SPS PDSCH transmission is correctly received. The terminal can determine an uplink transmission position for transmitting the HARQ-ACK according to HARQ-ACK feedback timing, and the HARQ-ACK feedback timing can be defined as an interval between a reference slot corresponding to the PDSCH and a slot of the PUCCH carrying the HARQ-ACK thereof and is determined through one HARQ-ACK timing value, the HARQ-ACK timing value may be expressed as a K1 value, indicated by a HARQ-ACK timing indication field in the PDCCH indicating downlink SPS resource activation, or pre-configured by a higher layer signaling. The SPS PDSCH performs the transmission at a corresponding position according to the configuration, and determines a corresponding position for the HARQ-ACK feedback according to the HARQ-ACK feedback timing. It should be noted that, for the definition of the HARQ-ACK feedback timing, considering that the uplink transmission carrying the HARQ-ACK may be different from the baseband numerology of the PDSCH, e.g. different subcarrier intervals, a reference slot needs to be defined to find a slot boundary corresponding to the numerology of the uplink transmission carrying the HARQ-ACK as a reference point for determining the HARQ-ACK transmission slot.

CSI transmission can be further configured in the NR system, a time domain transmission position of the CSI can be determined according to a pre-configured transmission period and an offset position, and transmission is performed at a fixed position. The CSI transmitted on the PUCCH may be Periodic-CSI (P-CSI) or Semi Persistent CSI (SP-CSI), where the SP-CSI needs to be activated to start periodic transmission according to a configured transmission position. Based on the foregoing background, the embodiments of the present disclosure are described below in conjunction with the accompanying drawings.

Refer to FIG. 1, which is a schematic architectural diagram of a radio communication system provided by an embodiment of the present disclosure, as shown in FIG. 1, the radio communication may include: a base station 10 and a terminal 11 which can be communicated with the base station 10 (transmitting a signaling or transmitting data). In practice, the connection between the base station 10 and the terminal 11 may be a wireless connection, and in order to easily and intuitively indicate the connection relationship between the respective devices, a solid line is shown in FIG. 1. It should be noted that the above communication system may include a plurality of terminals 11 with which the base station 10 may be communicated.

It is noted that the base station 10 in the above communication system may be a commonly used base station, an evolved node base station (eNB), network equipment in the 5G system (e.g. a next generation node base station (gNB)) or a transmission and reception point (TRP)), etc.

The terminal 11 provided by the embodiment of the present disclosure may be a mobile phone, a tablet computer, a tablet computer, an Ultra-Mobile Personal Computer (UMPC), a netbook or a Personal Digital Assistant (PDA), etc.

Figure 2:
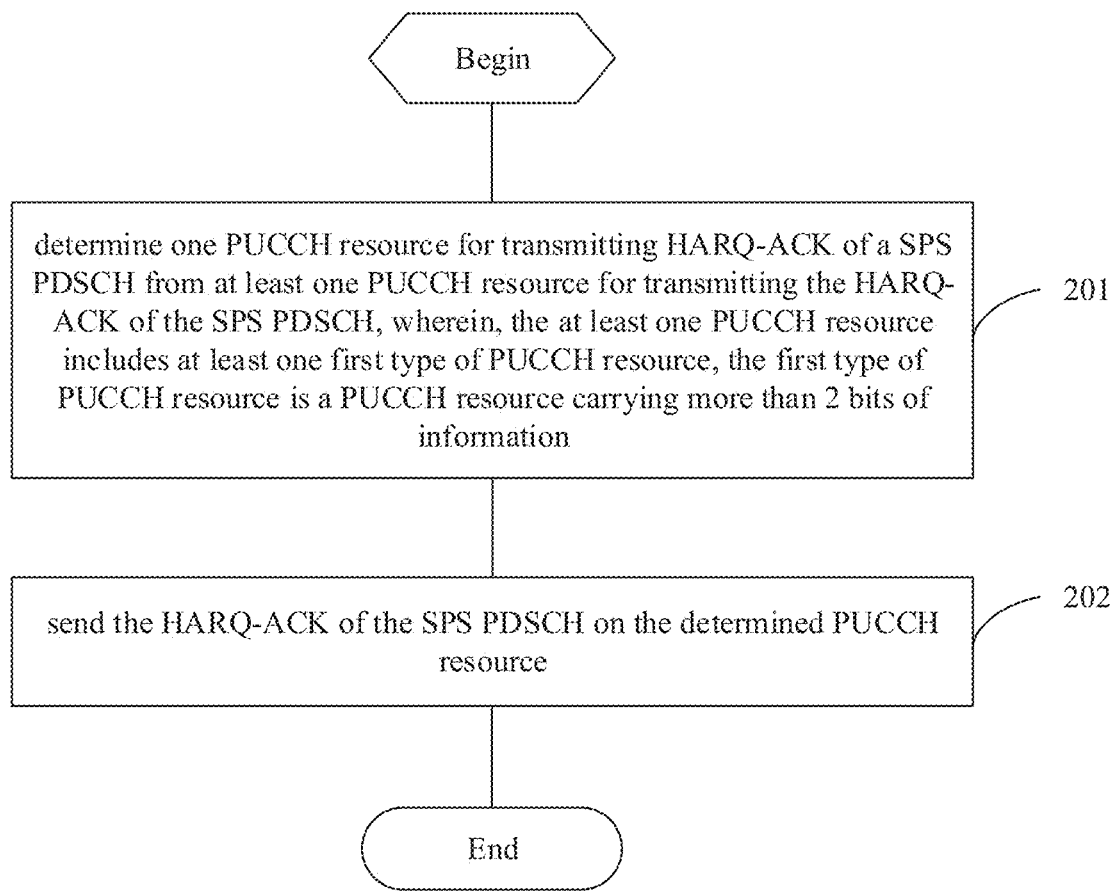
FIG. 2 is a flow chart of a HARQ-ACK sending method provided by an embodiment of the present disclosure.

FIG. 2 is a flow chart of an HARQ-ACK sending method provided by an embodiment of the present disclosure, and referring to FIG. 2, an execution main body of the HARQ-ACK sending method is the terminal, and the specific steps are as follows:

Step 201, one PUCCH resource for transmitting HARQ-ACK of a SPS PDSCH is determined from at least one PUCCH resource for transmitting the HARQ-ACK of the SPS PDSCH, where the at least one PUCCH resource includes at least one first type of PUCCH resource, and the first type of PUCCH resource is a PUCCH resource for carrying more than 2 bits of information.

Step 202, the HARQ-ACK of the SPS PDSCH is sent on the determined PUCCH resource.

In the embodiment of the present disclosure, when HARQ-ACK of a SPS PDSCH is needed to transmit, the terminal determines one PUCCH resource for transmitting the HARQ-ACK of the SPS PDSCH from the at least one PUCCH resource for transmitting the HARQ-ACK of the SPS PDSCH, and then sends the HARQ-ACK of the SPS PDSCH on the determined PUCCH resource. The at least one PUCCH resource includes at least one first type of PUCCH resource, and the first type of PUCCH resource is a PUCCH resource for carrying more than 2 bits of information, for example, the first type of PUCCH resource may be a PUCCH format 2 resource, or a PUCCH format 3 resource, or a PUCCH format 4 resource.

The terminal may determine one PUCCH resource for transmitting the HARQ-ACK of the SPS PDSCH from the at least one PUCCH resource based on one or more of the following: condition of a PUCCH resource included in the at least one PUCCH resource, whether the HARQ-ACK of the SPS PDSCH and a first type of UCI are transmitted in a same time unit. The condition of the PUCCH resource included in the at least one PUCCH resource may include one or more of the following: the type of the PUCCH resource included in the at least one PUCCH resource, overlapping situation of the PUCCH resource included in the at least one PUCCH resource and a PUCCH resource for carrying the first type of UCI, and carrying capacity of the PUCCH resource included in the at least one PUCCH resource. The first type of UCI may include CSI and/or a SR.

In the embodiment of the present disclosure, the at least one PUCCH resource may be at least one PUCCH resource pre-configured for the terminal to transmit the HARQ-ACK of the SPS PDSCH, e.g. is configured via a configuration signaling (such as a higher layer signaling or Downlink Control Information (DCI) signaling).

Optionally, when the HARQ-ACK of the SPS PDSCH and the first type of UCI are transmitted in a same time unit, in the time unit, the determining the one PUCCH resource for transmitting HARQ-ACK of a SPS PDSCH from at least one PUCCH resource, includes:
when a preset PUCCH resource in the at least one PUCCH resource and a resource of the first type of UCI do not overlap in a time domain, the preset PUCCH resource is determined as the PUCCH resource for transmitting the HARQ-ACK of the SPS PDSCH.

When the HARQ-ACK of the SPS PDSCH and the first type of uplink control information (UCI) are transmitted in a same time unit, the terminal judges whether the preset PUCCH resource in the at least one PUCCH resource and the resource of the first type of UCI overlap in the time domain, and when the preset PUCCH resource in the at least one PUCCH resource and the resource of the first type of UCI do not overlap in the time domain, the preset PUCCH resource is determined as the PUCCH resource for transmitting the HARQ-ACK of the SPS PDSCH.

The preset PUCCH resource may be a default PUCCH resource for transmitting the HARQ-ACK of the SPS PDSCH, i.e. when there is no other provision or configuration, the preset PUCCH resource is used for transmitting the HARQ-ACK of the SPS PDSCH.

When the at least one PUCCH resource further includes at least one second type of PUCCH resource, and the second type of PUCCH resource is a PUCCH resource (for example, a PUCCH format 0 or 1 resource) carrying no more than 2 bits of information, the preset PUCCH resource may be the first one of the at least one PUCCH resource or the PUCCH resource with the smallest index, may also be a PUCCH resource determined by a PRI in a PDCCH indicating SPS PDSCH activation, may further be the second type of PUCCH resource. It will be appreciated that when the at least one PUCCH resource further includes at least two second type of PUCCH resources, the preset PUCCH resource is the first one of the second type of PUCCH resources or the second type of PUCCH resource with the smallest index.

When the at least one PUCCH resource only includes the first type of PUCCH resource, the preset PUCCH resource may be the first one of the at least one PUCCH resource or the PUCCH resource with the smallest index, may also be the PUCCH resource determined by the PRI in the PDCCH indicating the SPS PDSCH activation. It will be appreciated that when the at least one PUCCH resource includes only one first type of PUCCH resource, the preset PUCCH resource is the one first type of PUCCH resource.

Optionally, when the HARQ-ACK of the SPS PDSCH and the first type of UCI are transmitted in a same time unit, in the time unit, the determining the one PUCCH resource for transmitting HARQ-ACK of a SPS PDSCH from at least one PUCCH resource, includes:
when the preset PUCCH resource in the at least one PUCCH resource and the resource of the first type of UCI overlap in the time domain, one first type of PUCCH resource is determined as the PUCCH resource for transmitting the HARQ-ACK of the SPS PDSCH and the first type of UCI from the at least one PUCCH resource;
the sending the HARQ-ACK of the SPS PDSCH on the determined PUCCH resource, includes:
the HARQ-ACK of the SPS PDSCH and the first type of UCI are sent on the determined first type of PUCCH resource.

It will be appreciated that when the preset PUCCH resource in the at least one PUCCH resource and the resource the first type of UCI resource overlap in the time domain, the terminal determines one first type of PUCCH resource as the PUCCH resource for transmitting the HARQ-ACK of the SPS PDSCH and the first type of UCI from the at least one PUCCH resource, and simultaneously transmit the HARQ-ACK of the SPS PDSCH and the first type of UCI on the determined first type of PUCCH resource.

Specifically, when the at least one PUCCH resource further include at least one second type of PUCCH resource, the first type of PUCCH resource in the at least one PUCCH resource is selected to transmit the HARQ-ACK of the SPS PDSCH and the first type of UCI if the preset PUCCH resource in the at least one PUCCH resource and the resource of first type of UCI resource overlap in the time domain.

When the at least one PUCCH resource only include the first type of PUCCH resource, one first type of PUCCH resource is determined as the PUCCH resource for transmitting the HARQ-ACK of the SPS PDSCH if the at least one PUCCH resource is the one first type of PUCCH resource, and the one first type of PUCCH resource and the resource of the first type of UCI do not overlap in the time domain, and the HARQ-ACK of the SPS PDSCH is transmitted on the one first type of PUCCH resource in a coding manner. One first type of PUCCH resource is determined as PUCCH resource used for transmitting the HARQ-ACK of the SPS PDSCH and the first type of UCI if the at least one PUCCH resource is the one first type of PUCCH resource, and the one first type of PUCCH resource and the resource of the first type of UCI overlap in the time domain, and the HARQ-ACK of the SPS PDSCH and the first type of UCI are transmitted on the one first type of PUCCH resource in a coding manner. It will be appreciated that the way of configuring only one first type of PUCCH resource is suitable for use when it is determined that there is always overlap between a transmission opportunity of the HARQ-ACK of the SPS PDSCH and a transmission opportunity of the first type of UCI, i.e. there is overlap between each transmission opportunity of the HARQ-ACK of the SPS PDSCH and the first type of UCI, namely, in each transmission opportunity of the HARQ-ACK of the SPS PDSCH, the HARQ-ACK of the SPS PDSCH and the first type of UCI are always required to be transmitted simultaneously, and one first type of PUCCH resource can be directly configured for simultaneously transmitting the HARQ-ACK of the SPS PDSCH and the first type of UCI.

When the at least one PUCCH resource only includes the first type of PUCCH resource and includes at least two first type of PUCCH resources, any one of the following first type of PUCCH resources is determined as the PUCCH resource for transmitting the HARQ-ACK of the SPS PDSCH and the first type of UCI from the at least one PUCCH resource if the preset PUCCH resource in the at least one PUCCH resource and the resource of the first type of UCI overlap in the time domain:
  one first type of PUCCH resource indicated by a PUCCH resource indication (PRI) in a physical downlink control channel (PDCCH) indicating SPS PDSCH activation; one first type of PUCCH resource with the lowest carrying capacity being capable of carrying the HARQ-ACK of the SPS PDSCH and the first UCI without exceeding a set code rate, where different first type of PUCCH resources have different carrying capacities, one first type of PUCCH resource with the largest carrying capacity when all the first type of PUCCH resources in the at least one PUCCH resource being not capable of carrying the HARQ-ACK of the SPS PDSCH and the first UCI without exceeding the set code rate, where different first type of PUCCH resources have different carrying capacities; one first type of PUCCH resource with the smallest index; the first one of the first type of PUCCH resources.

Optionally, when the HARQ-ACK of the SPS PDSCH and the first type of UCI are transmitted in a same time unit, in the time unit, the determining the one PUCCH resource for transmitting HARQ-ACK of a SPS PDSCH from at least one PUCCH resource, includes:
  when the at least one PUCCH resource further includes at least one second type of PUCCH resource, one second type of PUCCH resource which does not overlap with the resource of the first type of UCI resource in the time domain is determined as the PUCCH resource for transmitting the HARQ-ACK of the SPS PDSCH if the at least one second type of PUCCH resource which does not overlap with the resource of the first type of UCI in the time domain exists in the at least one PUCCH resource;
  where the second type of PUCCH resource is a PUCCH resource for carrying no more than 2 bits of information.

In the embodiment, when the at least one PUCCH resource further includes at least one second type of PUCCH resource, one second type of PUCCH resource which does not overlap with the resource of the first type of UCI in the time domain is determined as the PUCCH resource for transmitting the HARQ-ACK of the SPS PDSCH if the at least one second type of PUCCH resource which does not overlap with the resource of the first type of UCI in the time domain exists in the at least one PUCCH resource.

Optionally, when the HARQ-ACK of the SPS PDSCH and the first type of UCI are transmitted in a same time unit, in the time unit, the determining the one PUCCH resource for transmitting HARQ-ACK of a SPS PDSCH from at least one PUCCH resource, includes:
  when the at least one PUCCH resource further includes at least one second type of PUCCH resource, one first type of PUCCH resource is determined as the PUCCH resource for transmitting the HARQ-ACK of the SPS PDSCH and the UCI from the at least one PUCCH resource if the second type of PUCCH resource which does not overlap with the resource of the first type of UCI in the time domain does not exist in the at least one PUCCH resource;
  where the second type of PUCCH resource is a PUCCH resource for carrying no more than 2 bits of information;
  the sending the HARQ-ACK of the SPS PDSCH on the determined PUCCH resource, includes:
  sending the HARQ-ACK of the SPS PDSCH and the first type of UCI on the determined first type of PUCCH resource.

In the embodiment, when the at least one PUCCH resource further includes at least one second type of PUCCH resource and the second type of PUCCH resource which does not overlap with the resource of the first type of UCI in the time domain does not exist in the at least one PUCCH resource, one first type of PUCCH resource is determined as the PUCCH resource for transmitting the HARQ-ACK of the SPS PDSCH and the UCI from the at least one PUCCH resource.

Optionally, when the HARQ-ACK of the SPS PDSCH and the first type of UCI are transmitted in a same time unit, in the time unit, the determining the one PUCCH resource for transmitting HARQ-ACK of a SPS PDSCH from at least one PUCCH resource, includes:
  when the at least one PUCCH resource only includes the first type of PUCCH resource, one first type of PUCCH resource is determined as the PUCCH resource for transmitting the HARQ-ACK of the SPS PDSCH and the first type of UCI;
  the sending the HARQ-ACK of the SPS PDSCH on the determined PUCCH resource, includes:
  the HARQ-ACK of the SPS PDSCH and the first type of UCI are sent on the determined first type of PUCCH resource.

Optionally, when the first type of UCI does not exist in the time unit where the HARQ-ACK transmission of the SPS PDSCH is located, in the time unit, the determining the one PUCCH resource for transmitting HARQ-ACK of a SPS PDSCH from at least one PUCCH resource, includes:
  when the at least one PUCCH resource further includes the second type of PUCCH resource, one second type of PUCCH resource is determined as the PUCCH resource for transmitting the HARQ-ACK of the SPS PDSCH.

In the embodiment, when the first type of UCI does not exist in the time unit where the HARQ-ACK transmission of the SPS PDSCH is located, one second type of PUCCH resource is determined to be used for transmitting the HARQ-ACK of the SPS PDSCH from the at least one PUCCH resource.

Optionally, when the first type of UCI does not exist in the time unit where the HARQ-ACK transmission of the SPS PDSCH is located, in the time unit, the determining the one PUCCH resource for transmitting HARQ-ACK of a SPS PDSCH from at least one PUCCH resource, includes:
  when the at least one PUCCH resource only includes the first type of PUCCH resource, one first type of PUCCH resource is determined as the PUCCH resource for transmitting the HARQ-ACK of the SPS PDSCH.

In the embodiment, when the first type of UCI does not exist in the time unit where the HARQ-ACK transmission of the SPS PDSCH is located, one first type of PUCCH resource is determined to be used for transmitting the HARQ-ACK of the SPS PDSCH from the at least one PUCCH resource.

Optionally, the determining the one first type of PUCCH resource as the PUCCH resource for transmitting the HARQ-ACK of the SPS PDSCH and the first type of UCI from the at least one PUCCH resource, includes:

when the at least one PUCCH resource includes at least two first type of PUCCH resources, any one of the following first type of PUCCH resources is determined as the PUCCH resource for transmitting the HARQ-ACK of the SPS PDSCH and the first type UCI from the at least one PUCCH resource:

one first type of PUCCH resource indicated by the PUCCH resource indication (PRI) in the physical downlink control channel (PDCCH) indicating SPS PDSCH activation;

one first type of PUCCH resource with the lowest carrying capacity being capable of carrying the HARQ-ACK of the SPS PDSCH and the first UCI without exceeding a set code rate, where different first type of PUCCH resources have different carrying capacities;

one first type of PUCCH resource with the largest carrying capacity when all the first type of PUCCH resources in the at least one PUCCH resource being not capable carrying the HARQ-ACK of the SPS PDSCH and the first UCI without exceeding the set code rate, where different first type of PUCCH resources have different carrying capacities;

one first type of PUCCH resource with the smallest index;

the first one of the first type of PUCCH resources.

When the at least one PUCCH resource includes at least two first type of PUCCH resources, the terminal determines one first type of PUCCH resource for transmitting the HARQ-ACK of the SPS PDSCH and the first type of UCI from the at least two first type of PUCCH resources through any one of the above modes.

Optionally, the determining the one second type of PUCCH resource as the PUCCH resource for transmitting the HARQ-ACK of the SPS PDSCH, includes:

when the at least one PUCCH resource includes at least two second type of PUCCH resources, any one of the following second type of PUCCH resources is determined as the PUCCH resource for transmitting the HARQ-ACK of the SPS PDSCH from the at least two second type of PUCCH resources:

one second type of PUCCH resource indicated by the PRI in the PDCCH indicating SPS PDSCH activation;

the second type of PUCCH resources with the smallest index;

the first one of the second type of PUCCH resources.

Optionally, before one PUCCH resource for transmitting HARQ-ACK of a SPS PDSCH is determined from at least one PUCCH resource, the sending method further includes:

judging whether the transmission opportunity of the HARQ-ACK of the SPS PDSCH overlaps with the transmission opportunity of the first type of UCI;

the determining the one PUCCH resource for transmitting HARQ-ACK of a SPS PDSCH from at least one PUCCH resource, includes:

when the transmission opportunity of the HARQ-ACK of the SPS PDSCH and the transmission opportunity of the first type of UCI overlap, one PUCCH resource for transmitting the HARQ-ACK of the SPS PDSCH is determined from the at least one PUCCH resource.

The terminal judges whether the transmission opportunity of the HARQ-ACK of the SPS PDSCH overlaps with the transmission opportunity of the first type of UCI, where the existence of the overlap does not necessarily mean that the overlap exists in all the transmission opportunities, and may be that the overlap exists in partial transmission opportunities and the overlap does not exist in partial transmission opportunities.

Specifically, the time unit where the HARQ-ACK transmission of the SPS PDSCH is located can be determined according to the feedback timing (K1) of the SPS PDSCH, and the time unit where the transmission of the first type of UCI is located and the time domain position in the time unit where the transmission of the first type of UCI is located can be determined according to the high layer configuration, when the time unit of the HARQ-ACK transmission of the SPS PDSCH is the same as the time unit of the transmission of the first type of UCI, in this time unit, and whether the transmission opportunity of the HARQ-ACK of the SPS PDSCH overlaps with the transmission opportunity of the first type of UCI is further judged according to whether the preset PUCCH resource in the at least one PUCCH resource overlaps with the time domain position of the first type of the UCI in the time unit.

Optionally, before the one PUCCH resource for transmitting HARQ-ACK of a SPS PDSCH is determined from at least one PUCCH resource, the sending method further includes:

whether the HARQ-ACK of the SPS PDSCH and the first type of UCI are supported to be transmitted simultaneously;

the determining the one PUCCH resource for transmitting HARQ-ACK of a SPS PDSCH from at least one PUCCH resource, includes:

when the HARQ-ACK of the SPS PDSCH and the first type of UCI are supported to be transmitted simultaneously, one PUCCH resource for transmitting the HARQ-ACK of the SPS PDSCH is determined from the at least one PUCCH resource.

Optionally, before the one PUCCH resource for transmitting HARQ-ACK of a SPS PDSCH is determined from at least one PUCCH resource, the sending method further includes:

the at least one PUCCH resource is determined according to a configuration signaling.

In the embodiment, the at least one PUCCH resource for transmitting the HARQ-ACK of the SPS PDSCH can be pre-configured for terminal, e.g. is configured through the configuration signaling, which may include a higher layer signaling or a DCI signaling.

Optionally, the preset PUCCH resource in the at least one PUCCH resource is any one of the following:

the PUCCH resource with the smallest index in the at least one PUCCH resource;

the first one of the at least one PUCCH resource;

a PUCCH resource determined by the PRI in PDCCH indicating SPS PDSCH activation;

the second type of PUCCH resource when the at least one PUCCH resource further includes the second type of PUCCH resource;

the second type PUCCH resource with the smallest index when the at least one PUCCH resource further includes at least two second type of PUCCH resources;

the first one of the second type of PUCCH resources when the at least one PUCCH resource further includes at least two second type of PUCCH resources.

Optionally, the first type of UCI includes any one or more of the following:
channel state information (CSI);
schedule request (SR).

Optionally, the first type of PUCCH resource is any one of the following:
PUCCH format 2 resource;
PUCCH format 3 resource;
PUCCH format 4 resource.

Optionally, the second type of PUCCH resource is any one of the following:
PUCCH format 0 resource;
PUCCH format 1 resource.

Optionally, the time unit is any one of the following:
one sub-frame;
one slot;
one mini-slot.

Of course, it is not excluded to define the time unit as other lengths, e.g. N symbols.

In the embodiment, according to the HARQ-ACK sending method, one PUCCH resource for transmitting HARQ-ACK of a SPS PDSCH is determined from at least one PUCCH resource for transmitting the HARQ-ACK of the SPS PDSCH, where the at least one PUCCH resource includes at least one first type of PUCCH resource, and the first type of PUCCH resource is a PUCCH resource for carrying more than 2 bits of information; and the HARQ-ACK of the SPS PDSCH is sent on the determined PUCCH resource. A transmission resource can be flexibly selected, an appropriate PUCCH resource can be selected for simultaneous transmission when a plurality of PUCCH resources conflict, any UCI does not need to be discarded, a base station is guaranteed to obtain a plurality of UCIs in time, UCI transmission efficiency is improved, and system performance is improved.

The HARQ-ACK sending method provided by the present disclosure will be described in detail in conjunction with specific examples. While the following examples have been described in which the first type of UCI is CSI, it is to be understood that they are not intended to be limiting and that the following examples apply where the first type of UCI is CSI and/or SR.

Example One

Figure 3:
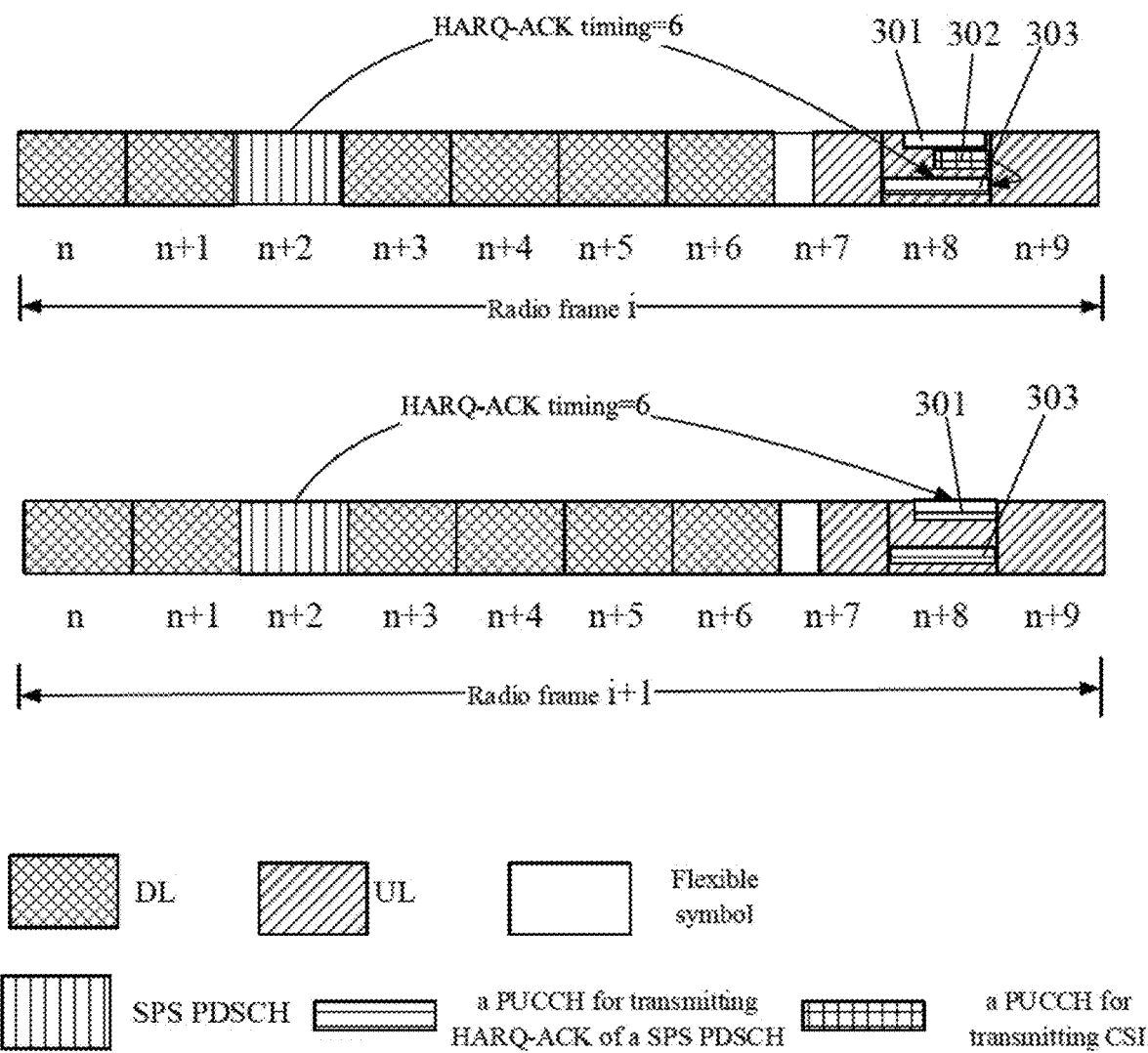
FIG. 3 is a first schematic diagram of HARQ-ACK transmission provided by an embodiment of the present disclosure.

As shown in FIG. 3, the base station configures two PUCCH resources for transmitting the HARQ-ACK of the SPS PDSCH to the terminal in advance through the higher layer signaling, the two PUCCH resources include: one second type of PUCCH resource (the PUCCH resource 301 shown in FIG. 3) which is a PUCCH format 0 or 1 resource for carrying 1 to 2 bits of UCI transmission; one first type of PUCCH resource (the PUCCH resource 303 shown in FIG. 3) which is a PUCCH format 2 or 3 or 4 resource for carrying more than 2 bits of UCI transmission; assuming that the transmission period of the SPS PDSCH is 10 ms, the HARQ-ACK of the SPS PDSCH is transmitted in the slot n+8 of each radio frame, the transmission period of the CSI is 20 ms, and the CSI is transmitted in the slot of n+8 of every other radio frame, then in the slot n+8 of the radio frame i, the HARQ-ACK of the SPS PDSCH and the CSI are transmitted in a same slot, and in the slot n+8 in the radio frame i+1, there is only the HARQ-ACK transmission of the SPS PDSCH, as shown in FIG. 3.

First implementation mode: it is assumed that the PUCCH resource 301 is the default PUCCH for transmitting the HARQ-ACK of the SPS PDSCH, the transmission time domain position of the PUCCH overlaps with the time domain position of the CSI (the PUCCH resource 302 in FIG. 3), as shown in FIG. 3. The default PUCCH resource may be determined based on an indication of the PUCCH resource indicating SPS PDSCH activation, or it may be agreed to be the resource with the smallest index in a plurality of PUCCH resources or the first PUCCH resource or the PUCCH resource with the lowest carrying capacity.

In the slot n+8 in the radio frame i, since the default transmission resource (PUCCH resource 301) of the HARQ-ACK of the SPS PDSCH overlaps with the time domain position (the PUCCH resource 302) of the CSI, a second type of PUCCH resource (i.e. the PUCCH resource 303 in FIG. 3) is required for transmitting the HARQ-ACK of the SPS PDSCH and the CSI simultaneously; if the PUCCH resource 303 is not sufficient to carry the HARQ-ACK of the SPS PDSCH and the CSI, part or all of the CSI needs to be dropped to ensure the transmission is performed in the carrying capacity of the PUCCH, where the carrying capacity is determined according to a predetermined code rate, i.e. the number of bits of the UCI which can be carried is determined according to the predetermined code rate on the time-frequency domain resource corresponding to the PUCCH, where when the CSI drop is carried out, part or all of the CSI can be dropped according to the predetermined code rate until the remaining UCI can be transmitted on the time-frequency domain resource of the PUCCH without exceeding the predetermined code rate; the following operation for the CSI drop is the same and will not be described in detail;

In the slot n+8 in the radio frame i+1, since the default transmission resource (the PUCCH resource 301) of the HARQ-ACK of the SPS PDSCH does not overlap with the time domain position (the PUCCH resource 302) of the CSI, only the HARQ-ACK of the SPS PDSCH can be transmitted on the PUCCH resource 301;

In another embodiment, it is assumed that the transmission time domain position of the PUCCH resource 301 as shown in FIG. 3, overlaps with the resource of the CSI in the time domain;

In the slot n+8 in the radio frame i, since the second type of PUCCH resource (the PUCCH resource 301) for transmitting the HARQ-ACK of SPS PDSCH overlaps with the time domain position of the CSI, the first type of PUCCH resource (the PUCCH resource 303) needs to be selected for simultaneously transmitting the HARQ-ACK of SPS PDSCH and the CSI; if the PUCCH resource 303 is insufficient to carry the HARQ-ACK of the SPS PDSCH and the CSI, then part or all of the CSI needs to be dropped to ensure the transmission is performed in the carrying capacity of the PUCCH;

In the slot n+8 in the radio frame i+1, since the second type of PUCCH resource (the PUCCH resource 301) for transmitting the HARQ-ACK of the SPS PDSCH does not overlap with the time domain position of the CSI, only the HARQ-ACK of the SPS PDSCH can be transmitted on the second type of PUCCH resource (the PUCCH resource 301);

The base station side determines the PUCCH resource for actual transmission according to the same processing mode as the terminal, and receives the HARQ-ACK of the SPS PDSCH or simultaneously receives the HARQ-ACK of the SPS PDSCH and the CSI on the determined PUCCH resource, so that when only the HARQ-ACK transmission of the SPS PDSCH exists, the PUCCH format with small carrying capacity and high multi-user multiplexing capacity is used to reduce the PUCCH resource overhead, when the HARQ-ACK of the SPS PDSCH and the CSI exist at a same time, two kinds of UCI can be simultaneously transmitted, the CSI is prevented from being dropped, and the system transmission efficiency is improved.

Example Two

Figure 4:
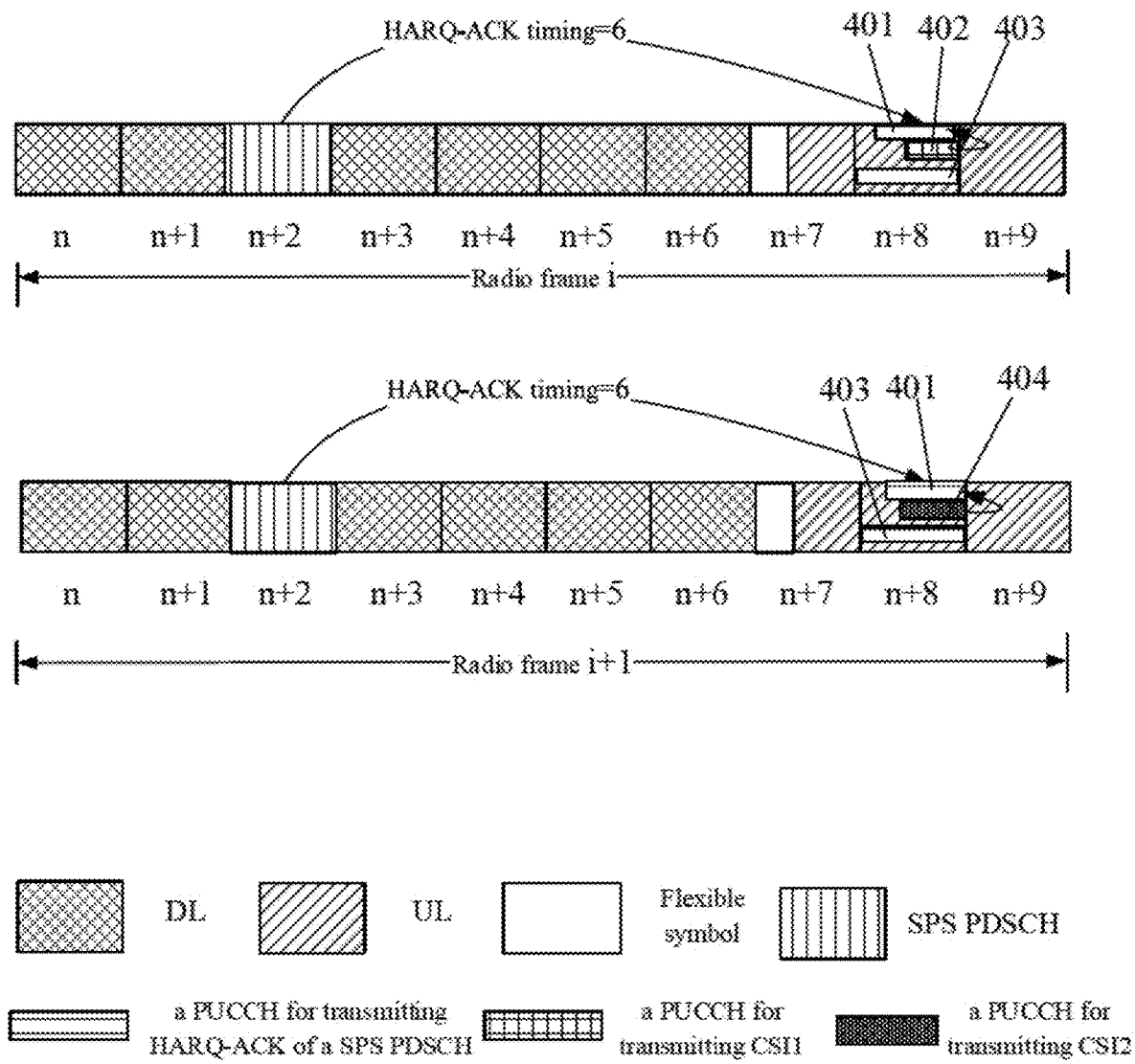
FIG. 4 is a second schematic diagram of HARQ-ACK transmission provided by an embodiment of the present disclosure.
Figure 5:
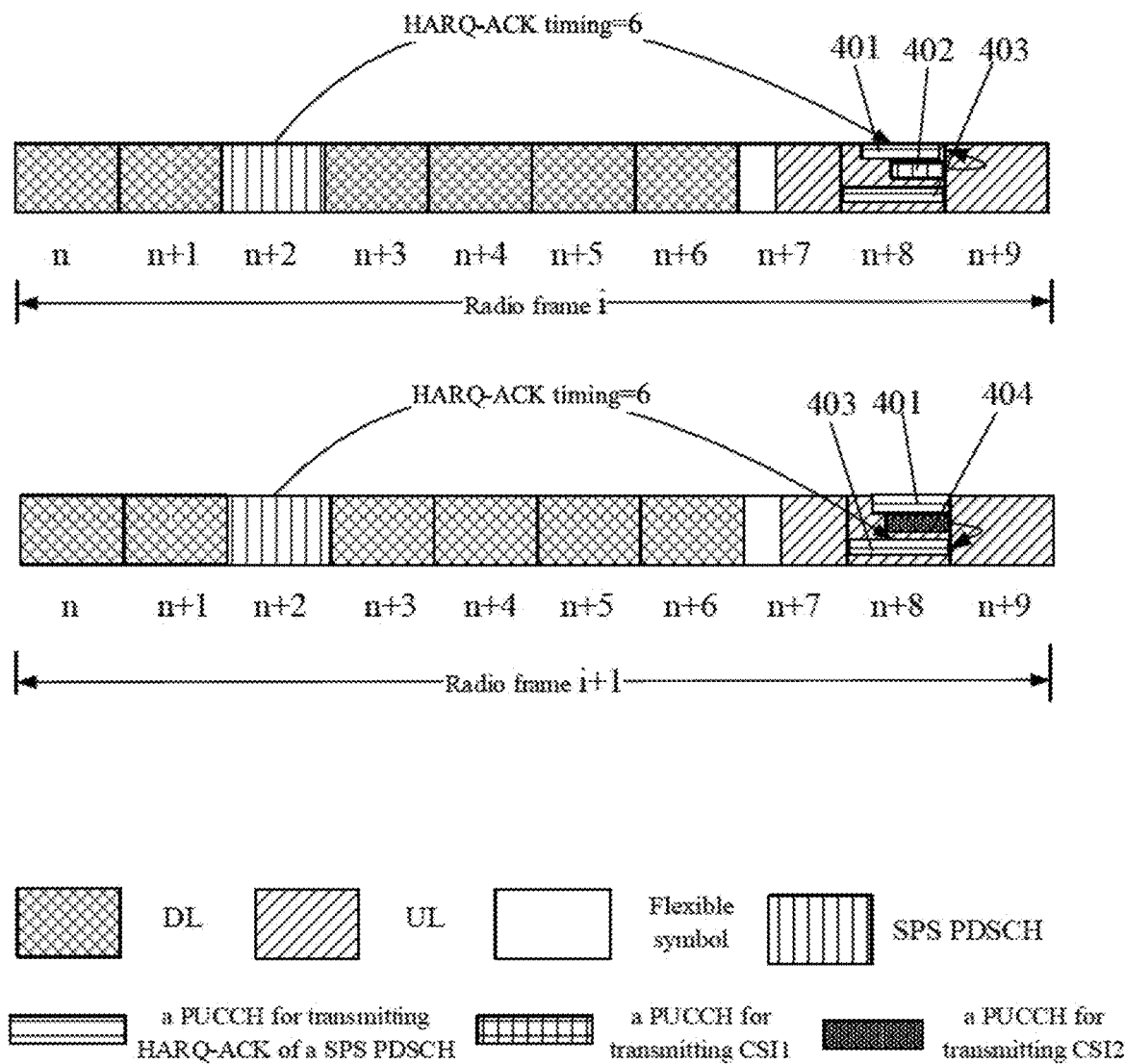
FIG. 5 is a third schematic diagram of HARQ-ACK transmission provided by an embodiment of the present disclosure.

Referring to FIGS. 4 and 5, the base station configures 2 PUCCH resources for transmitting the HARQ-ACK of the SPS PDSCH to the terminal in advance through the high layer signaling, the 2 PUCCH resources includes: two first type of PUCCH resources (i.e. the PUCCH resource 401 and the resource 403) which are PUCCH format 2 or 3 or 4 resources and are used for carrying more than 2 bits of UCI transmission, but the carrying capacities of the PUCCH resource 401 and the resource 403 are different, for example, the carrying capacity of the PUCCH resource 401 is smaller than that of the PUCCH resource 403. It is assumed that the transmission period of the SPS PDSCH is 10 ms, the HARQ-ACK of the SPS PDSCH is transmitted in the slot n+8 of each radio frame, the transmission period of the CSI1 is 20 ms, the CSI1 is transmitted in the slot n+8 of the radio frames i, i+2, and . . . , and the transmission period of the CSI2 is 20 ms, the CSI2 is transmitted in the slot n+8 of the radio frames i+1, i+3, and . . . . Then in the slot n+8 in the radio frame i, the HARQ-ACK of the SPS PDSCH and the CSI1 are transmitted in a same slot, and in the slot n+8 in the radio frame i+1, the HARQ-ACK of the SPS PDSCH and the CSI2 are transmitted in a same slot, as shown in FIG. 4.

First Embodiment

In the slot n+8 in the radio frame i, as shown in FIG. 4, the PUCCH resource 402 is the PUCCH resource for carrying the CSI1.

One first type of PUCCH resource is determined according to the PRI in the PDCCH indicating SPS PDSCH activation, for example, the PRI indicates the PUCCH resource 401, and the HARQ-ACK of the SPS PDSCH and the CSI1 are simultaneously transmitted on the PUCCH resource 401;

Or, one PUCCH resource with the lowest carrying capacity being capable of carrying the HARQ-ACK of the SPS PDSCH and the first type of UCI is selected according to the carrying capacities of a plurality of first type of PUCCH resources, for example, the PUCCH resource 401 is enough to carry the HARQ-ACK of the SPS PDSCH and the CSI1, and the PUCCH resource 401 is selected to simultaneously transmit the HARQ-ACK of the SPS PDSCH and the CSI1;

Or, the first one of the first type of PUCCH resources or the first type of PUCCH resource with the smallest index is selected, i.e. the PUCCH resource 401, and the HARQ-ACK of the SPS PDSCH and the CSI1 are transmitted simultaneously on the PUCCH resource 401;

In the above process, if the PUCCH resource 401 is not enough to carry the HARQ-ACK of the SPS PDSCH and the CS1, part or all of the CSI needs to be dropped to ensure the transmission is performed in the carrying capacity of the PUCCH.

In the slot n+8 in the radio frame i+1, as shown in FIG. 4, the PUCCH resource 404 is the PUCCH resource for carrying the CSI2.

One first type of PUCCH resource is determined according to the PRI in the PDCCH indicating SPS PDSCH activation, for example, the PRI indicates the PUCCH resource 401, and the HARQ-ACK of the SPS PDSCH and the CSI2 are simultaneously transmitted on the PUCCH resource 401, as shown in FIG. 4;

Or, one PUCCH resource with the lowest carrying capacity being capable of carrying the HARQ-ACK of the SPS PDSCH and the first type of UCI according to the carrying capacities of a plurality of first type of PUCCH resources, for example, the PUCCH resource 401 is not enough to carry the HARQ-ACK of the SPS PDSCH and the CSI2, but the PUCCH resource 403 is enough to carry the HARQ-ACK of the SPS PDSCH and the CSI2, and the PUCCH resource 403 is selected to simultaneously transmit the HARQ-ACK of the SPS PDSCH and the CSI2, as shown in FIG. 5. Wherein, if the PUCCH resource with the largest carrying capacity is not enough to carry the HARQ-ACK of the SPS PDSCH and the CSI2, part or all of the CSI2 needs to be dropped to ensure the transmission is performed in the carrying capacity of the PUCCH;

Or, the first one of the first type of PUCCH resources or the first type of PUCCH resource with the smallest index, i.e. the PUCCH resource 401, the HARQ-ACK of the SPS PDSCH and the CSI2 are transmitted simultaneously on the PUCCH resource 401, as shown in FIG. 4; if the PUCCH resource 401 is insufficient to carry the HARQ-ACK of the SPS PDSCH and the CSI2, then part or all of the CSI2 needs to be dropped to ensure the transmission is performed in the carrying capacity of the PUCCH.

In another embodiment, it is assumed that the PUCCH resource 401 is the default PUCCH for transmitting the HARQ-ACK of the SPS PDSCH, the default PUCCH resource may be determined based on an indication of the PUCCH resource indicating SPS PDSCH activation, or it may be agreed to be the resource with the smallest index or the first PUCCH resource or the PUCCH resource with the lowest carrying capacity in a plurality of PUCCH resources.

Case 1: the transmission time domain position of the PUCCH resource 401 overlaps with the resource of the CSI1, and also overlaps with the resource of the CSI2.

In the slot n+8 in the radio frame i, since the default transmission resource (the PUCCH resource 401) of the HARQ-ACK of the SPS PDSCH overlaps with the time domain position of the CSI1, three correlation methods in the above first implementation mode are reused to select one PUCCH from the PUCCH resource 401 and resource 403 for simultaneously transmitting the HARQ-ACK of the SPS PDSCH and the CSI1, as shown in FIG. 4.

In the slot n+8 in the radio frame i+1, since the default transmission resource (the PUCCH resource 401) of the HARQ-ACK of the SPS PDSCH overlaps with the time domain position of the CSI2, three correlation methods of the above first implementation mode are reused to select one PUCCH from the PUCCH resource 401 and resource 403 for simultaneously transmitting the HARQ-ACK of the SPS PDSCH and the CSI2; as shown in FIG. 4 or 5.

Figure 6:
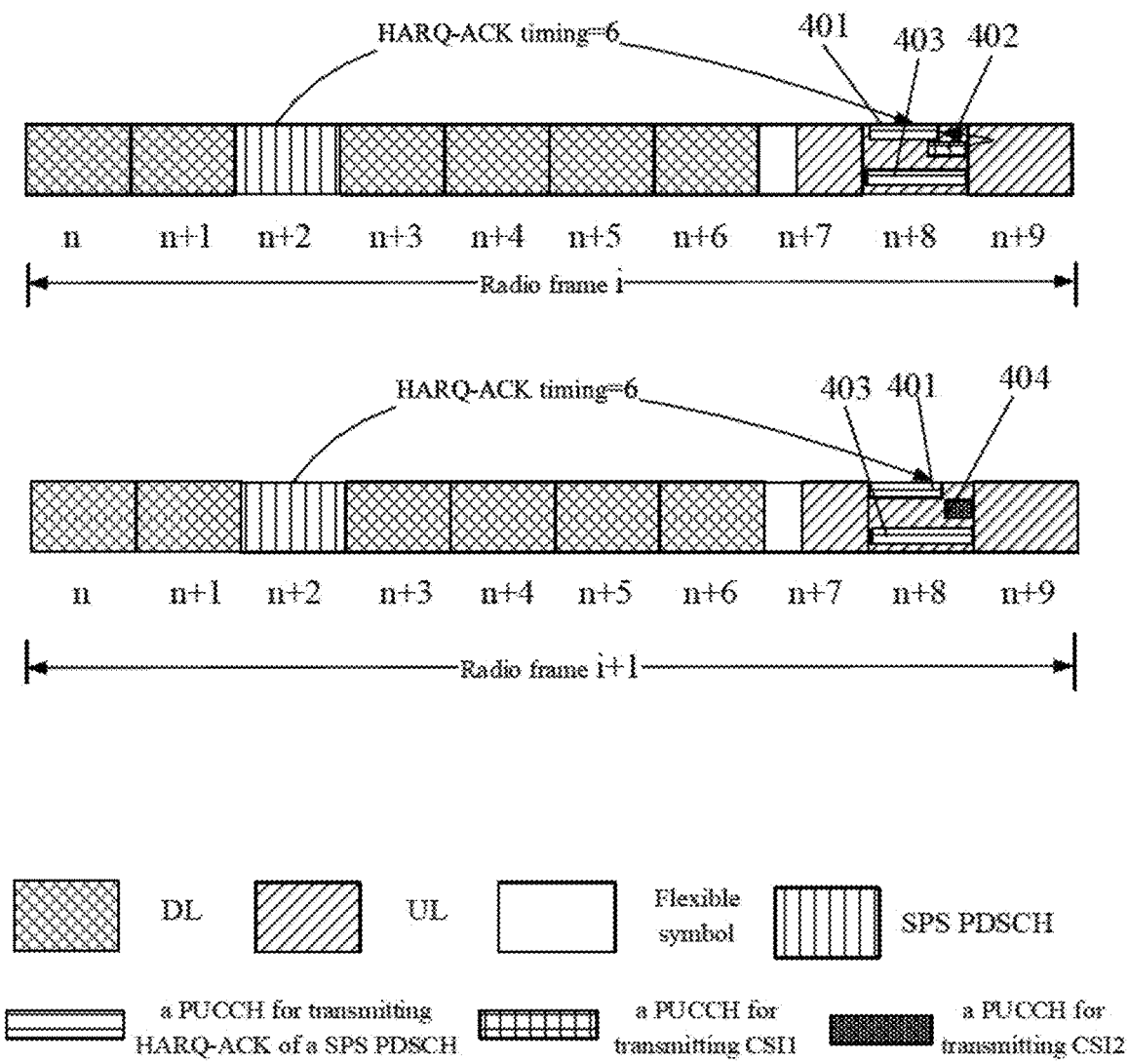
FIG. 6 is a fourth schematic diagram of HARQ-ACK transmission provided by an embodiment of the present disclosure.

Case 2: the transmission time domain position of the PUCCH resource 401 overlaps with the resource of the CSI1 but does not overlap with the resource of the CSI2, as shown in FIG. 6;

In the slot n+8 in the radio frame i, since the default transmission resource (the PUCCH resource 401) of the HARQ-ACK of SPS PDSCH overlaps with the time domain position of the CSI1, three correlation methods of the above first implementation mode are reused to select one PUCCH from the PUCCH resource 401 and resource 403 for simultaneously transmitting the HARQ-ACK of the SPS PDSCH and the CSI1.

Figure 7:
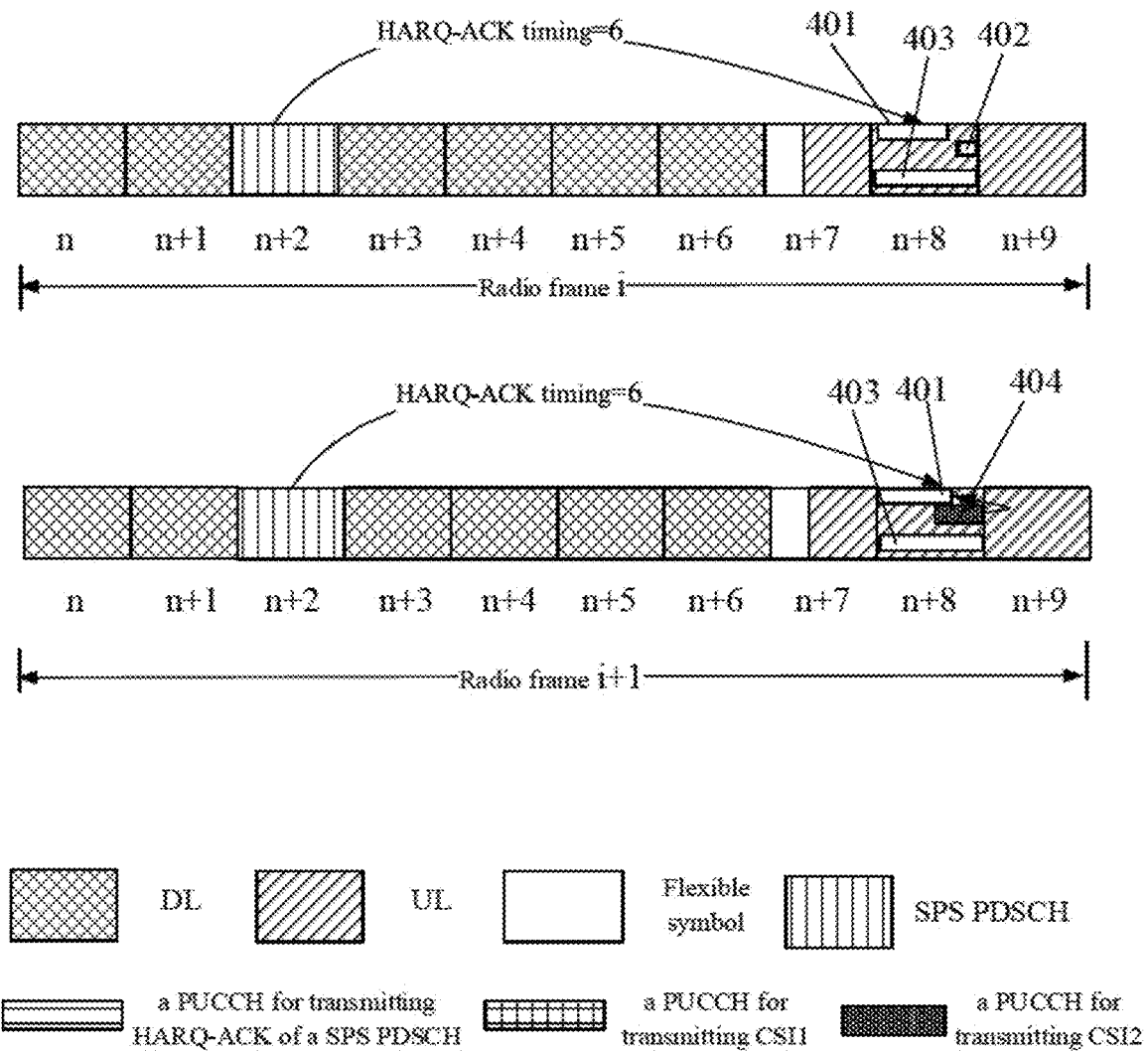
FIG. 7 is a fifth schematic diagram of HARQ-ACK transmission provided by an embodiment of the present disclosure.

In the slot n+8 in the radio frame i+1, since the default transmission resource (the PUCCH resource 401) of the HARQ-ACK of the SPS PDSCH does not overlap with the time domain position of the CSI2, only the HARQ-ACK of the SPS PDSCH can be transmitted on the default PUCCH resource 401;

Case 3: the transmission time domain position of the PUCCH resource 401 does not overlap with resource of the CSI1 but overlaps with the resource of the CSI2, as shown in FIG. 7.

In the slot n+8 in the radio frame i, since the default transmission resource (the PUCCH resource 401) of the HARQ-ACK of the SPS PDSCH does not overlap with the time domain position of the CSI1, only the HARQ-ACK of the SPS PDSCH can be transmitted on the default PUCCH resource 401.

In the slot n+8 of the radio frame i+1, since the default transmission resource (the PUCCH resource 401) of the HARQ-ACK of the SPS PDSCH overlaps with the time domain position of the CSI2, three correlation methods of the above first implementation mode are reused to select one PUCCH from the PUCCH resource 401 and the PUCCH resource 403 for simultaneously transmitting the HARQ-ACK of the SPS PDSCH and the CSI2;

The base station side determines the PUCCH resource for actual transmission according to the same processing mode as the terminal, and receives the HARQ-ACK of the SPS PDSCH or simultaneously receives the HARQ-ACK of the SPS PDSCH and the CSI on the determined PUCCH resource, so that when only the HARQ-ACK transmission of the SPS PDSCH exists, the PUCCH format with small carrying capacity and high multi-user multiplexing capacity is used to reduce the PUCCH resource overhead, when the HARQ-ACK of the SPS PDSCH and the CSI exist at a same time, two kinds of UCI can be simultaneously transmitted, the CSI is prevented from being dropped, and the system transmission efficiency is improved.

Example Three

Figure 8:
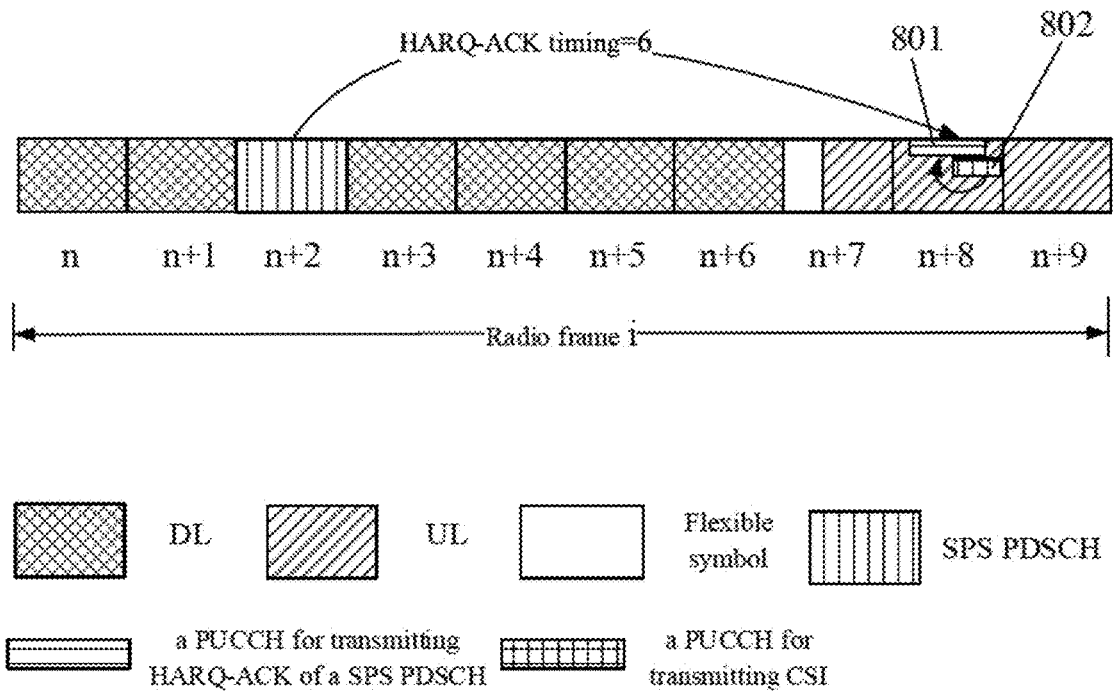
FIG. 8 is a sixth schematic diagram of HARQ-ACK transmission provided by an embodiment of the present disclosure.
Figure 9:
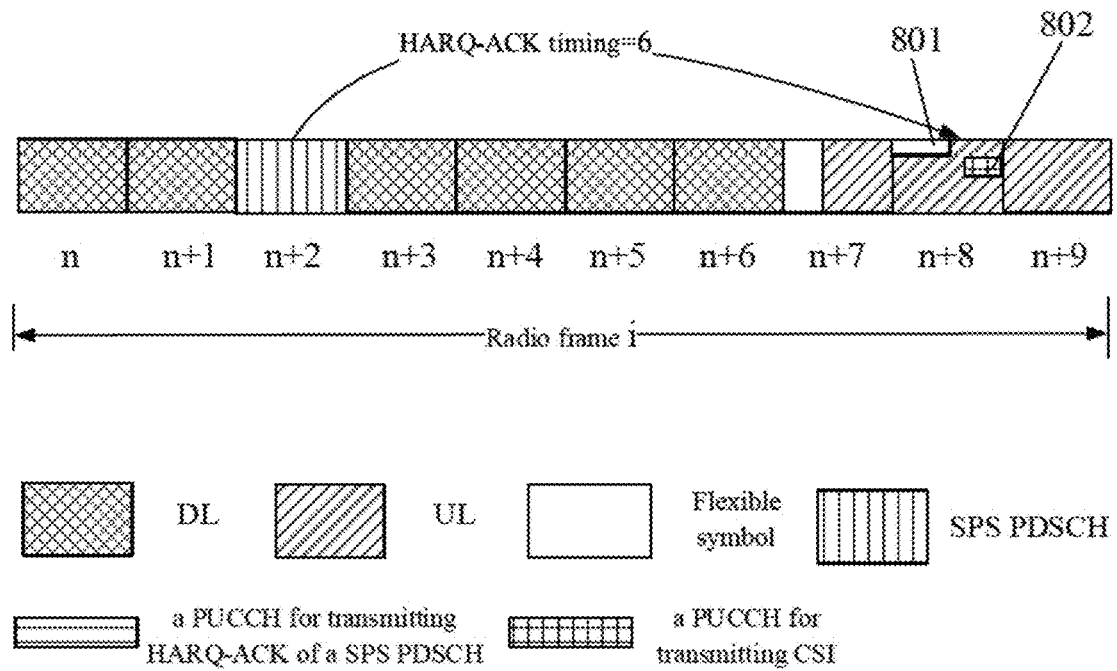
FIG. 9 is a seventh schematic diagram of HARQ-ACK transmission provided by an embodiment of the present disclosure.

Referring to FIGS. 8 and 9, the base station configures one PUCCH resource in advance for transmitting the HARQ-ACK of the SPS PDSCH to the terminal through the high layer signaling, the one PUCCH resource includes: one first type of PUCCH resource (the PUCCH resource 801) which is a PUCCH format 2 or 3 or 4 resource for carrying more than 2 bits of UCI transmission. It is assumed that the transmission period of the SPS PDSCH is 10 ms, the HARQ-ACK of the SPS PDSCH is transmitted in the slot n+8 of each radio frame, and the transmission period of the CSI is also 10 ms, and the CSI is transmitted in the slot n+8 of each radio frame, the HARQ-ACK of the SPS PDSCH and the CSI are transmitted in a same slot in the slot n+8 of each radio frame.

In an embodiment, since only one PUCCH resource (the PUCCH resource 801) for transmitting the HARQ-ACK of the SPS PDSCH is configured, and the HARQ-ACK of the SPS PDSCH and the CSI are transmitted in a same slot in each transmission opportunity, the PUCCH resource 801 is directly used for simultaneously transmitting the HARQ-ACK of the SPS PDSCH and the CSI, as shown in FIG. 8; if the PUCCH resource 801 is insufficient to carry then HARQ-ACK of the SPS PDSCH and the CSI, then part or all of the CSI needs to be dropped to ensure the transmission is performed in the carrying capacity of PUCCH.

In another embodiment, whether the PUCCH resource corresponding to the HARQ-ACK of the SPS PDSCH overlaps with the PUCCH resource of the CSI (the PUCCH resource 802) is judged, if no, respectively the HARQ-ACK of the SPS PDSCH is transmitted on the PUCCH resource corresponding to the HARQ-ACK of the SPS PDSCH, and the CSI is transmitted on the PUCCH of the CSI, as shown in FIG. 9; if yes, the HARQ-ACK of the SPS PDSCH and the CSI are simultaneously transmitted on the PUCCH resource corresponding to the HARQ-ACK of the SPS PDSCH, i.e. the HARQ-ACK of the SPS PDSCH and the CSI are simultaneously transmitted on the PUCCH resource 801, as shown in FIG. 8; if the PUCCH resource 801 is insufficient to carry the HARQ-ACK of the SPS PDSCH and the CSI, then part or all of the CSI needs to be dropped to ensure the transmission is performed in the carrying capacity of PUCCH;

The base station side determines the PUCCH resource for actual transmission according to the same processing mode as the terminal, and receives the HARQ-ACK of the SPS PDSCH or simultaneously receives the HARQ-ACK of the SPS PDSCH and the CSI on the determined PUCCH resource, so that when only the HARQ-ACK transmission of the SPS PDSCH exists, the PUCCH format with small carrying capacity and high multi-user multiplexing capacity is used to reduce the PUCCH resource overhead, when the HARQ-ACK of the SPS PDSCH and the CSI exist at a same time, two kinds of UCI can be simultaneously transmitted, the CSI is prevented from being dropped, and the system transmission efficiency is improved.

If a plurality of first type of PUCCH resources and/or a plurality of second type of PUCCH resources are configured, the processing is similar to that in the above examples, except that when the first type of PUCCH resource is selected for transmission and the plurality of first type of PUCCH resources all satisfy the condition, one first type of PUCCH resource can be selected according to the PRI in the PDCCH indicating SPS PDSCH activation, or the number size in the multiple PUCCH resources, or the resource sequence in the multiple PUCCH resources, or the carrying capacities of the multiple PUCCH resources. When the second type of PUCCH resource is selected for transmission and the plurality of second type of PUCCH resources satisfy the condition, one second type of PUCCH resource can be selected according to the PRI in the PDCCH indicating SPS PDSCH activation, or the number size in the multiple PUCCH resources or the resource sequence in the multiple PUCCH resources.

For example, in example one, in the slot n+8 in the radio frame i, when it is required to use the first type of PUCCH resource for simultaneously transmitting the HARQ-ACK the SPS PDSCH and the CSI, if there are a plurality of first type of PUCCH resources, for example, the resource pre-configured to the terminal for transmitting the HARQ-ACK of the SPS PDSCH further includes another first type of PUCCH resource, for example, the PUCCH resource 304 (not shown). Then, one PUCCH resource can be determined according to the PUCCH resource indication in the PDCCH indicating SPS PDSCH activation, the first one or the resource with the smaller number from the PUCCH resources 303 and 304 can be used as the determined PUCCH resource, and the PUCCH resource with the smaller carrying capacity being capable of simultaneously carrying the HARQ-ACK of the SPS PDSCH and the CSI from the PUCCH resources 303 and 304 can be used as the determined PUCCH resource.

For another example, in example one, in the slot n+8 in the radio frame i+1, only the HARQ-ACK of the SPS PDSCH is transmitted on the second type of PUCCH resource, i.e. the PUCCH resource 301, if there are a plurality of second type of PUCCH resources, for example, the resource pre-configured to the terminal for transmitting the HARQ-ACK of the SPS PDSCH further includes another second type of PUCCH resource, e.g. the PUCCH resource 305 (not shown). Then, one PUCCH resource can be determined according to the PUCCH resource indication in the PDCCH indicating SPS PDSCH activation, the first one or the resource with the smaller number from the PUCCH resources 301 and 305 may also be used as the determined PUCCH resource; other similar selection are the same and will not be described again.

The above embodiments only take the example that the PUCCH carrying the HARQ-ACK of the SPS PDSCH overlaps with the PUCCH carrying the CSI, and other situations such as the PUCCH carrying the HARQ-ACK of the SPS PDSCH overlaps with the PUCCH carrying the SR or simultaneously overlap with the PUCCH carrying the CSI and the PUCCH carrying the SR can adopt the above methods.

The above embodiments only take the SPS PDSCH and the PUCCH with the same numerology as an example, and if with different numerology, the determination of the corresponding HARQ-ACK transmission slot according to the reference slot corresponding to the SPS PDSCH and the HARQ-ACK timing is only effected, where the end position of the reference slot may not be the end position of the slot where the SPS PDSCH is located, the case is also applicable to the above method.

The HARQ-ACK timing, the periodic transmission position, etc. in the above embodiments are examples, and other values or configurations are equally applicable to the method of the present disclosure.

Figure 10:
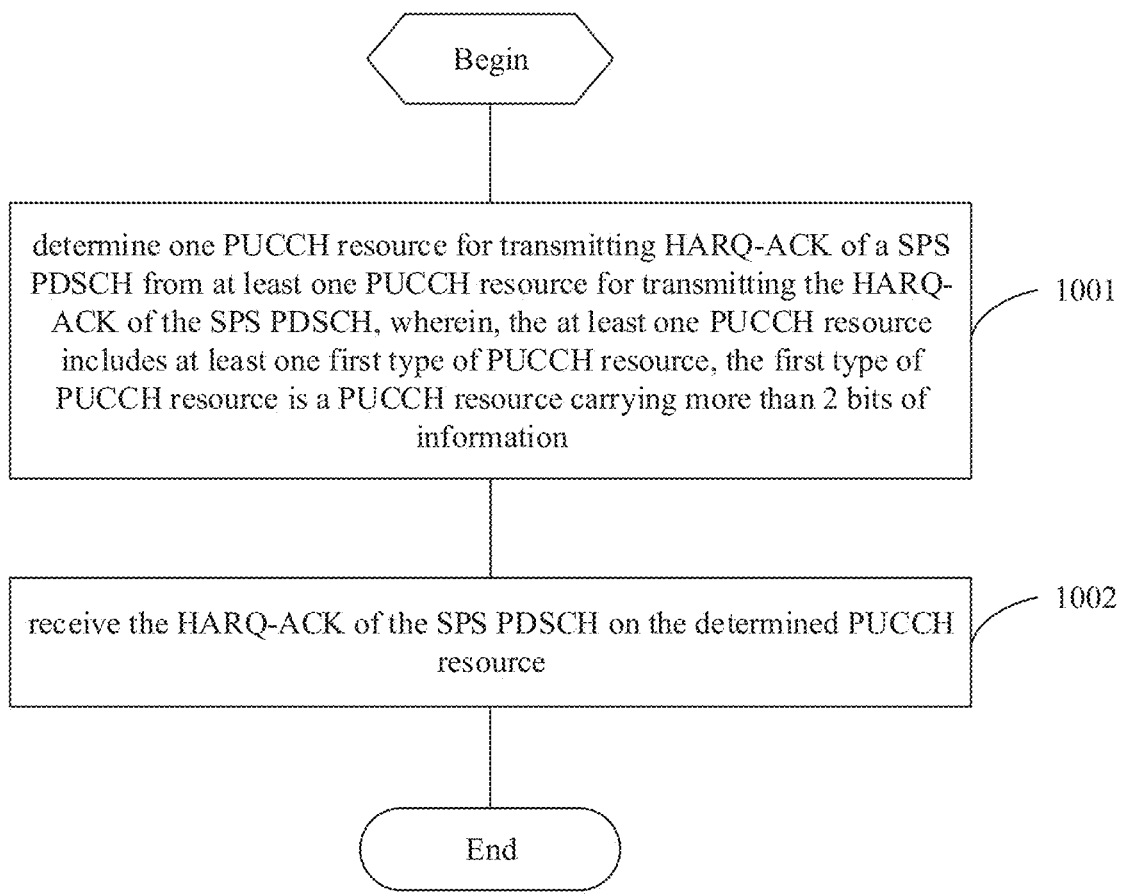
FIG. 10 is a flow chart of a HARQ-ACK receiving method provided by an embodiment of the present disclosure.

Referring to FIG. 10, a flow chart of a HARQ-ACK receiving method provided by an embodiment of the present disclosure, as shown in FIG. 10, the execution body of the HARQ-ACK receiving method is a base station, specifically includes the following steps:

Step 1001, one PUCCH resource for transmitting HARQ-ACK of a SPS PDSCH is determined from at least one PUCCH resource for transmitting the HARQ-ACK of the SPS PDSCH, where the at least one PUCCH resource includes at least one first type of PUCCH resource, and the first type of PUCCH resource is a PUCCH resource for carrying more than 2 bits of information.

Step 1002, the HARQ-ACK of the SPS PDSCH is received on the determined PUCCH resource.

Optionally, when the HARQ-ACK of the SPS PDSCH and a first type of uplink control information (UCI) are transmitted in a same time unit, in the time unit, the one PUCCH resource for transmitting HARQ-ACK of a SPS PDSCH is determine from at least one PUCCH resource, includes:
when a preset PUCCH resource in the at least one PUCCH resource and a resource of the first type of UCI do not overlap in a time domain, the preset PUCCH resource is determined as the PUCCH resource for transmitting the HARQ-ACK of the SPS PDSCH.

Optionally, when the HARQ-ACK of the SPS PDSCH and the first type of UCI are transmitted in a same time unit, in the time unit, the determining the one PUCCH resource for transmitting HARQ-ACK of a SPS PDSCH from at least one PUCCH resource, includes:
when the preset PUCCH resource in the at least one PUCCH resource and the resource of the first type of UCI overlap in the time domain, one first type of PUCCH resource is determined as the PUCCH resource for transmitting the HARQ-ACK of the SPS PDSCH and the first type of UCI from the at least one PUCCH resource;

The HARQ-ACK of the SPS PDSCH is received on the determined PUCCH resource, includes:
the HARQ-ACK of the SPS PDSCH and the first type of UCI are received on the determined first type of PUCCH resource.

Optionally, when the HARQ-ACK of the SPS PDSCH and the first type of UCI are transmitted in a same time unit, in the time unit, the one PUCCH resource for transmitting HARQ-ACK of a SPS PDSCH is determined from at least one PUCCH resource, includes:
when the at least one PUCCH resource further includes at least one second type of PUCCH resource, one second type of PUCCH resource which does not overlap with the resource of the first type of UCI in the time domain is determined as the PUCCH resource for transmitting the HARQ-ACK of the SPS PDSCH if the at least one second type of PUCCH resource which does not overlap with the resource of the first type of UCI in the time domain exists in the at least one PUCCH resource;
where the second type of PUCCH resource is a PUCCH resources carrying no more than 2 bits of information.

Optionally, when the HARQ-ACK of the SPS PDSCH and the first type of UCI are transmitted in a same time unit, in the time unit, the one PUCCH resource for transmitting HARQ-ACK of a SPS PDSCH is determined from at least one PUCCH resource, includes:
when the at least one PUCCH resource further includes at least one second type of PUCCH resource, one first type of PUCCH resource is determined as the PUCCH resource for transmitting the HARQ-ACK of the SPS PDSCH and the UCI from the at least one PUCCH resource if the second type of PUCCH resource which does not overlap with the resource of the first type of UCI in the time domain does not exist in the at least one PUCCH resource;
where the second type of PUCCH resource is a PUCCH resource for carrying no more than 2 bits of information;

The HARQ-ACK of the SPS PDSCH is received on the determined PUCCH resource, includes:
the HARQ-ACK of the SPS PDSCH and the first type of UCI are received on the determined first type of PUCCH resource.

Optionally, when the HARQ-ACK of the SPS PDSCH and the first type of UCI are transmitted in a same time unit, in the time unit, the one PUCCH resource for transmitting HARQ-ACK of a SPS PDSCH is determined from at least one PUCCH resource, includes:
when the at least one PUCCH resource only includes the first type of PUCCH resource, one first type of PUCCH resource is determined the PUCCH resource for transmitting the HARQ-ACK of the SPS PDSCH and the first type of UCI;

The HARQ-ACK of the SPS PDSCH is received on the determined PUCCH resource, includes:
the HARQ-ACK of the SPS PDSCH and the first type of UCI are received on the determined first type of PUCCH resource.

Optionally, when the first type of UCI does not exist in the time unit where the HARQ-ACK transmission of the SPS PDSCH is located, in the time unit, the one PUCCH resource for transmitting HARQ-ACK of the SPS PDSCH is determined from at least one PUCCH resource, includes:

when the at least one PUCCH resource further includes the second type of PUCCH resource, one second type of PUCCH resource is determined as the PUCCH resource for transmitting the HARQ-ACK of the SPS PDSCH.

Optionally, when the first type of UCI does not exist in the time unit where the HARQ-ACK transmission of the SPS PDSCH is located, in the time unit, the one PUCCH resource for transmitting HARQ-ACK of a SPS PDSCH is determined from at least one PUCCH resource, includes:

when the at least one PUCCH resource only includes the first type of PUCCH resource, one first type of PUCCH resource is determined as the PUCCH resource for transmitting the HARQ-ACK of the SPS PDSCH.

Optionally, the one first type of PUCCH resource is determined as the PUCCH resource for transmitting the HARQ-ACK of the SPS PDSCH and the first type of UCI from the at least one PUCCH resource, includes:

when the at least one PUCCH resource includes at least two first type of PUCCH resources, any one of the following first type of PUCCH resources is determined as the PUCCH resource for transmitting the HARQ-ACK of the SPS PDSCH and the first type of UCI from the at least one PUCCH resource:

one first type of PUCCH resource indicated by a PUCCH resource indication (PRI) in a physical downlink control channel (PDCCH) indicating SPS PDSCH activation;

one first type of PUCCH resource with the lowest carrying capacity being capable of carrying the HARQ-ACK of the SPS PDSCH and the first UCI without exceeding a set code rate, where different first type of PUCCH resources have different carrying capacities;

one first type of PUCCH resource with the largest carrying capacity when all the first type of PUCCH resources in the at least one PUCCH resource being not capable of carrying the HARQ-ACK of the SPS PDSCH and the first UCI without exceeding the set code rate, where different first type of PUCCH resources have different carrying capacities;

one first type of PUCCH resource with the smallest index;

the first one of the first type of PUCCH resources.

Optionally, the one second type of PUCCH resource is determined as the PUCCH resource for transmitting the HARQ-ACK of the SPS PDSCH, includes:

when the at least one PUCCH resource includes at least two second type of PUCCH resources, any one of the following second type of PUCCH resources is determined as the PUCCH resource for transmitting the HARQ-ACK of the SPS PDSCH from the at least two second type of PUCCH resources:

one second type of PUCCH resource indicated by the PRI in the PDCCH indicating SPS PDSCH activation;

the second type of PUCCH resource with the smallest index;

the first one of the second type of PUCCH resources.

Optionally, before the one PUCCH resource for transmitting HARQ-ACK of a SPS PDSCH is determined from at least one PUCCH resource, the receiving method further includes:

whether a transmission opportunity of the HARQ-ACK of the SPS PDSCH overlaps with a transmission opportunity of the first type of UCI is judged;

The one PUCCH resource for transmitting HARQ-ACK of a SPS PDSCH is determined from at least one PUCCH resource, includes:

when the transmission opportunity of the HARQ-ACK of the SPS PDSCH and the transmission opportunity of the first type of UCI overlap, one PUCCH resource for transmitting the HARQ-ACK of the SPS PDSCH is determined from the at least one PUCCH resource.

Optionally, before the one PUCCH resource for transmitting HARQ-ACK of a SPS PDSCH is determined from at least one PUCCH resource, the receiving method further includes:

whether the HARQ-ACK of the SPS PDSCH and the first type of UCI are supported to be transmitted simultaneously:

The one PUCCH resource for transmitting HARQ-ACK of a SPS PDSCH is determined from at least one PUCCH resource, includes:

when the HARQ-ACK of the SPS PDSCH and the first type of UCI are supported to be transmitted simultaneously, one PUCCH resource for transmitting the HARQ-ACK of the SPS PDSCH is determined from the at least one PUCCH resource.

Optionally, before the one PUCCH resource for transmitting HARQ-ACK of a SPS PDSCH is determined from at least one PUCCH resource, the receiving method further includes:

the at least one PUCCH resource is determined according to a configuration signaling.

Optionally, the preset PUCCH resource in the at least one PUCCH resource is any one of the following:

the PUCCH resource with the smallest index in the at least one PUCCH resource;

the first one of the at least one PUCCH resource;

a PUCCH resource determined by the PRI in PDCCH indicating SPS PDSCH activation;

the second type of PUCCH resource when the at least one PUCCH resource further includes the second type of PUCCH resource;

the second type of PUCCH resource with the smallest index when the at least one PUCCH resource further includes at least two second type of PUCCH resources;

the first one of the second type of PUCCH resources when the at least one PUCCH resource further includes at least two second type of PUCCH resources.

Optionally, the first type of UCI includes any one or more of the following:

channel state information (CSI);

schedule request (SR).

Optionally, the first type of PUCCH resource is any one of the following:

PUCCH format 2 resource;

PUCCH format 3 resource;

PUCCH format 4 resource.

Optionally, the second type of PUCCH resource is any one of the following:

PUCCH format 0 resource;

PUCCH format 1 resource.

Optionally, the time unit is any one of the following:

one sub-frame;

one slot;

one mini-slot.

It should be noted that the embodiment may be a base station side embodiment corresponding to the embodiment shown in FIG. 2, and the principle of HARQ-ACK receiving is similar to the principle of HARQ-ACK sending, and the detailed process refers to the description of the embodiment shown in FIG. 2 and will not be described again in detail herein.

An embodiment of the present disclosure further provides a terminal, and since the principle for solving the problem of the terminal is similar to that of the HARQ-ACK sending method in the embodiment of the present disclosure, the implementation of the terminal can be referred to the implementation of the HARQ-ACK sending method, and the repetition is not described again.

Figure 11:
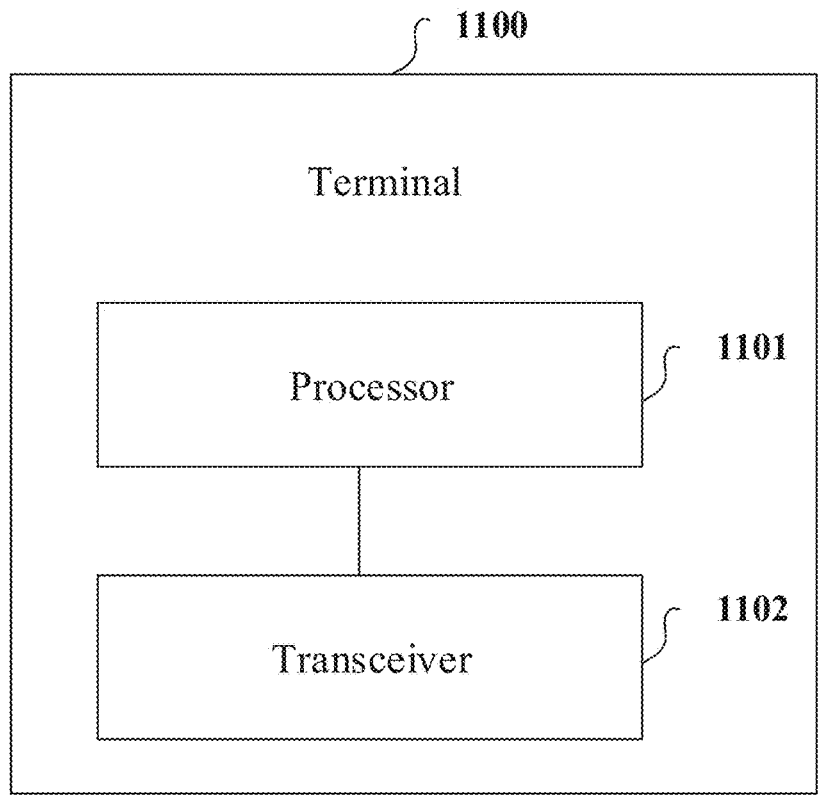
FIG. 11 is a first schematic diagram of a terminal provided by an embodiment of the present disclosure.

Referring to FIG. 11, an embodiment of the present disclosure further provide a terminal 1100 including a processor 1101 and a transceiver 1102, where, the transceiver 1102 may be a number of elements, including a transmitter and a receiver, providing units for communicating with various other devices on a transmission medium; and the processor 1101 is configured to determine one PUCCH resource for transmitting HARQ-ACK of a SPS PDSCH from at least one PUCCH resource for transmitting the HARQ-ACK of the SPS PDSCH, where the at least one PUCCH resource includes at least one first type of PUCCH resource, and the first type of PUCCH resource is a PUCCH resource for carrying more than 2 bits of information;

The processor 1101 or the transceiver 1102 transmits the HARQ-ACK of the SPS PDSCH on the determined PUCCH resource.

Optionally, when the HARQ-ACK of the SPS PDSCH and a first type of uplink control information (UCI) are transmitted in a same time unit, the processor 1101 is further configured to:

when a preset PUCCH resource in the at least one PUCCH resource and a resource of the first type of UCI do not overlap in a time domain, determine the preset PUCCH resource as the PUCCH resource for transmitting the HARQ-ACK of the SPS PDSCH.

Optionally, when the HARQ-ACK of the SPS PDSCH and a first type of UCI are transmitted in a same time unit, the processor 1101 is further configured to:

when the preset PUCCH resources in the at least one PUCCH resource and the resource of the first type of UCI overlap in the time domain, determine one first type of PUCCH resource as the PUCCH resource for transmitting the HARQ-ACK of the SPS PDSCH and the first type of UCI from the at least one PUCCH resource;

The processor 1101 or the transceiver 1102 is further configured to:

send the HARQ-ACK of the SPS PDSCH and the first type of UCI on the determined first type of PUCCH resource.

Optionally, when the HARQ-ACK of the SPS PDSCH and a first type of UCI are transmitted in a same time unit, the processor 1101 is further configured to:

when the at least one PUCCH resource further includes at least one second type of PUCCH resource, determine one second type of PUCCH resource which does not overlap with the resource of the first type of UCI in the time domain as the PUCCH resource for transmitting the HARQ-ACK of the SPS PDSCH if the at least one second type of PUCCH resource which does not overlap with the resource of the first type of UCI in the time domain exists in the at least one PUCCH resource;

where the second type of PUCCH resource is a PUCCH resource for carrying no more than 2 bits of information.

Optionally, when the HARQ-ACK of the SPS PDSCH and a first type of UCI are transmitted in a same time unit, the processor 1101 is further configured to:

when the at least one PUCCH resource further includes at least one second type of PUCCH resource, determine one first type of PUCCH resource as the PUCCH resource for transmitting the HARQ-ACK of the SPS PDSCH and the UCI from the at least one PUCCH resource if the second type of PUCCH resource which does not overlap with the resource of the first type UCI in the time domain does not exist in the at least one PUCCH resource;

where the second type of PUCCH resource is a PUCCH resource for carrying no more than 2 bits of information;

The processor 1101 or the transceiver 1102 is further configured to:

send the HARQ-ACK of the SPS PDSCH and the first type of UCI on the determined first type of PUCCH resource.

Optionally, when the HARQ-ACK of the SPS PDSCH and a first type of UCI are transmitted in a same time unit, the processor 1101 is further configured to:

when the at least one PUCCH resource only includes the first type of PUCCH resource, determine one first type of PUCCH resource as the PUCCH resource for transmitting the HARQ-ACK of the SPS PDSCH and the first type of UCI;

The processor 1101 or the transceiver 1102 is further configured to:

send the HARQ-ACK of the SPS PDSCH and the first type of UCI on the determined first type of PUCCH resource.

Optionally, when there is no first type of UCI in the time unit where the HARQ-ACK transmission of the SPS PDSCH is located, the processor 1101 is further configured to:

when the at least one PUCCH resource further includes the second type of PUCCH resource, determine one second type of PUCCH resource as the PUCCH resource for transmitting the HARQ-ACK of the SPS PDSCH.

Optionally, when there is no first type of UCI in the time unit where the HARQ-ACK transmission of the SPS PDSCH is located, the processor 1101 is further configured to:

when the at least one PUCCH resource only includes the first type of PUCCH resource, determine one first type of PUCCH resource as the PUCCH resource for transmitting the HARQ-ACK of the SPS PDSCH.

Optionally, the processor 1101 determines one first type of PUCCH resource as the PUCCH resource for transmitting the HARQ-ACK of the SPS PDSCH and the first type of UCI from the at least one PUCCH resource, includes:

when the at least one PUCCH resource includes at least two first type of PUCCH resources, determine any one of the following first type of PUCCH resources as the PUCCH resource for transmitting the HARQ-ACK of the SPS PDSCH and the first type of UCI from the at least one PUCCH resource:

one first type of PUCCH resource indicated by a PUCCH resource indication (PRI) in a physical downlink control channel (PDCCH) indicating SPS PDSCH activation;

one first type of PUCCH resource with the lowest carrying capacity being capable of carrying the HARQ-ACK of the SPS PDSCH and the first UCI without exceeding a set code rate, where different first type of PUCCH resources have different carrying capacities;

the first type of PUCCH resource with the largest carrying capacity when all the first type of PUCCH resources in the at least one PUCCH resource being not capable of carrying the HARQ-ACK of the SPS PDSCH and the first UCI without exceeding the set code rate, where different first type of PUCCH resources have different carrying capacities;

one first type of PUCCH resource with the smallest index;

the first one of the first type of PUCCH resources.

Optionally, the processor 1101 determines one second type of PUCCH resource as the PUCCH resource for transmitting the HARQ-ACK of the SPS PDSCH, includes:

when the at least one PUCCH resource includes at least two second type of PUCCH resources, determine any one of the following second type of PUCCH resources as the PUCCH resource for transmitting the HARQ-ACK of the SPS PDSCH from the at least two second type of PUCCH resources:

one second type of PUCCH resource indicated by the PRI in the PDCCH indicating SPS PDSCH activation;

the second type of PUCCH resource with the smallest index;

the first one of the second type of PUCCH resources.

Optionally, before determining one PUCCH resource for transmitting HARQ-ACK of a SPS PDSCH from at least one PUCCH resource, the processor 1101 is further configured to:

judge whether a transmission opportunity of the HARQ-ACK of the SPS PDSCH overlaps with a transmission opportunity of the first type of UCI;

The processor 1101 is further configured to:

when the transmission opportunity of the HARQ-ACK of the SPS PDSCH and the transmission opportunity of the first type of UCI overlap, determine one PUCCH resource for transmitting the HARQ-ACK of the SPS PDSCH from the at least one PUCCH resource.

Optionally, before determining one PUCCH resource for transmitting HARQ-ACK of a SPS PDSCH from at least one PUCCH resource, the processor 1101 is further configured to:

judge whether the HARQ-ACK of the SPS PDSCH and the first type of UCI are supported to be transmitted simultaneously;

The processor 1101 is further configured to:

when the HARQ-ACK of the SPS PDSCH and the first type of UCI are supported to be transmitted simultaneously, determine one PUCCH resource for transmitting the HARQ-ACK of the SPS PDSCH from the at least one PUCCH resource.

Optionally, before determining one PUCCH resource for transmitting HARQ-ACK of a SPS PDSCH from at least one PUCCH resource, the processor 1101 is further configured to:

determine the at least one PUCCH resource according to a configuration signaling.

Optionally, the preset PUCCH resource in the at least one PUCCH resource is any one of the following:

the PUCCH resource with the smallest index in the at least one PUCCH resource;

the first one of the at least one PUCCH resource;

a PUCCH resource determined by the PRI in the PDCCH indicating SPS PDSCH activation;

the second type of PUCCH resource when the at least one PUCCH resource further includes the second type of PUCCH resource;

the second type of PUCCH resource with the smallest index when the at least one PUCCH resource further includes at least two second type of PUCCH resources;

the first one of the second type of PUCCH resources when the at least one PUCCH resource further includes at least two second type of PUCCH resources.

Optionally, the first type of UCI includes any one or more of the following:

channel state information (CSI);

schedule request (SR).

Optionally, the first type of PUCCH resource is any one of the following:

PUCCH format 2 resource;

PUCCH format 3 resource;

PUCCH format 4 resource.

Optionally, the second type of PUCCH resource is any one of the following:

PUCCH format 0 resource;

PUCCH format 1 resource.

Optionally, the time unit is any one of the following:

one sub-frame;

one slot;

one mini-slot.

It should be noted that the terminal provided by the embodiment of the present disclosure is capable of performing various processes in the embodiments of the methods of FIGS. 2 to 9, the implementation principle and technical effects are similar, and the embodiment of the present disclosure will not be described again in detail herein.

An embodiment of the present disclosure further provides a base station, and since the principle of the base station for solving the problem is similar to that of the HARQ-ACK receiving method in the embodiment of the present disclosure, the implementation of the base station can be referred to the implementation of the HARQ-ACK receiving method, and the repetition thereof is omitted.

Figure 12:
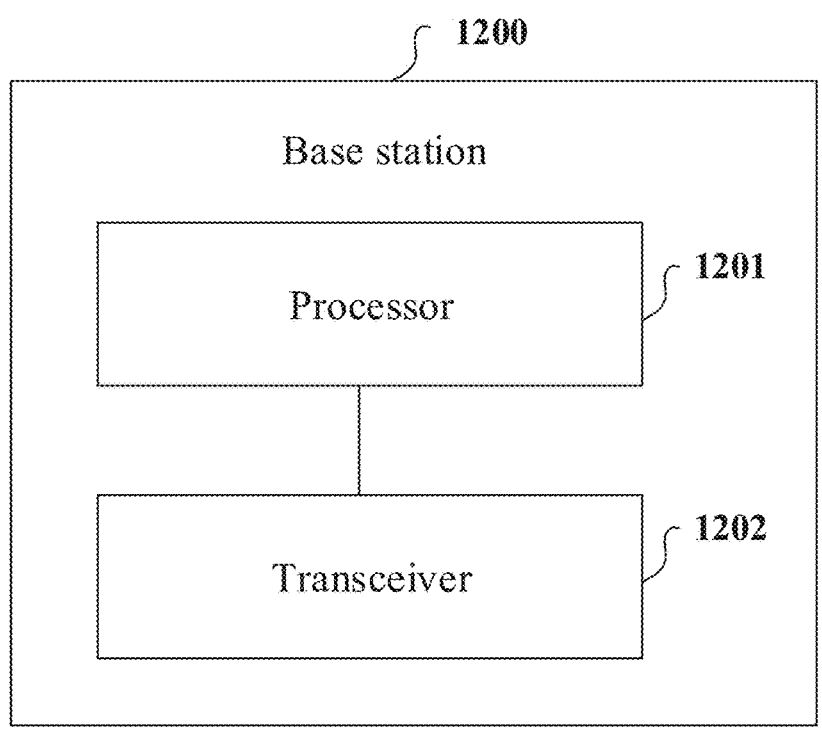
FIG. 12 is a first schematic diagram of a base station provided by an embodiment of the present disclosure.

Referring to FIG. 12, an embodiment the present disclosure further provides a base station 1200 including a processor 1201 and a transceiver 1202, where, the transceiver 1202 may be a number of elements, including a transmitter and a receiver, providing units for communicating with various other devices on a transmission medium;

and the processor 1201 is configured to determine one PUCCH resource for transmitting HARQ-ACK of a SPS PDSCH from at least one PUCCH resource for transmitting the HARQ-ACK of the SPS PDSCH, where the at least one PUCCH resource includes at least one first type of PUCCH resource, and the first type of PUCCH resource is a PUCCH resource for carrying more than 2 bits of information;

The processor 1201 or the transceiver 1202 receives the HARQ-ACK of the SPS PDSCH on the determined PUCCH resource.

Optionally, when the HARQ-ACK of the SPS PDSCH and a first type of uplink control information (UCI) are transmitted in a same time unit, the processor 1201 is further configured to:

when a preset PUCCH resource in the at least one PUCCH resource and a resource of the first type of UCI do not overlap in a time domain, determine the preset PUCCH resource as the PUCCH resource for transmitting the HARQ-ACK of the SPS PDSCH.

Optionally, when the HARQ-ACK of the SPS PDSCH and a first type of UCI are transmitted in a same time unit, the processor 1201 is further configured to:

when the preset PUCCH resources in the at least one PUCCH resource and the resource of the first type of UCI overlap in the time domain, determine one first type of PUCCH resource as the PUCCH resource for transmitting the HARQ-ACK of the SPS PDSCH and the first type of UCI from the at least one PUCCH resource;

The processor 1201 or the transceiver 1202 is further configured to:
receive the HARQ-ACK of the SPS PDSCH and the first type of UCI on the determined first type of PUCCH resource.

Optionally, when the HARQ-ACK of the SPS PDSCH and a first type of UCI are transmitted in a same time unit, the processor 1201 is further configured to:
when the at least one PUCCH resource further includes at least one second type of PUCCH resource, determine one second type of PUCCH resource which does not overlap with the resource of the first type of UCI in the time domain as the PUCCH resource for transmitting the HARQ-ACK of the SPS PDSCH if the at least one second type of PUCCH resource which does not overlap with the resource of the first type of UCI in the time domain exists in the at least one PUCCH resource;
where the second type of PUCCH resource is a PUCCH resource for carrying no more than 2 bits of information.

Optionally, when the HARQ-ACK of the SPS PDSCH and a first type of UCI are transmitted in a same time unit, the processor 1201 is further configured to:
when the at least one PUCCH resource further includes at least one second type of PUCCH resource, determine one first type of PUCCH resource as the PUCCH resource for transmitting the HARQ-ACK of the SPS PDSCH and the UCI from the at least one PUCCH resource;
where the second type of PUCCH resource is a PUCCH resource for carrying no more than 2 bits of information;

The processor 1201 or the transceiver 1202 is further configured to:
receive the HARQ-ACK of the SPS PDSCH and the first type of UCI on the determined first type of PUCCH resource.

Optionally, when the HARQ-ACK for the SPS PDSCH is transmitted in a same time unit as the first type of UCI, in the time unit, the processor 1201 is further configured to:
when the at least one PUCCH resource only includes the first type of PUCCH resource, determine one first type of PUCCH resource as the PUCCH resource for transmitting the HARQ-ACK of the SPS PDSCH and the first type of UCI;

The processor 1201 or the transceiver 1202 is further configured to:
receive the HARQ-ACK of the SPS PDSCH and the first type of UCI on the determined first type of PUCCH resource.

Optionally, when there is no first type of UCI in the time unit where the HARQ-ACK transmission of the SPS PDSCH is located, the processor 1201 is further configured to:
when the at least one PUCCH resource further includes the second type of PUCCH resource, determine one second type of PUCCH resource as the PUCCH resource for transmitting the HARQ-ACK of the SPS PDSCH.

Optionally, when there is no first type of UCI in the time unit where the HARQ-ACK transmission of the SPS PDSCH is located, the processor 1201 is further configured to:
when the at least one PUCCH resource only includes the first type of PUCCH resource, determine one first type of PUCCH resource as the PUCCH resource used for transmitting the HARQ-ACK of the SPS PDSCH.

Optionally, the processor 1201 determines one first type of PUCCH resource as the PUCCH resource for transmitting the HARQ-ACK of the SPS PDSCH and the first type of UCI from the at least one PUCCH resource, includes:
when the at least one PUCCH resource includes at least two first type of PUCCH resources, determine any one of the following first type of PUCCH resources as the PUCCH resource for transmitting the HARQ-ACK of the SPS PDSCH and the first type of UCI from the at least one PUCCH resource:
one first type of PUCCH resource indicated by a PUCCH resource indication (PRI) in a physical downlink control channel (PDCCH) indicating SPS PDSCH to activation;
one first type of PUCCH resource with the lowest carrying capacity being capable of carrying the HARQ-ACK of the SPS PDSCH and the first UCI without exceeding a set code rate, where different first type of PUCCH resources have different carrying capacities;
one first type PUCCH resource with the largest carrying capacity when all the first type of PUCCH resources in the at least one PUCCH resource being not capable of carrying the HARQ-ACK of the SPS PDSCH and the first UCI without exceeding the set code rate, where different first type of PUCCH resources have different carrying capacities;
one first type of PUCCH resource with the smallest index;
the first one of the first type of PUCCH resources.

Optionally, the processor 1201 determines one second type of PUCCH resource as the PUCCH resource for transmitting the HARQ-ACK of the SPS PDSCH, includes:
when the at least one PUCCH resource includes at least two second type of PUCCH resources, determine any one of the following second type of PUCCH resources as the PUCCH resource for transmitting the HARQ-ACK of the SPS PDSCH from the at least two second type of PUCCH resources:
one second type of PUCCH resource indicated by the PRI in the PDCCH indicating SPS PDSCH activation;
the second type of PUCCH resource with the smallest index;
the first one of the second type of PUCCH resources.

Optionally, before determining one PUCCH resource for transmitting HARQ-ACK of a SPS PDSCH from at least one PUCCH resource, the processor 1201 is further configured to:
judge whether a transmission opportunity of the HARQ-ACK of the SPS PDSCH overlaps with a transmission opportunity of the first type of UCI;

The processor 1201 determines one PUCCH resource for transmitting the HARQ-ACK of a SPS PDSCH from at least one PUCCH resource, includes:
when the transmission opportunity of the HARQ-ACK of the SPS PDSCH overlaps with the transmission opportunity of the first type of UCI, determine one PUCCH resource for transmitting the HARQ-ACK of the SPS PDSCH from the at least one PUCCH resource.

Optionally, before determining one PUCCH resource for transmitting HARQ-ACK of a SPS PDSCH from at least one PUCCH resource, the processor 1201 is further configured to:

judge whether the HARQ-ACK of the SPS PDSCH and the first type of UCI are supported to be transmitted simultaneously;

The processor 1201 determines one PUCCH resource for transmitting the HARQ-ACK of the SPS PDSCH from at least one PUCCH resource, includes:

when the HARQ-ACK of the SPS PDSCH and the first type of UCI are supported to be transmitted simultaneously, determine one PUCCH resource for transmitting the HARQ-ACK of the SPS PDSCH from the at least one PUCCH resource.

Optionally, before determining one PUCCH resource for transmitting HARQ-ACK of a SPS PDSCH from at least one PUCCH resource, the processor 1201 is further configured to:

determine the at least one PUCCH resource according to a configuration signaling.

Optionally, the preset PUCCH resource in the at least one PUCCH resource is any one of the following:

the PUCCH resource with the smallest index in the at least one PUCCH resource;

the first one of the at least one PUCCH resource;

a PUCCH resource determined by the PRI in the PDCCH indicating SPS PDSCH activation;

the second type of PUCCH resource when the at least one PUCCH resource further includes the second type of PUCCH resource;

the second type of PUCCH resource with the smallest index when the at least one PUCCH resource further includes at least two second type of PUCCH resources;

the first one of the second type of PUCCH resources when the at least one PUCCH resource further includes at least two second type of PUCCH resources.

Optionally, the first type of UCI includes any one or more of the following:

channel state information (CSI);

schedule request (SR).

Optionally, the first type of PUCCH resource is any one of the following:

PUCCH format 2 resource;

PUCCH format 3 resource;

PUCCH format 4 resource.

Optionally, the second type of PUCCH resource is any one of the following:

PUCCH format 0 resource;

PUCCH format 1 resource.

Optionally, the time unit is any one of the following:

one sub-frame;

one slot;

one mini-slot.

It should be noted that the base station provided by the embodiment of the present disclosure is capable of implementing the various processes of the embodiments of the methods of FIGS. 2 to 8, the implementation principle and technical effects are similar, and the embodiment of present disclosure is not described again in detail herein.

Figure 13:
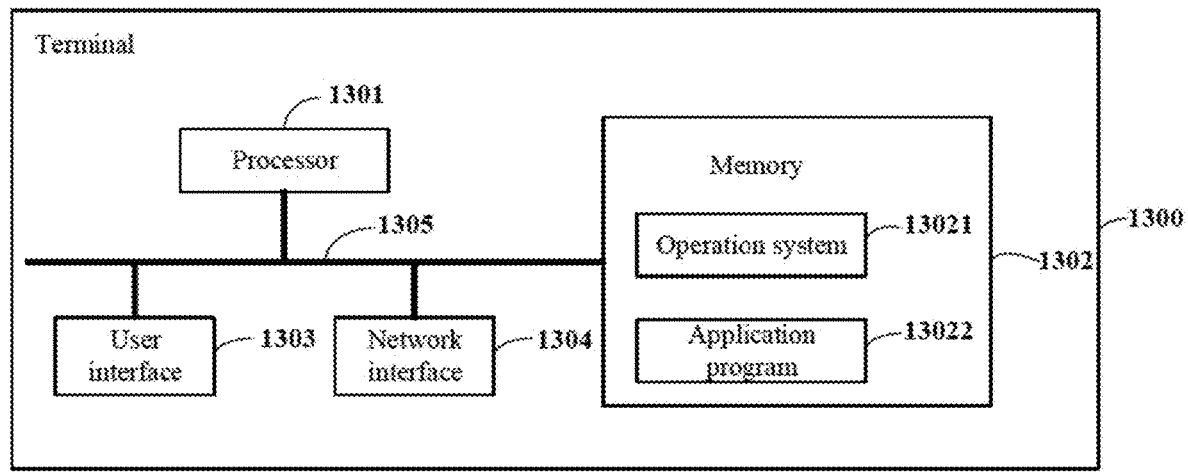
FIG. 13 is a second schematic diagram of a terminal provided by an embodiment of the present disclosure.

As shown in FIG. 13, the terminal 1300 shown in FIG. 13 includes; at least one processor (1301), a memory (1302), at least one network interface (1304) and a user interface (1303). The various components of the terminal 1300 are coupled together by a bus system 1305. As will be appreciated, the bus system 1305 is used to enable connection communication between these components. The bus system 1305 includes, in addition to a data bus, a power bus, a control bus and a status signal bus. For clarity of illustration, however, the various buses are labeled as the bus system 1305 in FIG. 13.

The user interface 1303 may include a display, a keyboard, or a pointing device (e.g. a mouse, trackball, touch pad, or touch screen).

It is understood that the memory 1302 in the embodiment of the present disclosure may be either a volatile memory or a nonvolatile memory, or may include both volatile and nonvolatile memories. Wherein, the non-volatile memory may be a read-only memory (ROM), a programmable ROM (PROM), an erasable PROM (EPROM), an electrically EPROM (EEPROM) or a flash memory. The volatile memory may be a random access memory (RAM), which acts as an external cache. By way of example, but not limitation, many forms of RAM are available such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM) and a direct rambus RAM (DRRAM). The memory 1302 of the systems and methods described in the embodiments of the present disclosure is intended to include, but is not limited to, these and any other suitable types of memory.

In some embodiments, the memory 1302 stores the following elements, executable modules or data structures, or subsets thereof, or extended sets thereof: an operation system 13021 and application programs 13022.

The operation system 13021 includes various system programs, such as a framework layer, a core library layer, a driver layer, for implementing various basic services and processing hardware-based tasks. The application programs 13022 include various application programs such as a media player, a browser, for implementing various application services. The programs for implementing the embodiments of the methods of the present disclosure may be included in the application programs 13022.

In one embodiment of the present disclosure, various steps in the HARQ-ACK sending method are implemented by calling the programs or the instructions stored in the memory 1302, specifically, the programs or the instructions stored in the application programs 13022.

The terminal provided by the embodiment of the present disclosure can execute the embodiments of the above HARQ-ACK sending method, the implementation principle and technical effect thereof are similar, and the embodiments will not be described again in detail herein.

Figure 14:
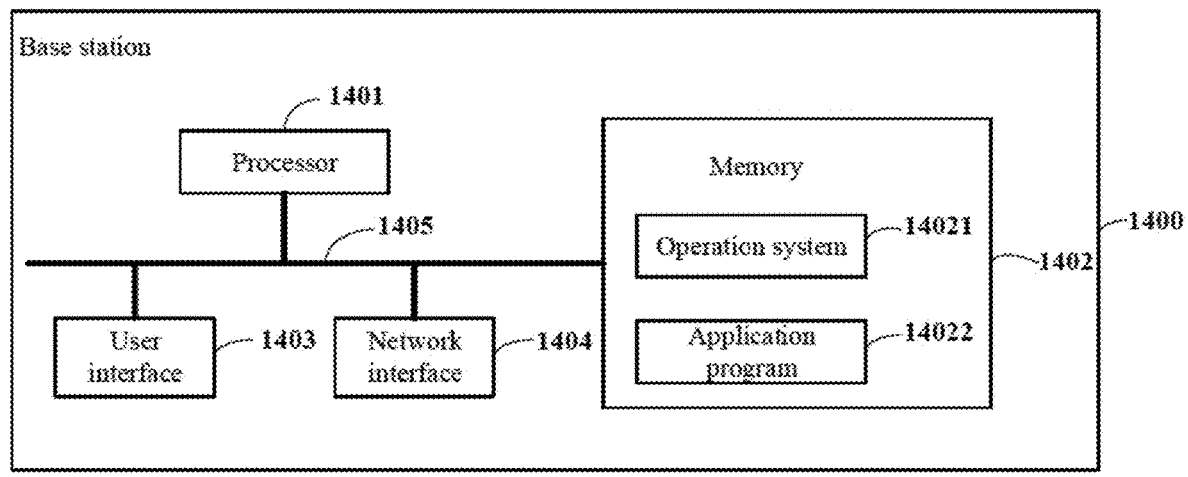
FIG. 14 is a second schematic diagram of a base station provided by an embodiment of the present disclosure.

As shown in FIG. 14, the base station 1400 shown in FIG. 14 includes: at least one processor (1401), a memory (1402), at least one network interface (1404) and a user interface (1403). The various components in the base station 1400 are coupled together by a bus system 1405. As will be appreciated, the bus system 1405 is used to enable connection communication between these components. The bus system 1405 includes, in addition to a data bus, a power bus, a control bus and a status signal bus. For clarity of illustration, the various buses are labeled as the bus system 1405 in FIG. 14.

The user interface 1403 may include a display, a keyboard, or a pointing device (e.g. a mouse, trackball, touch pad, or touch screen).

It is understood that the memory 1402 in the embodiment of the present disclosure may be either a volatile memory or a nonvolatile memory, or may include both volatile and nonvolatile memories. Wherein, the non-volatile memory may be a read-only memory (ROM), a programmable ROM (PROM), an erasable PROM (EPROM), an electrically EPROM (EEPROM) or a flash memory. The volatile memory may be a random access memory (RAM), which acts as an external cache. By way of example, but not limitation, many forms of RAM are available such as a static random access memory (SRAM), a dynamic random access memory (DRAM), a synchronous DRAM (SDRAM), a double data rate SDRAM (DDR SDRAM), an enhanced SDRAM (ESDRAM), a synchlink DRAM (SLDRAM) and a direct rambus RAM (DRRAM). The memory 1402 of the systems and methods described in the embodiments of the present disclosure is intended to include, but is not limited to, these and any other suitable types of memory.

In some embodiments, the memory 1402 stores the following elements, executable modules or data structures, or subsets thereof, or extended sets thereof: an operation system 14021 and application programs 14022.

The operation system 14021 includes various system programs, such as a framework layer, a core library layer, a driver layer, for implementing various basic services and processing hardware-based tasks. The application programs 14022 include various application programs such as a media player, a browser, for implementing various application services. The programs for implementing the embodiments of the methods of the present disclosure may be included in the application programs 14022.

In one embodiment of the present disclosure, various steps in the HARQ-ACK receiving method are implemented by calling the programs or the instructions stored in the memory 1402, specifically, the programs or the instructions stored in the application programs 14022.

The base station provided by the embodiment of the present disclosure can implement the embodiments of the above HARQ-ACK receiving method, the implementation principles and technical effects thereof are similar, and the embodiments will not be described again in detail herein.

An embodiment of the present disclosure further provides a computer-readable storage medium storing computer programs thereon, where when the computer programs are executed by a processor, the steps of the HARQ-ACK sending method and the HARQ-ACK receiving method provided by the embodiments of the present disclosure.

Figure 15:
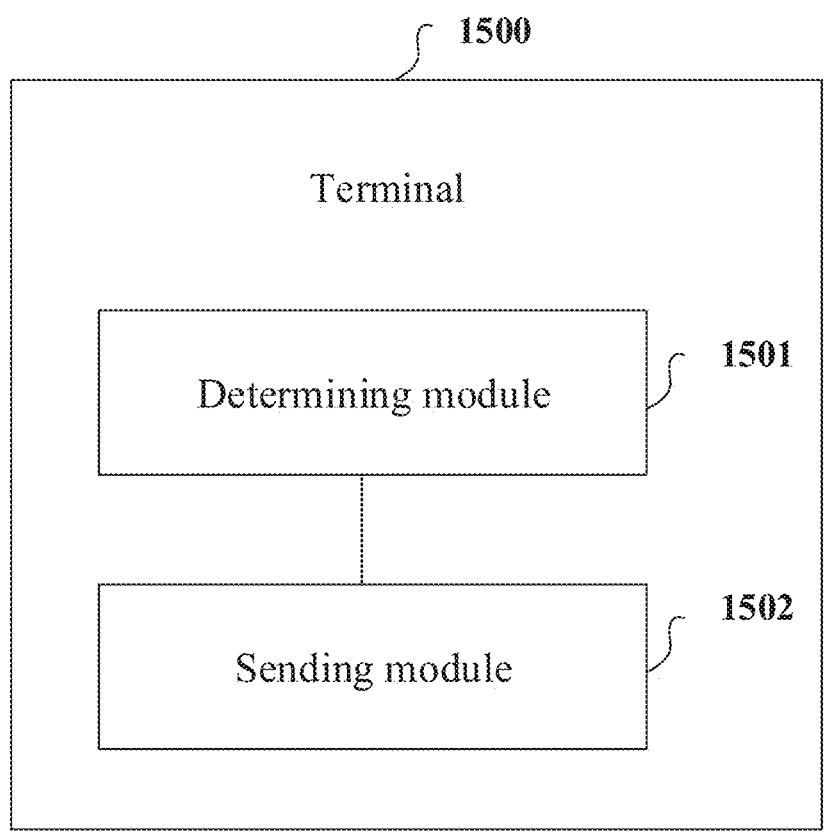
FIG. 15 is a third schematic diagram of a terminal provided by an embodiment of the present disclosure.

Referring to FIG. 15, the present disclosure further provides a terminal 1500 including, as shown in FIG. 15:

a determining module 1501, configured to determine one PUCCH resource for transmitting hybrid automatic repeat request acknowledgement (HARQ-ACK) of a SPS PDSCH from at least one PUCCH resource for transmitting the HARQ-ACK of the SPS PDSCH, where the at least one PUCCH resource includes at least one first type of PUCCH resource, and the first type of PUCCH resource is a PUCCH resource for carrying more than 2 bits of information; and a sending module 1502, configured to send the HARQ-ACK of the SPS PDSCH on the determined PUCCH resource.

Optionally, when the HARQ-ACK of the SPS PDSCH and a first type of uplink control information (UCI) are transmitted in a same time unit, the determining module 1501 is further configured to:

when a preset PUCCH resource in the at least one PUCCH resource and a resource of the first type of UCI do not overlap in a time domain, determine the preset PUCCH resource is the PUCCH resource for transmitting the HARQ-ACK of the SPS PDSCH.

Optionally, when the HARQ-ACK of the SPS PDSCH and a first type of UCI are transmitted in a same time unit, the determining module 1501 is further configured to:

when the preset PUCCH resources in the at least one PUCCH resource and the resource of the first type of UCI overlap in the time domain, determine one first type of PUCCH resource as the PUCCH resource for transmitting the HARQ-ACK of the SPS PDSCH and the first type of UCI from the at least one PUCCH resource;

The sending module 1502 is further configured to:

send the HARQ-ACK of the SPS PDSCH and the first type of UCI on the determined first type of PUCCH resource.

Optionally, when the HARQ-ACK of the SPS PDSCH and a first type of UCI are transmitted in a same time unit, the determination module 1501 is further configured to:

when the at least one PUCCH resource further includes at least one second type of PUCCH resource, determine one second type of PUCCH resource which does not overlap with the resource of the first type of UCI in the time domain as the PUCCH resource for transmitting the HARQ-ACK of the SPS PDSCH if the at least one second type of PUCCH resource which does not overlap with the resource of the first type of UCI in the time domain exists in the at least one PUCCH resource;

where the second type of PUCCH resource is a PUCCH resource for carrying no more than 2 bits of information.

Optionally, when the HARQ-ACK of the SPS PDSCH and a first type of UCI are transmitted in a same time unit, the determination module 1501 is further configured to:

when the at least one PUCCH resource further includes at least one second type of PUCCH resource, determine one first type of PUCCH resource as the PUCCH resource for transmitting the HARQ-ACK of the SPS PDSCH and the UCI from the at least one PUCCH resource if the second type of PUCCH resource which does not overlap with the resource of the first type of UCI in the time domain does not exist in the at least one PUCCH resource;

where the second type of PUCCH resource is a PUCCH resource for carrying no more than 2 bits of information;

The sending module 1502 is specifically:

send the HARQ-ACK of the SPS PDSCH and the first type of UCI on the determined first type of PUCCH resource.

Optionally, when the HARQ-ACK of the SPS PDSCH and a first type of UCI are transmitted in a same time unit, the determination module 1501 is further configured to:

when the at least one PUCCH resource only includes the first type of PUCCH resource, determine one first type of PUCCH resource as the PUCCH resource for transmitting the HARQ-ACK of the SPS PDSCH and the first type of UCI;

The sending module 1502 is further configured to:

send the HARQ-ACK of the SPS PDSCH and the first type of UCI on the determined first type of PUCCH resource.

Optionally, when the first type of UCI does not exist in the time unit where the HARQ-ACK transmission of the SPS PDSCH is located, in the time unit, the determination module 1501 is further configured to:

when the at least one PUCCH resource further includes the second type of PUCCH resource, determine one second type of PUCCH resource as the PUCCH resource for transmitting the HARQ-ACK of the SPS PDSCH.

Optionally, when the first type of UCI does not exist in the time unit where the HARQ-ACK transmission of the SPS PDSCH is located, in the time unit, the determination module 1501 is further configured to:

when the at least one PUCCH resource only includes the first type of PUCCH resource, determine one first type of PUCCH resource as the PUCCH resource for transmitting the HARQ-ACK of the SPS PDSCH.

Optionally, the determination module 1501 determines one first type of PUCCH resource as the PUCCH resource for transmitting the HARQ-ACK of the SPS PDSCH and the first type of UCI from the at least one PUCCH resource, includes:

when the at least one PUCCH resource includes at least two first type of PUCCH resources, determine any one of the following first type of PUCCH resources as the PUCCH resource for transmitting the HARQ-ACK of the SPS PDSCH and the first type of UCI from the at least one PUCCH resource:

one first type of PUCCH resource indicated by a PUCCH resource indication (PRI) in a physical downlink control channel (PDCCH) indicating SPS PDSCH activation;

one first type of PUCCH resource with the lowest carrying capacity being capable of carrying the HARQ-ACK of the SPS PDSCH and the first UCI without exceeding a set code rate, where different first type of PUCCH resources have different carrying capacities;

the first type of PUCCH resource with the largest carrying capacity is one when all the first type of PUCCH resources in the at least one PUCCH resource being not capable carrying the HARQ-ACK of the SPS PDSCH and the first UCI without exceeding the set code rate, where different first type of PUCCH resources have different carrying capacities;

one first type of PUCCH resource with the smallest index;

the first one of the first type of PUCCH resources.

Optionally, the determination module 1501 determines one second type of PUCCH resource as the PUCCH resource for transmitting the HARQ-ACK of the SPS PDSCH, includes:

when the at least one PUCCH resource includes at least two second type of PUCCH resources, determine any one of the following second type of PUCCH resources as the PUCCH resource for transmitting the HARQ-ACK of the SPS PDSCH from the at least two second type of PUCCH resources:

one second type of PUCCH resource indicated by the PRI in the PDCCH indicating SPS PDSCH activation;

the second type of PUCCH resource with the smallest index;

the first one of the second type of PUCCH resources.

Optionally, before determining one PUCCH resource for transmitting HARQ-ACK of a SPS PDSCH from at least one PUCCH resource, the determination module 1501 is further configured to:

judge whether a transmission opportunity of the HARQ-ACK of the SPS PDSCH overlaps with a transmission opportunity of the first type of UCI;

The determination module 1501 is further configured to:

when the transmission opportunity of the HARQ-ACK of the SPS PDSCH and the transmission opportunity of the first type of UCI overlap, determine one PUCCH resource for transmitting the HARQ-ACK of the SPS PDSCH from the at least one PUCCH resource.

Optionally, before determining one PUCCH resource for transmitting HARQ-ACK of a SPS PDSCH from at least one PUCCH resource, the determination module 1501 is further configured to:

judge whether the HARQ-ACK of the SPS PDSCH and the first type of UCI are supported to be transmitted simultaneously;

The determination module 1501 is further configured to:

when the HARQ-ACK of the SPS PDSCH and the first type of UCI are supported to be transmitted simultaneously, determine one PUCCH resource for transmitting the HARQ-ACK of the SPS PDSCH from the at least one PUCCH resource.

Optionally, before determining one PUCCH resource for transmitting HARQ-ACK of a SPS PDSCH from at least one PUCCH resource, the determination module 1501 is further configured to:

determine the at least one PUCCH resource according to a configuration signaling.

Optionally, the preset PUCCH resource in the at least one PUCCH resource is any one of the following:

the PUCCH resource with the smallest index in the at least one PUCCH resource;

the first one of the at least one PUCCH resource;

a PUCCH resource determined by the PRI in the PDCCH indicating SPS PDSCH activation;

the second type of PUCCH resource when the at least one PUCCH resource further includes the second type of PUCCH resource;

the second type of PUCCH resource with the smallest index when the at least one PUCCH resource further includes at least two second type of PUCCH resources;

the first one of the second type of PUCCH resources when the at least one PUCCH resource further includes at least two second type of PUCCH resources.

Optionally, the first type of UCI includes any one or more of the following:

channel state information (CSI);

schedule request (SR).

Optionally, the first type of PUCCH resource is any one of the following:

PUCCH format 2 resource;

PUCCH format 3 resource;

PUCCH format 4 resource.

Optionally, the second type of PUCCH resource is any one of the following:

PUCCH format 0 resource;

PUCCH format 1 resource.

Optionally, the time unit is any one of the following:

one sub-frame;

one slot;

one mini-slot.

It should be noted that the terminal provided by the embodiment of the present disclosure is capable of performing various processes in the embodiments of the methods of FIGS. 2 to 9, the implementation principle and technical effects are similar, and the embodiments of the present disclosure will not be described again in detail herein.

Figure 16:
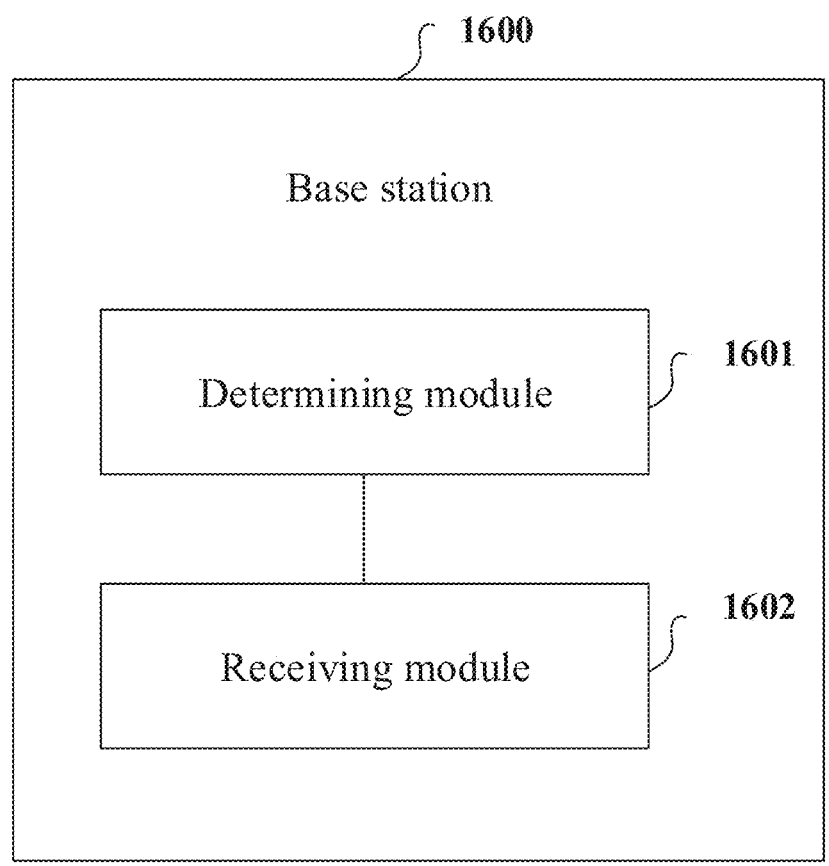
FIG. 16 is a third schematic diagram of a base station provided by an embodiment of the present disclosure.

Referring to FIG. 16, the present disclosure further provides a base station 1600 as shown in FIG. 16, including:

a determining module 1601, configured to determine one PUCCH resource for transmitting HARQ-ACK of the SPS PDSCH from at least one PUCCH resource for transmitting the HARQ-ACK of the SPS PDSCH, where the at least one PUCCH resource includes at least one first type of PUCCH resource, and the first type of PUCCH resource is a PUCCH resource for carrying more than 2 bits of information; and a receiving module 1602, configured to receive the HARQ-ACK of the SPS PDSCH on the determined PUCCH resource.

Optionally, when the HARQ-ACK of the SPS PDSCH and a first type of uplink control information (UCI) are transmitted in a same time unit, the determination module 1601 is further configured to:

when a preset PUCCH resource in the at least one PUCCH resource and a resource of the first type of UCI do not overlap in a time domain, determine the preset PUCCH resource as the PUCCH resource for transmitting the HARQ-ACK of the SPS PDSCH.

Optionally, when the HARQ-ACK of the SPS PDSCH and a first type of UCI are transmitted in a same time unit, the determination module 1601 is further configured to:

when the preset PUCCH resources in the at least one PUCCH resource and the resource of the first type of UCI overlap in the time domain, determine one first type of PUCCH resource as the PUCCH resource for transmitting the HARQ-ACK of the SPS PDSCH and the first type of UCI from the at least one PUCCH resource;

The receiving module 1602 is further configured to:

receive the HARQ-ACK of the SPS PDSCH and the first type of UCI on the determined first type of PUCCH resource.

Optionally, when the HARQ-ACK of the SPS PDSCH and a first type of UCI are transmitted in a same time unit, the determination module 1601 is further configured to:

when the at least one PUCCH resource further includes at least one second type of PUCCH resource, determine one second type of PUCCH resource which does not overlap with the resource of the first type of UCI in the time domain as the PUCCH resource for transmitting the HARQ-ACK of the SPS PDSCH if the at least one second type of PUCCH resource which does not overlap with the resource of the first type of UCI in the time domain exists in the at least one PUCCH resource;

where the second type of PUCCH resource is a PUCCH resource for carrying no more than 2 bits of information.

Optionally, when the HARQ-ACK of the SPS PDSCH and a first type of UCI are transmitted in a same time unit, the determination module 1601 is further configured to:

when the at least one PUCCH resource further includes at least one second type of PUCCH resource, determine one first type of PUCCH resource as the PUCCH resource for transmitting the HARQ-ACK of the SPS PDSCH and the UCI from the at least one PUCCH resource if the second type of PUCCH resource which does not overlap with the resource of the first type of UCI in the time domain does not exist in the at least one PUCCH resource;

where the second type of PUCCH resource is a PUCCH resource for carrying no more than 2 bits of information;

The receiving module 1602 is further configured to:

receive the HARQ-ACK of the SPS PDSCH and the first type of UCI on the determined first type of PUCCH resource.

Optionally, when the HARQ-ACK of the SPS PDSCH and a first type of UCI are transmitted in a same time unit, the determination module 1601 is further configured to:

when the at least one PUCCH resource only includes the first type of PUCCH resource, determine one first type of PUCCH resource as the PUCCH resource for transmitting the HARQ-ACK of the SPS PDSCH and the first type of UCI;

The receiving module 1602 is further configured to:

receive the HARQ-ACK of the SPS PDSCH and the first type of UCI on the determined first type of PUCCH resource.

Optionally, when the first type of UCI does not exist in the time unit where the HARQ-ACK transmission of the SPS PDSCH is located, in the time unit, the determination module 1601 is further configured to:

when the at least one PUCCH resource further includes the second type of PUCCH resource, determine one second type of PUCCH resource as the PUCCH resource for transmitting the HARQ-ACK of the SPS PDSCH.

Optionally, when the first type of UCI does not exist in the time unit where the HARQ-ACK transmission of the SPS PDSCH is located, in the time unit, the determination module 1601 is further configured to:

when the at least one PUCCH resource only includes the first type of PUCCH resource, determine one first type of PUCCH resource as the PUCCH resource for transmitting the HARQ-ACK of the SPS PDSCH.

Optionally, the determination module 1601 determines one first type of PUCCH resource as the PUCCH resource for transmitting the HARQ-ACK of the SPS PDSCH and the first type of UCI from the at least one PUCCH resource, includes:

when the at least one PUCCH resource includes at least two first type of PUCCH resources, determine any one of the following first type of PUCCH resources as the PUCCH resource for transmitting HARQ-ACK of the SPS PDSCH and the first type of UCI from the at least one PUCCH resource:

one first type of PUCCH resource indicated by a PUCCH resource indication (PRI) in a physical downlink control channel (PDCCH) indicating SPS PDSCH activation;

one first type of PUCCH resource with the lowest carrying capacity being capable of carrying the HARQ-ACK of the SPS PDSCH and the first UCI without exceeding a set code rate, where different first type of PUCCH resources have different carrying capacities;

the first type of PUCCH resource with the largest carrying capacity when all the first type of PUCCH resources in the at least one PUCCH resource being not capable of carrying the HARQ-ACK of the SPS PDSCH and the first UCI without exceeding the set code rate, where different first type PUCCH resources have different bearing capacities;

one first type of PUCCH resource with the smallest index;

the first one of the first type of PUCCH resources.

Optionally, the determination module 1601 determines one second type of PUCCH resource as the PUCCH resource for transmitting the HARQ-ACK of the SPS PDSCH, includes:

when the at least one PUCCH resource includes at least two second type of PUCCH resources, determine any one of the following second type of PUCCH resources as the PUCCH resource for transmitting the HARQ-ACK of the SPS PDSCH from the at least two second type of PUCCH resources:

one second type of PUCCH resource indicated by the PRI in the PDCCH indicating SPS PDSCH activation;

the second type of PUCCH resource with the smallest index;
the first one of the second type of PUCCH resources.

Optionally, before determining one PUCCH resource for transmitting HARQ-ACK of a SPS PDSCH from at least one PUCCH resource, the determination module 1601 is further configured to:
judge whether a transmission opportunity of the HARQ-ACK of the SPS PDSCH overlaps with a transmission opportunity of the first type of UCI;

The determination module 1601 determines one PUCCH resource for transmitting HARQ-ACK of a SPS PDSCH from at least one PUCCH resource, includes:
when the transmission opportunity of the HARQ-ACK of the SPS PDSCH and the transmission opportunity of the first type of UCI overlap, determine one PUCCH resource for transmitting the HARQ-ACK of the SPS PDSCH from the at least one PUCCH resource.

Optionally, before determining one PUCCH resource for transmitting HARQ-ACK of a SPS PDSCH from at least one PUCCH resource, the determination module 1601 is further configured to:
judge whether the HARQ-ACK of the SPS PDSCH and the first type of UCI are supported to be transmitted simultaneously;

The determination module 1601 determines one PUCCH resource for transmitting HARQ-ACK of a SPS PDSCH from at least one PUCCH resource, includes:
when the HARQ-ACK of the SPS PDSCH and the first type of UCI are supported to be transmitted simultaneously, determine one PUCCH resource for transmitting the HARQ-ACK of the SPS PDSCH from the at least one PUCCH resource.

Optionally, before determining one PUCCH resource for transmitting HARQ-ACK of a SPS PDSCH from at least one PUCCH resource, the determination module 1601 is further configured to:
determine the at least one PUCCH resource according to a configuration signaling.

Optionally, the preset PUCCH resource in the at least one PUCCH resource is any one of the following:
the PUCCH resource with the smallest index in the at least one PUCCH resource;
the first one of the at least one PUCCH resource;
a PUCCH resource determined by the PRI in the PDCCH indicating SPS PDSCH activation;
the second type of PUCCH resource when the at least one PUCCH resource further includes the second type of PUCCH resource;
the second type of PUCCH resource with the smallest index when the at least one PUCCH resource further includes at least two second type of PUCCH resources;
the first one of the second type of PUCCH resources when the at least one PUCCH resource further includes at least two second type of PUCCH resources.

Optionally, the first type of UCI includes any one or more of the following:
channel state information (CSI);
schedule request (SR).

Optionally, the first type of PUCCH resource is any one of the following:
PUCCH format 2 resource;
PUCCH format 3 resource;
PUCCH format 4 resource.

Optionally, the second type of PUCCH resource is any one of the following:
PUCCH format 0 resource;
PUCCH format 1 resource.

Optionally, the time unit is any one of the following:
one sub-frame;
one slot;
one mini-slot.

It should be noted that the base station provided by the embodiment of the present disclosure is capable of implementing the various processes of the embodiments of the methods of FIGS. 2 to 9, the implementation principle and technical effects are similar, and the embodiments of the present disclosure will not be described again in detail herein.

In the several embodiments provided by the present application, it should be understood that the disclosed methods and devices may be implemented in other ways. For example, the above embodiments of the devices are merely illustrative, e.g. the division of units is only one logical function and may be implemented in practice in another way, e.g. a plurality of units or components may be combined or integrated into another system, or some features may be omitted, or may not be implemented. Alternatively, the coupling or direct coupling or communicative connection shown or discussed with respect to one another may be an indirect coupling or communicative connection through some interfaces, devices, or units, whether electrical, mechanical, or otherwise.

In addition, various functional units in various embodiments of the present disclosure may be integrated in one processing unit, or each unit may be physically included separately, or two or more units may be integrated in one unit. The integrated units can be realized in the form of hardware or in the form of hardware and software functional units.

The above integrated units implemented in the form of software functional units, may be stored in a computer readable storage medium. The above software functions are stored in a storage medium and include various instructions for causing a computer device (which may be a personal computer, server, or network device, etc.) to perform some of the steps of the sending and receiving methods of the various embodiments of the present disclosure. The storage medium includes: a U-disk, a removable hard disk, a read-only memory (ROM), a random access memory (RAM), a magnetic disk, an optical disk and other media being capable of storing program codes.

While the foregoing is directed to some embodiments of the present disclosure, it will be understood by those skilled in the art that various improvements and modification may be made without departing from the principles of the disclosure, and these improvements and modifications shall fall within the scope of the present disclosure.

What is claimed is:

1. A hybrid automatic repeat request acknowledgement (HARQ-ACK) sending method applied to a terminal, comprising:
determining one physical uplink control channel (PUCCH) resource for transmitting an HARQ-ACK of a semi-persistent scheduling physical downlink shared channel (SPS PDSCH) from at least one PUCCH resource configured for the SPS PDSCH and for transmitting the HARQ-ACK of the SPS PDSCH, wherein the at least one PUCCH resource comprises at least one first type of PUCCH resource, and the first type of PUCCH resource is a PUCCH resource for carrying more than two bits of information; and
sending the HARQ-ACK of the SPS PDSCH on the determined PUCCH resource.

2. The sending method of claim 1, wherein when the HARQ-ACK of the SPS PDSCH and a first type of uplink control information (UCI) are transmitted in a same time unit, the determining the one PUCCH resource for transmitting the HARQ-ACK of the SPS PDSCH from the at least one PUCCH resource comprises one of the following methods:

Method 1: when a preset PUCCH resource in the at least one PUCCH resource and a resource of the first type of UCI do not overlap in a time domain, determining the preset PUCCH resource as the PUCCH resource for transmitting the HARQ-ACK of the SPS PDSCH;

Method 2: when a preset PUCCH resource in the at least one PUCCH resource and a resource of the first type of UCI overlap in a time domain, determining one first type of PUCCH resource as the PUCCH resource for transmitting the HARQ-ACK of the SPS PDSCH and the first type of UCI from the at least one PUCCH resource;

the sending the HARQ-ACK of the SPS PDSCH on the determined PUCCH resource comprises:
sending the HARQ-ACK of the SPS PDSCH and the first type of UCI on the determined first type of PUCCH resource;

Method 3: when the at least one PUCCH resource further comprises at least one second type of PUCCH resource, determining one second type of PUCCH resource which does not overlap with a resource of the first type of UCI in a time domain as the PUCCH resource for transmitting the HARQ-ACK of the SPS PDSCH if there is at least one second type of PUCCH resource which does not overlap with the resource of the first type of UCI in the time domain in the at least one PUCCH resource;

wherein the second type of PUCCH resource is a PUCCH resource for carrying no more than 2 bits of information;

Method 4: when the at least one PUCCH resource further comprises at least one second type of PUCCH resource, determining one first type of PUCCH resource as the PUCCH resource for transmitting the HARQ-ACK of the SPS PDSCH and the UCI if there is no second type of PUCCH resource which does not overlap with a resource of the first type of UCI in a time domain in the at least one PUCCH resource;

wherein the second type of PUCCH resource is a PUCCH resource for carrying no more than 2 bits of information;

the sending the HARQ-ACK of the SPS PDSCH on the determined PUCCH resource comprises:
sending the HARQ-ACK of the SPS PDSCH and the first type of UCI on the determined first type of PUCCH resource;

Method 5: when the at least one PUCCH resource only comprises the first type of PUCCH resource, determining one first type of PUCCH resource as the PUCCH resource for transmitting the HARQ-ACK of the SPS PDSCH and the first type of UCI;

the sending the HARQ-ACK of the SPS PDSCH on the determined PUCCH resource comprises:
sending the HARQ-ACK of the SPS PDSCH and the first type of UCI on the determined first type of PUCCH resource; and/or, when a first type of UCI does not exist in a time unit where the HARQ-ACK transmission of the SPS PDSCH is located, in the time unit, the determining the one PUCCH resource for transmitting the HARQ-ACK of the SPS PDSCH from the at least one PUCCH resource comprises one of the following methods:

Method 6: when the at least one PUCCH resource further comprises a second type of PUCCH resource, determining one second type of PUCCH resource as the PUCCH resource for transmitting the HARQ-ACK of the SPS PDSCH;

Method 7: when the at least one PUCCH resource only comprises the first type of PUCCH resource, determining one first type of PUCCH resource as the PUCCH resource for transmitting the HARQ-ACK of the SPS PDSCH.

3. The sending method of claim 2, wherein the determining the one first type of PUCCH resource as the PUCCH resource for transmitting the HARQ-ACK of the SPS PDSCH and the first type of UCI from the least one PUCCH resource comprises:

when the at least one PUCCH resource comprises at least two first type of PUCCH resources, determining one of the following first type PUCCH resources as the PUCCH resource for transmitting the HARQ-ACK of the SPS PDSCH and the first type of UCI from the at least one PUCCH resource:

one first type of PUCCH resource indicated by a PUCCH resource indication (PRI) in a physical downlink control channel (PDCCH) indicating the SPS PDSCH activation;

one first type of PUCCH resource with a lowest carrying capacity being capable of carrying the HARQ-ACK of the SPS PDSCH and the first type of UCI without exceeding a set code rate, wherein different first type of PUCCH resources have different carrying capacities;

one first type of PUCCH resource with a largest carrying capacity when all the first type of PUCCH resources in the at least one PUCCH resource being not capable of carrying the HARQ-ACK of the SPS PDSCH and the first type of UCI without exceeding the set code rate, wherein different first type of PUCCH resources have different carrying capacities;

one first type of PUCCH resource with a smallest index;

a first one of the first type of PUCCH resources;

wherein the determining the one second type of PUCCH resource as the PUCCH resource for transmitting the HARQ-ACK of the SPS PDSCH comprises:

when the at least one PUCCH resource comprises at least two second type of PUCCH resources, determining one of the following second type of PUCCH resources as the PUCCH resource for transmitting the HARQ-ACK of the SPS PDSCH from the at least two second type of PUCCH resources:

one second type of PUCCH resource indicated by a PRI in a PDCCH indicating the SPS PDSCH activation;

the second type of PUCCH resource with a smallest index;

a first one of the second type of PUCCH resources.

4. The sending method of claim 1, wherein, prior to the determining the one PUCCH resource for transmitting the HARQ-ACK of the SPS PDSCH from at least one PUCCH resource, the method further comprises:

judging whether a transmission opportunity of the HARQ-ACK of the SPS PDSCH overlaps with a transmission opportunity of a first type of UCI;

the determining the one PUCCH resource for transmitting the HARQ-ACK of the SPS PDSCH from the at least one PUCCH resource comprises:

when the transmission opportunity of the HARQ-ACK of the SPS PDSCH and the transmission opportunity of the first type of UCI overlap, determining one PUCCH resource for transmitting the HARQ-ACK of the SPS PDSCH from the at least one PUCCH resource; and/or, prior to the determining the one PUCCH resource for transmitting the HARQ-ACK of the SPS PDSCH from the at least one PUCCH resource, the method further comprises:

judging whether the HARQ-ACK of the SPS PDSCH and a first type of UCI are supported to be transmitted simultaneously;

the determining the one PUCCH resource for transmitting the HARQ-ACK of the SPS PDSCH from the at least one PUCCH resource comprises:

when the HARQ-ACK of the SPS PDSCH and the first type of UCI are supported to be transmitted simultaneously, determining one PUCCH resource for transmitting the HARQ-ACK of the SPS PDSCH from the at least one PUCCH resource.

5. The sending method of claim 2, wherein the method further comprises at least one of the following ways:

Way 1: the preset PUCCH resource in the at least one PUCCH resource is one of the following:
the PUCCH resource with a smallest index in the at least one PUCCH resource;
a first one of the at least one PUCCH resource;
a PUCCH resource determined by a PRI in a PDCCH indicating the SPS PDSCH activation;
a second type of PUCCH resource when the at least one PUCCH resource further comprises the second type of PUCCH resource;
a second type of PUCCH resource with a smallest index when the at least one PUCCH resource further comprises at least two second type of PUCCH resources;
a first one of at least two second type of PUCCH resources when the at least one PUCCH resource further comprises at least two second type of PUCCH resources; and/or Way 2: the first type of UCI comprises one or more of the following:
channel state information (CSI);
a schedule request (SR); and/or Way 3: the first type of PUCCH resources is one of the following:
a PUCCH format 2 resource;
a PUCCH format 3 resource;
a PUCCH format 4 resource; and/or Way 4: the second type of PUCCH resource is one of the following:
a PUCCH format 0 resource;
a PUCCH format 1 resource; and/or Way 5: the time unit is one of the following:
one sub-frame;
one slot;
one mini-slot.

6. A hybrid automatic repeat request acknowledgement (HARQ-ACK) receiving method applied to a base station comprising:

determining one physical uplink control channel (PUCCH) resource for transmitting an HARQ-ACK of a semi-persistent scheduling physical downlink shared channel (SPS PDSCH) from at least one PUCCH resource configured for the SPS PDSCH and for transmitting the HARQ-ACK of the SPS PDSCH, wherein the at least one PUCCH resource comprises at least one first type of PUCCH resource, and the first type of PUCCH resource is a PUCCH resource for carrying more than 2 bits of information; and receiving the HARQ-ACK of the SPS PDSCH on the determined PUCCH resource.

7. The receiving method of claim 6, wherein when the HARQ-ACK of the SPS PDSCH and a first type of uplink control information (UCI) are transmitted in a same time unit, the determining the one PUCCH resource for transmitting the HARQ-ACK of the SPS PDSCH from the at least one PUCCH resource comprises one of the following methods:

Method 1: when a preset PUCCH resource in the at least one PUCCH resource and the first type of UCI resource do not overlap in a time domain, determining the preset PUCCH resource as the PUCCH resource for transmitting the HARQ-ACK of the SPS PDSCH;

Method 2: when a preset PUCCH resource in the at least one PUCCH resource and the first type of UCI resource overlap in a time domain, determining one first type of PUCCH resource as the PUCCH resource for transmitting the HARQ-ACK of the SPS PDSCH and the first type of UCI from the at least one PUCCH resource;

the receiving the HARQ-ACK of the SPS PDSCH on the determined PUCCH resource comprises:
receiving the HARQ-ACK of the SPS PDSCH and the first type of UCI on the determined first type of PUCCH resource;

Method 3: when the least one PUCCH resource further comprises at least one second type of PUCCH resource, determining one second type of PUCCH resource which does not overlap with a resource of the first type of UCI in a time domain as the PUCCH resource for transmitting the HARQ-ACK of the SPS PDSCH if there is at least one second type of PUCCH resource which does not overlap with the resource of the first type of UCI in the time domain in the at least one PUCCH resource;

wherein the second type of PUCCH resource is a PUCCH resource for carrying no more than 2 bits of information;

Method 4: when the at least one PUCCH resource further comprises at least one second type of PUCCH resource, determining one first type of PUCCH resource as the PUCCH resource for transmitting the HARQ-ACK of the SPS PDSCH and the UCI from the at least one PUCCH resource if there is no second type of PUCCH resource which does not overlap with a resource of the first type of UCI in a time domain in the at least one PUCCH resource;

wherein the second type of PUCCH resource is a PUCCH resource for carrying no more than 2 bits of information;

the receiving the HARQ-ACK of the SPS PDSCH on the determined PUCCH resource comprises:
receiving the HARQ-ACK of the SPS PDSCH and the first type of UCI on the determined first type of PUCCH resource;

Method 5: when the at least one PUCCH resource only comprises the first type of PUCCH resource, determining one first type of PUCCH resource as the PUCCH resource for transmitting the HARQ-ACK of the SPS PDSCH and the first type of UCI;

the receiving the HARQ-ACK of the SPS PDSCH on the determined PUCCH resource comprises:

receiving the HARQ-ACK of the SPS PDSCH and the first type of UCI on the determined first type of PUCCH resource; and/or when there is no first type of UCI in a time unit where the HARQ-ACK transmission of the SPS PDSCH is located, in the time unit, the determining the one PUCCH resource for transmitting the HARQ-ACK of the SPS PDSCH from the at least one PUCCH resource comprises one of the following methods:

Method 6: when the at least one PUCCH resource further comprises a second type of PUCCH resource, determining one second type of PUCCH resource as the PUCCH resource for transmitting the HARQ-ACK of the SPS PDSCH;

Method 7: when the at least one PUCCH resource only comprises the first type of PUCCH resource, determining one first type of PUCCH resource as the PUCCH resource for transmitting the HARQ-ACK of the SPS PDSCH.

8. The receiving method of claim 7, wherein the determining one first type of PUCCH resource as the PUCCH resource for transmitting the HARQ-ACK of the SPS PDSCH and the first type of UCI from the at least one PUCCH resource comprises:

when the at least one PUCCH resource comprises at least two first type of PUCCH resources, determining any one of the following first type of PUCCH resources as the PUCCH resource for transmitting the HARQ-ACK of the SPS PDSCH and the first type of UCI from the at least one PUCCH resource:

one first type of PUCCH resource indicated by a PUCCH resource indication (PRI) in a physical downlink control channel (PDCCH) indicating the SPS PDSCH activation;

one first type of PUCCH resource with a lowest carrying capacity being capable of carrying the HARQ-ACK of the SPS PDSCH and the first type of UCI without exceeding a set code rate, wherein different first type of PUCCH resources have different carrying capacities;

one first type of PUCCH resource with a largest carrying capacity when all the first type of PUCCH resources in the at least one PUCCH resource being not capable of carrying the HARQ-ACK of the SPS PDSCH and the first type of UCI without exceeding the set code rate, wherein different first type of PUCCH resources have different carrying capacities;

one first type of PUCCH resource with a smallest index;

a first one of the first type of PUCCH resources;

wherein the determining one second type of PUCCH resource as the PUCCH resource for transmitting the HARQ-ACK of the SPS PDSCH comprises:

when the at least one PUCCH resource comprises at least two second type of PUCCH resources, determining any one of the following second type of PUCCH resources as the PUCCH resource for transmitting the HARQ-ACK of the SPS PDSCH from the at least two second type of PUCCH resources:

one second type of PUCCH resource indicated by a PRI in a PDCCH indicating the SPS PDSCH activation;

the second type of PUCCH resource with a smallest index;

a first one of the second type of PUCCH resources.

9. The receiving method of claim 6, wherein prior to the determining the one PUCCH resource for transmitting the HARQ-ACK of the SPS PDSCH from the at least one PUCCH resource, the method further comprises:

judging whether a transmission opportunity of the HARQ-ACK of the SPS PDSCH overlaps with a transmission opportunity of the first type of UCI;

the determining the one PUCCH resource for transmitting the HARQ-ACK of the SPS PDSCH from the at least one PUCCH resource comprises:

when the transmission opportunity of the HARQ-ACK of the SPS PDSCH and the transmission opportunity of the first type of UCI overlap, determining one PUCCH resource for transmitting the HARQ-ACK of the SPS PDSCH from the at least one PUCCH resource; and/or prior to the determining the one PUCCH resource for transmitting the HARQ-ACK of the SPS PDSCH from the at least one PUCCH resource, the method further comprises:

judging whether the HARQ-ACK of the SPS PDSCH and the first type of UCI are supported to be transmitted simultaneously;

the determining the one PUCCH resource for transmitting the HARQ-ACK of the SPS PDSCH from the at least one PUCCH resource comprises:

when the HARQ-ACK of the SPS PDSCH and the first type of UCI are supported to be transmitted simultaneously, determining one PUCCH resource for transmitting the HARQ-ACK of the SPS PDSCH from the at least one PUCCH resource.

10. The receiving method of claim 7, wherein the method further comprises at least one of the following ways:

Way 1: the preset PUCCH resource of the at least one PUCCH resource is any one of the following:

the PUCCH resource with a smallest index in the at least one PUCCH resource;

a first one of the at least one PUCCH resource;

a PUCCH resource determined by a PRI in a PDCCH indicating the SPS PDSCH activation;

a second type of PUCCH resource when the at least one PUCCH resource further comprises the second type of PUCCH resource;

a second type of PUCCH resource with a smallest index when the at least one PUCCH resource further comprises at least two second type of PUCCH resources;

a first one of at least two second type of PUCCH resources when the at least one PUCCH resource further comprises at least two second type of PUCCH resources; and/or Way 2: the first type of UCI comprises any one or more of the following:

channel state information (CSI);

a schedule request (SR); and/or

Way 3: the first type of PUCCH resource is any one of:

a PUCCH format 2 resource;

a PUCCH format 3 resource;

a PUCCH format 4 resource; and/or

Way 4: the second type of PUCCH resource is any one of the following:

a PUCCH format 0 resource;

a PUCCH format 1 resource; and/or

Way 5: the one time unit is any one of the following:

one sub-frame;

one slot;

one mini-slot.

11. A terminal comprising: a processor, a memory and programs stored on the memory and executable on the processor, wherein the processor executes the programs to:
- determine one physical uplink control channel (PUCCH) resource for transmitting hybrid automatic repeat request acknowledgement (HARQ-ACK) of a semi-persistent scheduling physical downlink shared channel (SPS PDSCH) from at least one PUCCH resource configured for the SPS PDSCH and for transmitting the HARQ-ACK of the SPS PDSCH, wherein, the at least one PUCCH resource comprises at least one first type of PUCCH resource, and the first type of PUCCH resource is a PUCCH resource for carrying more than 2 bits of information; and
- end the HARQ-ACK of the SPS PDSCH on the determined PUCCH resource.

12. The terminal of claim 11, wherein when the HARQ-ACK of the SPS PDSCH and a first type of uplink control information (UCI) are transmitted in a same time unit, the processor executes the programs to perform one of the following methods:
- Method 1: when a preset PUCCH resource in the at least one PUCCH resource and a resource of the first type of UCI do not overlap in a time domain, determine the preset PUCCH resource as the PUCCH resource for transmitting the HARQ-ACK of the SPS PDSCH;
- Method 2: when a preset PUCCH resources in the at least one PUCCH resource and a resource of the first type of UCI overlap in a time domain, determine one first type of PUCCH resource as the PUCCH resource for transmitting the HARQ-ACK of the SPS PDSCH and the first type of UCI from the at least one PUCCH resource;
- the processor executes the programs to:
  - send the HARQ-ACK of the SPS PDSCH and the first type of UCI on the determined first type of PUCCH resource;
- Method 3: when the at least one PUCCH resource further comprises at least one second type of PUCCH resource, determine one second type of PUCCH resource which does not overlap with a resource of the first type of UCI in a time domain as the PUCCH resource for transmitting the HARQ-ACK of the SPS PDSCH if there is at least one second type of PUCCH resource which does not overlap with the resource of the first type of UCI in the time domain in the at least one PUCCH resource;
- wherein the second type of PUCCH resource is a PUCCH resource for carrying no more than 2 bits of information;
- Method 4: when the at least one PUCCH resource further comprises at least one second type of PUCCH resource, determine one first type of PUCCH resource as the PUCCH resource for transmitting the HARQ-ACK of the SPS PDSCH and the UCI from the at least one PUCCH resource if there is no second type of PUCCH resource which does not overlap with a resource of the first type of UCI in a time domain in the at least one PUCCH resource;
- wherein the second type of PUCCH resource is a PUCCH resource for carrying no more than 2 bits of information;
- the processor executes the programs to:
  - send the HARQ-ACK of the SPS PDSCH and the first type of UCI on the determined first type of PUCCH resource;
- Method 5: when the at least one PUCCH resource only comprises the first type of PUCCH resource, determine one first type of PUCCH resource as the PUCCH resource for transmitting the HARQ-ACK of the SPS PDSCH and the first type of UCI;
- the processor executes the programs to:
  - send the HARQ-ACK of the SPS PDSCH and the first type of UCI on the determined first type of PUCCH resource; and/or
- when there is no first type of UCI in a time unit where the HARQ-ACK transmission of the SPS PDSCH is located, in the time unit, the processor executes the programs to perform one of the following methods:
- Method 6: when the at least one PUCCH resource further comprises a second type of PUCCH resource, determine that one second type of PUCCH resource as the PUCCH resource for transmitting the HARQ-ACK of the SPS PDSCH;
- Method 7: when the at least one PUCCH resource only comprises the first type of PUCCH resource, determine one first type of PUCCH resource as the PUCCH resource for transmitting the HARQ-ACK of the SPS PDSCH.

13. The terminal of claim 12, wherein the processor executes the programs to:
- when the at least one PUCCH resource comprises at least two first type of PUCCH resources, determine any one of the following first type of PUCCH resources as the PUCCH resource for transmitting the HARQ-ACK of the SPS PDSCH and the first type of UCI from the at least one PUCCH resource:
  - one first type of PUCCH resource indicated by a PUCCH resource indication (PRI) in a physical downlink control channel (PDCCH) indicating the SPS PDSCH activation;
  - one first type PUCCH resource with a lowest carrying capacity being capable of carrying the HARQ-ACK of the SPS PDSCH and the first type of UCI without exceeding a set code rate, wherein different first type of PUCCH resources have different carrying capacities;
  - one first type PUCCH resource with a largest carrying capacity when all the first type of PUCCH resources in the at least one PUCCH resource being not capable of carrying the HARQ-ACK of the SPS PDSCH and the first type of UCI without exceeding the set code rate, wherein different first type of PUCCH resources have different carrying capacities;
  - one first type of PUCCH resource with a smallest index;
  - a first one of the first type of PUCCH resources;
- wherein the processor executes the programs to:
- when the at least one PUCCH resource comprises at least two second type of PUCCH resources, determine any one of the following second type of PUCCH resources as the PUCCH resource for transmitting the HARQ-ACK of the SPS PDSCH from the at least two second type of PUCCH resources:
  - one second type of PUCCH resource indicated by a PRI in a PDCCH indicating the SPS PDSCH activation;
  - the second type of PUCCH resource with a smallest index;
  - a first one of the second type of PUCCH resources.

14. The terminal of claim 11, wherein the processor executes the programs to, prior to determining one PUCCH resource for transmitting HARQ-ACK of a SPS PDSCH from at least one PUCCH resource:
- judge whether a transmission opportunity of the HARQ-ACK of the SPS PDSCH overlaps with a transmission opportunity of the first type of UCI;

the processor executes the programs to:
  when the transmission opportunity of the HARQ-ACK of the SPS PDSCH and the transmission opportunity of the first type of UCI overlap, determine one PUCCH resource for transmitting the HARQ-ACK of the SPS PDSCH from the at least one PUCCH resource; and/or
the processor executes the programs to, prior to determining one PUCCH resource for transmitting HARQ-ACK of a SPS PDSCH from at least one PUCCH resource:
  judge whether the HARQ-ACK of the SPS PDSCH and the first type of UCI are supported to be transmitted simultaneously;
the processor executes the programs to:
  when the HARQ-ACK of the SPS PDSCH and the first type of UCI are supported
to be transmitted simultaneously, determine one PUCCH resource for transmitting the HARQ-ACK of the SPS PDSCH from the at least one PUCCH resource.

15. The terminal according to claim 12, wherein the processor executes the programs to perform at least one of the following ways:
  Way 1: the preset PUCCH resource in the at least one PUCCH resource is any one of the following:
    the PUCCH resource with a smallest index in the at least one PUCCH resource;
    a first one of the at least one PUCCH resource;
    a PUCCH resource determined by a PRI in a PDCCH indicating the SPS PDSCH activation;
    a second type of PUCCH resource when the at least one PUCCH resource further comprises the second type of PUCCH resource;
    a second type PUCCH resource with a smallest index when the at least one PUCCH resource further comprises at least two second type of PUCCH resources;
    a first one of at least two second type of PUCCH resources when the at least one PUCCH resource further comprises at least two second type of PUCCH resources; and/or
  Way 2: the first type of UCI comprises any one or more of the following:
    channel state information (CSI);
    a schedule request (SR); and/or
  Way 3: the first type of PUCCH resource is any one of the following:
    a PUCCH format 2 resource;
    a PUCCH format 3 resource;
    a PUCCH format 4 resource; and/or
  Way 4: the second type of PUCCH resource is any one of the following:
    a PUCCH format 0 resource;
    a PUCCH format 1 resource; and/or
  Way 5: the time unit is any one of the following:
    one sub-frame;
    one slot;
    one mini-slot.

16. A base station comprising: a processor, a memory and programs stored on the memory and executable on the processor, wherein the processor executes the programs to perform the hybrid automatic repeat request acknowledgement (HARQ-ACK) receiving method according to 19.

17. The base station of claim 16, wherein when the HARQ-ACK of the SPS PDSCH and a first type of uplink control information (UCI) are transmitted in a same time unit, the processor executes the programs to perform one of the following methods:
  Method 1: when a preset PUCCH resource in the at least one PUCCH resource and a resource of the first type of UCI do not overlap in a time domain, determine the preset PUCCH resource is the PUCCH resource for transmitting the HARQ-ACK of the SPS PDSCH;
  Method 2: when a preset PUCCH resources in the at least one PUCCH resource and a resource of the first type of UCI overlap in a time domain, determining one first type of PUCCH resource as the PUCCH resource for transmitting the HARQ-ACK of the SPS PDSCH and the first type of UCI from the at least one PUCCH resource;
  the processor executes the programs to:
    receive the HARQ-ACK of the SPS PDSCH and the first type of UCI on the determined first type of PUCCH resource;
  Method 3: when the HARQ-ACK of the SPS PDSCH and a first type of UCI are transmitted in a same time unit, the processor executes the programs to:
  when the at least one PUCCH resource further comprises at least one second type of PUCCH resource, determine one second type of PUCCH resource which does not overlap with a resource of the first type of UCI in a time domain as the PUCCH resource for transmitting the HARQ-ACK of the SPS PDSCH if there is at least one second type of PUCCH resource which does not overlap with the resource of the first type of UCI in the time domain in the at least one PUCCH resource;
    wherein the second type of PUCCH resource is a PUCCH resource for carrying no more than 2 bits of information;
  Method 4: when the HARQ-ACK of the SPS PDSCH and a first type of UCI are transmitted in a same time unit, the processor executes the programs to:
  when the at least one PUCCH resource further comprises at least one second type of PUCCH resource, determine one first type of PUCCH resource as the PUCCH resource for transmitting the HARQ-ACK of the SPS PDSCH and the UCI from the at least one PUCCH resource if there is no second type of PUCCH resource which does not overlap with a resource of the first type UCI resource in a time domain in the at least one PUCCH resource;
    wherein the second type of PUCCH resource is a PUCCH resource for carrying no more than 2 bits of information;
  the processor executes the programs to:
    receive the HARQ-ACK of the SPS PDSCH and the first type of UCI on the determined first type of PUCCH resource;
  Method 5: when the HARQ-ACK of the SPS PDSCH and a first type of UCI are transmitted in a same time unit, the processor executes the programs to:
  when the at least one PUCCH resource only comprises the first type of PUCCH resource, determine one first type of PUCCH resource as the PUCCH resource for transmitting the HARQ-ACK of the SPS PDSCH and the first type of UCI;
  the processor executes the programs to:
    receive the HARQ-ACK of the SPS PDSCH and the first type of UCI on the determined first type of PUCCH resource; and/or
  when there is no first type of UCI in a time unit where HARQ-ACK transmission of the SPS PDSCH is located, in the time unit, the processor executes the programs to perform one of the following methods:

Method 6: when the at least one PUCCH resource further comprises a second type of PUCCH resource, determine one second type of PUCCH resource as the PUCCH resource for transmitting the HARQ-ACK of the SPS PDSCH;

Method 7: when the at least one PUCCH resource only comprises the first type of PUCCH resource, determine one first type of PUCCH resource as the PUCCH resource for transmitting the HARQ-ACK of the SPS PDSCH.

18. The base station of claim 17, wherein the processor executes the programs to:
when the at least one PUCCH resource comprises at least two first type of PUCCH resources, determine any one of the following first type of PUCCH resources as the PUCCH resource for transmitting the HARQ-ACK of the SPS PDSCH and the first type of UCI from the at least one PUCCH resource:
one first type of PUCCH resource indicated by a PUCCH resource indication (PRI) in a physical downlink control channel (PDCCH) indicating the SPS PDSCH activation;
one first type PUCCH resource with a lowest carrying capacity being capable of carrying the HARQ-ACK of the SPS PDSCH and the first type of UCI without exceeding a set code rate, wherein different first type of PUCCH resources have different carrying capacities;
one first type PUCCH resource with a largest carrying capacity when all the first type of PUCCH resources in the at least one PUCCH resource being not capable of carrying the HARQ-ACK of the SPS PDSCH and the first type of UCI without exceeding the set code rate, wherein different first type of PUCCH resources have different carrying capacities;
one first class PUCCH resource with a smallest index;
a first one of the first type of PUCCH resources;
wherein the processor executes the programs to:
when the at least one PUCCH resource comprises at least two second type of PUCCH resources, determine any one of the following second type of PUCCH resources for transmitting the HARQ-ACK of the SPS PDSCH from the at least two second type of PUCCH resources:
one second type of PUCCH resource indicated by a PRI in a PDCCH indicating the SPS PDSCH activation;
the second type of PUCCH resource with a smallest index;
a first one of the second type of PUCCH resources.

19. The base station of claim 16, wherein the processor executes the programs to, prior to determining one PUCCH resource for transmitting HARQ-ACK of a SPS PDSCH from at least one PUCCH resource:
judge whether a transmission opportunity of the HARQ-ACK of the SPS PDSCH overlaps with a transmission opportunity of the first type of UCI;
the processor executes the programs to:
when the transmission opportunity of the HARQ-ACK of the SPS PDSCH and the transmission opportunity of the first type of UCI overlap, determine one PUCCH resource for transmitting the HARQ-ACK of the SPS PDSCH from the at least one PUCCH resource; and/or
the processor executes the programs to, prior to determining one PUCCH resource for transmitting HARQ-ACK of a SPS PDSCH from at least one PUCCH resource:
judge whether the HARQ-ACK of the SPS PDSCH and the first type of UCI are supported to be transmitted simultaneously;
the processor executes the programs to:
when the HARQ-ACK of the SPS PDSCH and the first type of UCI are supported to be transmitted simultaneously, determine one PUCCH resource for transmitting the HARQ-ACK of the SPS PDSCH from the at least one PUCCH resource.

20. The base station of claim 17, wherein the processor executes the programs to perform at least one of the following ways:
Way 1: the preset PUCCH resource of the at least one PUCCH resource is any one of the following:
the PUCCH resource with a smallest index in the at least one PUCCH resource;
a first one of the at least one PUCCH resource;
a PUCCH resource determined by a PRI in a PDCCH indicating the SPS PDSCH activation;
a second type of PUCCH resource when the at least one PUCCH resource further comprises the second type of PUCCH resource;
a second type of PUCCH resource with a smallest index when the at least one PUCCH resource further comprises at least two second type of PUCCH resources;
a first one of at least two second type of PUCCH resources when the at least one PUCCH resource further comprises at least two second type of PUCCH resources; and/or
Way 2: the first type of UCI comprises any one or more of the following:
channel state information (CSI);
a schedule request (SR); and/or
Way 3: the first type of PUCCH resource is any one of the following:
a PUCCH format 2 resource;
a PUCCH format 3 resource;
a PUCCH format 4 resource; and/or
Way 4: the second type of PUCCH resource is any one of the following:
a PUCCH format 0 resource;
a PUCCH format 1 resource; and/or
Way 5: the time unit is any one of the following:
one sub-frame;
one slot;
one mini-slot.

* * * * *